US011113004B2

(12) United States Patent
Venetsanopoulos et al.

(10) Patent No.: US 11,113,004 B2
(45) Date of Patent: **\*Sep. 7, 2021**

(54) MOBILITY AND MANAGEMENT LAYER FOR MULTI-PLATFORM ENTERPRISE DATA STORAGE

(71) Applicant: Arrikto Inc., Palo Alto, CA (US)

(72) Inventors: Konstantinos Venetsanopoulos, Athens (GR); Evangelos Koukis, Athens (GR); Christos Stavrakakis, Athens (GR); Ilias Tsitsimpis, Athens (GR); Dimitrios Aragiorgis, Athens (GR); Alexios Pyrgiotis, Athens (GR)

(73) Assignee: Arrikto Inc., San Mateo, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 16/735,690

(22) Filed: Jan. 6, 2020

(65) Prior Publication Data
US 2020/0142640 A1 May 7, 2020

Related U.S. Application Data

(63) Continuation of application No. 15/904,255, filed on Feb. 23, 2018, now Pat. No. 10,534,564.
(Continued)

(51) Int. Cl.
| G06F 3/06 | (2006.01) |
| H04L 29/08 | (2006.01) |
| H04L 12/24 | (2006.01) |
| G06F 12/1072 | (2016.01) |
| G06F 11/14 | (2006.01) |

(52) U.S. Cl.
CPC .......... *G06F 3/0659* (2013.01); *G06F 3/0604* (2013.01); *G06F 3/064* (2013.01);
(Continued)

(58) Field of Classification Search
None
See application file for complete search history.

(56) References Cited

U.S. PATENT DOCUMENTS 8,892,527 B1 11/2014 Yadav
9,330,010 B1 5/2016 Shah
(Continued)

OTHER PUBLICATIONS

Office Action for U.S. Appl. No. 15/904,255, dated May 31, 2019.
(Continued)

*Primary Examiner* — Brian R Peugh

(57) ABSTRACT

A multi-platform data storage system configured to accessing a plurality of storage platforms that use different storage access and/or storage management protocols. The multi-platform data storage system can, for example, include a storage mobility and management layer providing virtual management of data stored in the plurality of storage platforms, and a storage protocol converter operatively coupled between the storage mobility and management layer and the plurality of storage platforms. During access and/or management communication from the storage mobility and management layer to a particular one of the storage platforms, the storage protocol converter can operate to convert the access and/or management communication from a layer protocol used by the storage mobility and management layer to the storage access protocol used by the particular one of the storage platforms.

22 Claims, 65 Drawing Sheets

Related U.S. Application Data

(60) Provisional application No. 62/462,867, filed on Feb. 23, 2017.

(52) U.S. Cl.
CPC .............. *G06F 3/065* (2013.01); *G06F 3/067* (2013.01); *G06F 3/0607* (2013.01); *G06F 3/0617* (2013.01); *G06F 3/0643* (2013.01); *G06F 3/0647* (2013.01); *G06F 3/0664* (2013.01); *G06F 12/1072* (2013.01); *H04L 41/0896* (2013.01); *H04L 67/104* (2013.01); *H04L 67/1097* (2013.01); *G06F 11/14* (2013.01); *G06F 11/1456* (2013.01); *G06F 2212/1008* (2013.01); *G06F 2212/152* (2013.01); *G06F 2212/254* (2013.01)

(56) References Cited

U.S. PATENT DOCUMENTS

| | | | |
|---|---|---|---|
| 10,528,290 | B2 | 1/2020 | Venetsanopoulos et al. |
| 10,534,564 | B2 | 1/2020 | Venetsanopoulos et al. |
| 10,564,893 | B2 | 2/2020 | Venetsanopoulos et al. |
| 2009/0268903 | A1 | 10/2009 | Bojinov |
| 2016/0004603 | A1* | 1/2016 | Lakshman .......... G06F 11/2094 711/162 |
| 2018/0239543 | A1 | 8/2018 | Venetsanopoulos et al. |
| 2018/0239559 | A1 | 8/2018 | Venetsanopoulos et al. |
| 2018/0239560 | A1 | 8/2018 | Venetsanopoulos et al. |
| 2019/0018605 | A1* | 1/2019 | Yadav ................. G06F 16/1824 |
| 2020/0174706 | A1 | 4/2020 | Venetsanopoulos et al. |
| 2020/0142640 | A1 | 5/2020 | Venetsanopoulos et al. |

OTHER PUBLICATIONS

Office Action for U.S. Appl. No. 15/904,258, dated May 16, 2019.
Office Action for U.S. Appl. No. 15/904,262, dated Jun. 26, 2019.
Office Action for U.S. Appl. No. 15/904,262, dated Oct. 31, 2019.
Office Action for U.S. Appl. No. 16/735,690 dated Sep. 4, 2020.
Office Action for U.S. Appl. No. 16/735,692, dated Dec. 4, 2020.
Office Action for U.S. Appl. No. 16/780,869, dated Mar. 4, 2021.

\* cited by examiner

Rok

Registration event for "my_backup" on Service: "VMware VM"

Info

Size: 10 GB

Modified: Wed, Dec 13, 2017, 17:53:20

Version: 7da6bfec1bc-4b24-891c-43d3c481137e

Content type: application/octet-stream

Metadata vmware_path: [Rok] rfs122.6301e1dc-7299-4c05-9264-8cd6a315bb3c/resource_from_my_backup_disk.vmdk description: VMware VM 'resource_from_my_backup' @ 2017-12-13T15:53:14.724116+00:00

< Files

MOBILITY AND MANAGEMENT LAYER FOR MULTI-PLATFORM ENTERPRISE DATA STORAGE

CROSS REFERENCE TO RELATED APPLICATIONS

This application is a continuation of U.S. patent application Ser. No. 15/904,255, filed Feb. 23, 2018, now U.S. Pat. No. 10,534,564 and entitled "MOBILITY AND MANAGEMENT LAYER FOR MULTI-PLATFORM ENTERPRISE DATA STORAGE," the content of which is hereby incorporated by reference, which in turn claims priority benefit of U.S. Provisional Application No. 62/462,867, filed Feb. 23, 2017, and entitled "MOBILITY AND MANAGEMENT LAYER FOR MULTI-PLATFORM ENTERPRISE DATA STORAGE," the content of which is hereby incorporated by reference.

BACKGROUND

Traditional enterprise IT infrastructure often includes: (i) servers/storage/networking inside one or more data centers, (ii) servers/storage/networking inside one or more remote or branch offices (ROBO), and (iii) desktop, laptop, tablet, and smartphone equipment for employees. Modern IT may also include enterprise applications running on an external public IaaS, PaaS, or SaaS cloud provider.

FIGS. 1, 2, and 3 respectively depict the typical environments inside data centers today. In all three cases one can come across compute software that directly interacts with software that is used to actually persist data.

For a compute part, an enterprise's or cloud provider's workloads may either be virtualized, containerized, or running on bare metal physical machines (servers). By "virtualized", one typically means workloads running inside a virtual machine which in turn runs on hypervisor software, which in turn runs inside a physical machine. By containerized, one typically means workloads running inside a container which runs alongside other containers as software inside a physical machine. By bare metal, one typically means workloads running directly on the physical machine without any virtualization or containerization middleware.

For a storage part, which is where the compute workloads store their data, enterprises may use either external proprietary hardware appliances connected to the physical machines running the workloads, or other physical machines that act as storage servers, or may use storage on local disks of the compute physical machines. In the first case, the external proprietary hardware, such as Storage Area Network (SAN) or Network Attached Storage (NAS) appliances, get connected to physical machines running the workloads over a physical interconnect such as Ethernet or Fibre Channel. This is the most common setup in the enterprise IT industry today. In the second case, commodity servers of the same or similar type as servers running the compute workloads, run dedicated software that allows them to appear as a SAN or NAS appliance, and again get physically interconnected to the servers running the workloads with similar interconnects. The widely used term for this setup is "converged infrastructure." In the third case, dedicated software runs alongside the compute workloads on the compute servers, and turns their locally attached disks into a SAN or NAS appliance that can be used to store data. The widely used term for this setup is "hyper-converged infrastructure."

For a networking part, machines and storage inside a data center get interconnected via physical cables over routing and switching hardware. Networking inside the data center can use an Ethernet connection between compute servers and, if external storage appliances exist, interconnection of the external storage appliances via Ethernet.

Regardless of whether the compute part is virtualized, containerized, or bare metal, the physical machine running the compute part needs specific software that orchestrates the workloads. In a virtualized environment, this software can be a virtualization platform or hypervisor. In a containerized environment, this software can be a container platform. In a bare metal environment, this software can be the physical machine's Operating System (OS) itself.

Regardless of whether the storage part runs on an external proprietary appliance, on commodity x86 physical machines like the ones running the compute part, or on the compute servers themselves, there is specific storage software that orchestrates the persisting of the data. This software can also provide a number of data services alongside persisting the data, such as replication, caching, compression/de-duplication, backups, thin clones/snapshots, tiering, and QoS.

Enterprise IT needs to be able to run its workloads on different locations, different installations, or different environments altogether. To move workloads one needs to move the underlying data, so that the workload finds the data it needs at the destination. The problem, known as a data mobility problem, is that data is currently confined inside a system that comprises a platform and persisting storage technology. There are several unsatisfactory or limited approaches to the problem, including (i) manually exporting and importing, (ii) requiring the storage products be of the same type, or (iii) by providing a virtualization platform at each of the different storage locations.

The problem is much harder to solve when one operates on thin clones and snapshots of data. This requires having a storage technology that can do instant copies of the data for the platform to consume. If the platform is consuming thin clones and snapshots, then moving these thin clones and snapshots to a different location is not possible unless one uses a storage product of the same type. This happens because the data services logic that creates these clones/snapshots exists inside the software that runs on the specific storage solution and cannot be understood by an external system. Furthermore, the problem cannot be efficiently solved if one needs to be able to replicate to more than one location.

SUMMARY

Embodiments of a multi-platform data storage system are disclosed. The system offers data mobility across disparate platforms, enhanced data services, and/or efficient data transfer.

The invention can be implemented in numerous ways, including as a method, system, device, or apparatus (including graphical user interface and computer readable medium). Several embodiments of the invention are discussed below.

As a multi-platform data storage system for accessing a plurality of storage platforms that use different storage access and/or storage management protocols, one embodiment can, for example, include at least: a storage mobility and management layer providing virtual management of data stored in the plurality of storage platforms; and a storage protocol converter operatively coupled between the storage mobility and management layer and the plurality of storage platforms. During access and/or management communication from the storage mobility and management layer to a particular one of the storage platforms, the storage protocol converter can operate to convert the access and/or management communication from a layer protocol used by the storage mobility and management layer to the storage access protocol used by the particular one of the storage platforms.

The multi-platform data storage system can be accessed by a plurality of computing platforms that use different computing platform protocols. The multi-platform data storage system can also include a computing protocol converter operatively coupled between the plurality of computing platforms and the storage mobility and management layer. During access communication from a particular one of the computing platforms to the storage mobility and management layer, the computing protocol converter operates to convert the access communication from a computing protocol used by the particular one of the computing platforms to the layer protocol used by the storage mobility and management layer.

The multi-platform data storage system can also include a transfer module coupled to at least one network and configured to transfer at least one of the data objects. The transfer module can facilitate transfer of the at least one of the data objects from the multi-platform data storage system to another data storage system. In one embodiment, the data objects can be transferred over a peer-to-peer, de-centralized network.

The multi-platform data storage system can operate to move thin clones and snapshots efficiently between multiple installations inside a single location or across multiple locations. The multi-platform data storage system can run on a new layer, underneath the virtualization/containerization platform and above the persistent storage solution. The multi-platform data storage system provides a platform that can move thin clones and snapshots completely independent of the compute platform type and storage type running at each location. Being able to move data transparently and efficiently between platforms and storage technologies allows us to hyper-connect data center infrastructure with ROBO infrastructure, and end-user devices like laptops, desktops, tablets and smartphones, all on a single network.

The use of a storage mobility and management layer can support the following aspects.

First, a storage framework for dynamic I/O pipelines with stackable data services that can operate independent of the persisting technology. One embodiment of this storage framework is referred to as "Rok" herein.

Rok is a storage framework that allows one to create arbitrary Storage Processing Units (SPUs) in user-space and interconnect them dynamically, creating dynamic I/O pipelines. Each SPU may implement a different data service, including Clones/Snapshots, Replication, I/O filtering, Caching, Disaster Recovery, De-duplication and Compression. By interconnecting different SPUs, one can dynamically stack different data services and inject/remove new services on-the-fly, in a live I/O data path. Rok may run on top of a storage product and use it only for the persistence of data and thus need not consume the product's inherent data services. Data services are implemented by Rok and persistence of data is taken care of by the underlying traditional persistent storage product.

With Rok, one can decouple the traditional storage software stack consisting of data services and data persistence. As a result, data services can be independent of the persisting of data. Unified data services can be available yet not confined inside a single storage solution, but rather span multiple persistent technologies that run underneath.

Second, data services can implement a global snapshot delivery network. Rok creates an independent layer of data services that sits between the compute software stack, and the storage software stack. The compute software stack stops interacting with the traditional storage software stack and now interacts with Rok, consuming Rok's data services, rather than the storage software stack's data services. Rok is then responsible for handling and manipulating the I/O requests, exposing and implementing the data services needed by the compute part, and finally interacting with the storage software stack, if needed, to persist the data.

By having Rok being independent of the compute and storage stack, one can implement one or more of the following data services inside the Rok: (i) a data service that produces and handles thin clones and snapshots of data; (ii) a data service that presents these clones and snapshots to different compute software stacks and organizes them into buckets; and (iii) a data service that distributes these thin clones and snapshots over a peer-to-peer network.

One can also have Rok data services that handle the integration with the different compute platforms on the upper side. This is done to establish the data path from the compute platform. To establish the data path to the persistent storage, one can have Rok data services that handle the integration with the underlying persistence technologies.

Finally, an Indexer and Tracker service can be provided to act as a global meeting point of the snapshot delivery network. This service is independent of Rok, but is contacted by all instances of the Rok data service that distributes clones and snapshots. All instances of that data service running on different installations, locations and/or devices can meet at the global indexer and tracker.

BRIEF DESCRIPTION OF THE DRAWINGS

FIG. 27C illustrates an exemplary bucket screen of the bucket service GUI according to one embodiment.

FIG. 28B illustrates an exemplary information screen of the bucket service GUI according to one embodiment.

FIGS. 28C-28D illustrates an exemplary registration event screen of the bucket service GUI according to one embodiment.

FIGS. 29A-29B illustrate an exemplary presentation screen of the bucket service GUI according to one embodiment.

FIGS. 29C-29D illustrate an exemplary information screen of the bucket service GUI according to one embodiment.

FIG. 31A illustrates an exemplary screen of an indexing service GUI according to one embodiment.

DETAILED DESCRIPTION OF EMBODIMENTS OF THE INVENTION

Figure 4:
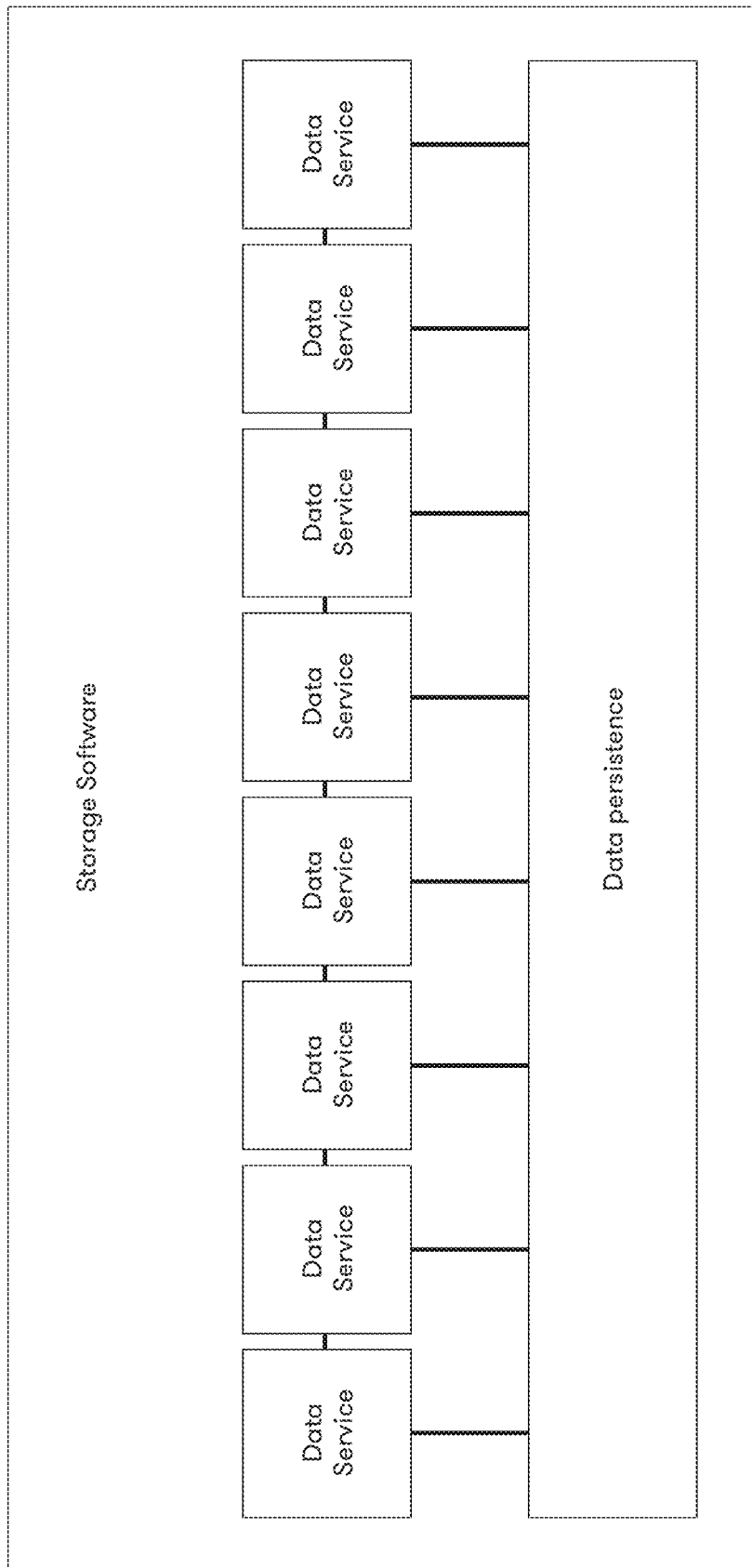
FIG. 4 depicts the internal parts of the storage software stack, consisting of data services and persistence logic, according to one embodiment.

FIG. 4 depicts the internal structure of a generic storage software stack, independently of whether it runs on a proprietary appliance, commodity hardware, or is a software-only solution. The storage software stack consists of logic implementing different data services and logic implementing the persistence of data in a scale-out way. The storage software stack can also provide at least one interface to access data, and one interface to manage the provisioning of resources, and the configuration of the storage platform itself.

Figure 5A:
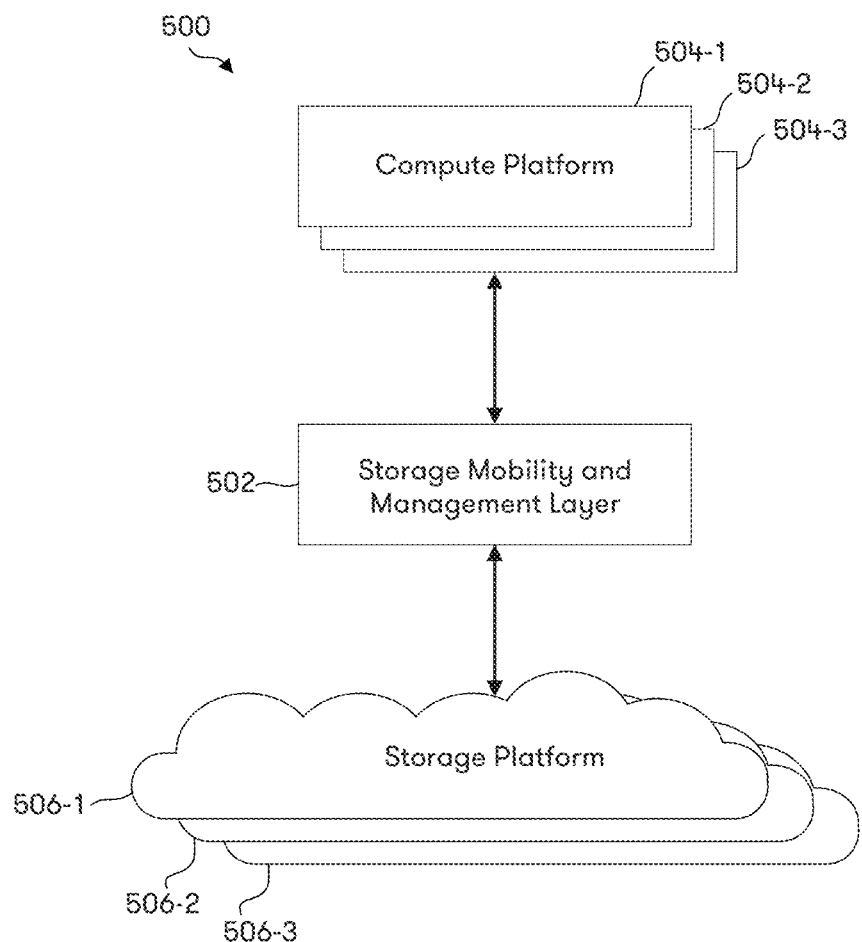
FIG. 5A is a block diagram of a computing and storage system, according to one embodiment.

FIG. 5A is a block diagram of a computing and storage system 500 according to one embodiment. The computing and storage system 500 includes a storage mobility and management layer 502 that is provided between one or more compute platforms 504 and one or more storage platforms 506. The one or more compute platforms 504 can, for example, include compute platform 504-1, compute platform 504-2 and compute platform 504-3. The one or more storage platforms 506 can, for example, include storage platform 506-1, storage platform 506-2 and storage platform 506-3.

Various different types of computing platforms 504 can be used for computing resources. The computing resources can be actual or virtual. Regardless, the different types of storage platforms typically use proprietary hardware and/or software in supporting such computing resources.

Various different types of storage platforms can be used for data storage. The data storage can be actual or virtual. Regardless, the different types of storage platforms typically use proprietary hardware and/or software in supporting such data storage.

Generally speaking, a storage mobility and management layer 502 can render data storage mobile and/or independent of any proprietary software, and also without regard for underlying hardware. Hence, the data becomes mobile across different platforms. That is, data physically stored on proprietary or commodity hardware and locally managed by proprietary software can be rendered mobile and accessible via various different compute platforms 504, which can be local or remote.

Figure 5B:
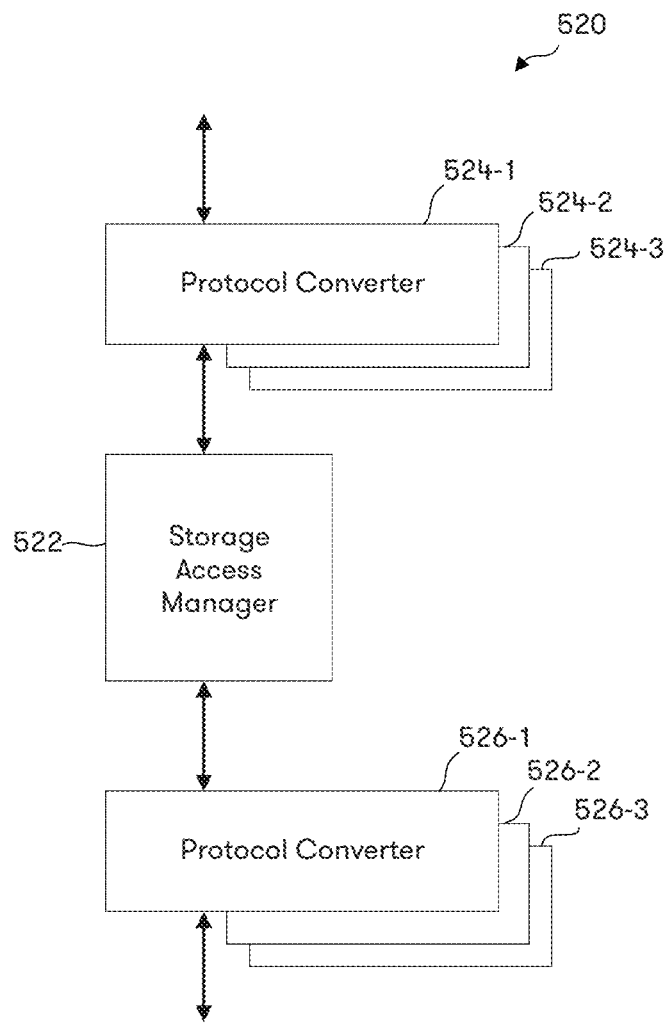
FIG. 5B is a block diagram of a storage mobility and management layer, according to one embodiment.

FIG. 5B is a block diagram of a storage mobility and management layer 520 according to one embodiment. The storage mobility and management layer 520 is, for example, one embodiment of the storage mobility and management layer 502 shown in FIG. 5A. The storage mobility and management layer 520 can include a storage access manager 522, one or more protocol converters 524 and one or more protocol converters 526. The storage access manager 522 can manage storage of data objects and access to the data objects. The storage access manager 522 can enable the data objects to be used across different proprietary compute platforms 504. The storage access manager 522 can also enable the data objects to be stored in any of various different proprietary storage platforms 506. The storage access manager 522 can do transformations on the data objects and compose new data objects from other existing data objects.

As one example, when compute platform 504-1 issues an incoming access request to access data virtually resident on the storage mobility and management layer 502 (though actually resident on the storage platform 506-3), the storage access manager 522 can enable the protocol converter 524-1 to be enabled. Once enabled, the protocol converter 524-1 can convert the incoming access request to an intermediate layer protocol suitable for use at the storage access manager 522. Thereafter, since the incoming access request is seeking to access data actually resident on the storage platform 506-3, the storage access manager 522 can then enable the protocol converter 526-3. Once enabled, the protocol converter 526-3 can be used to convert an intermediate access request to a proprietary protocol suitable for use at the storage platform 506-3.

Once the storage platform 506-3 responds to the intermediate access request, the response is in the proprietary protocol used at the storage platform 506-3. At the protocol converter 526-3, the response can be converted from the proprietary protocol used at the storage platform 506-3 to the intermediate layer protocol suitable for use by the storage access manager 522. From there, the response can be managed at the storage access manager 522 and then later converted by the protocol converter 524-1 from the intermediate layer protocol suitable for use at the storage access manager 522 to a proprietary protocol used at the compute platform 504-1.

Figure 5C:
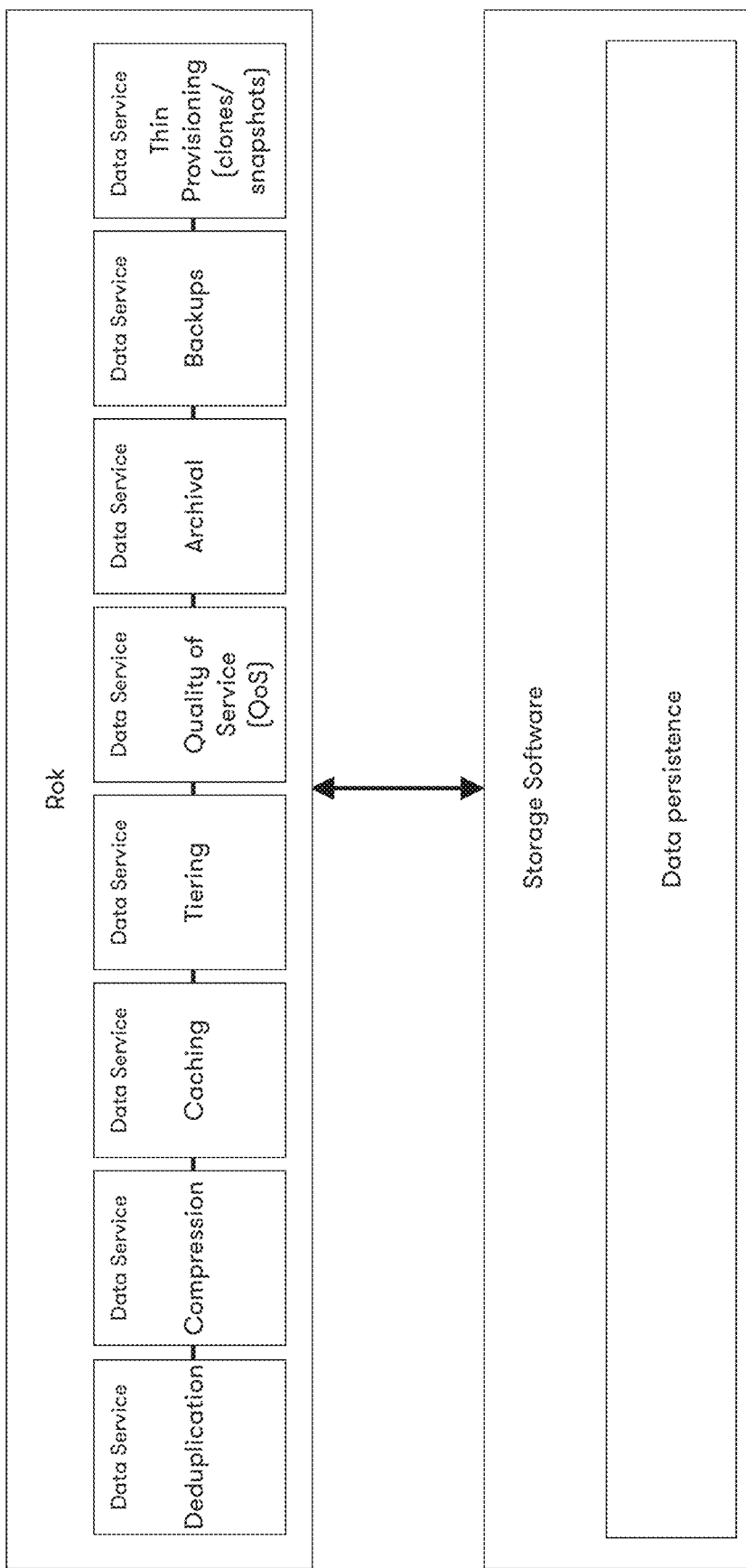
FIG. 5C depicts the decoupling of data services from persistence logic using Rok, according to one embodiment.

FIG. 5C depicts the decoupling of data services from persistence logic. Data services are implemented by Rok outside the traditional storage platform, which is only used to persist the data. Rok interacts with different storage platforms using their native interfaces to store, access, and manage data on them. All data services needed by a compute platform can be provided by Rok. Rok may either implement them itself, or forward the requests to the underlying storage platform. In the common case, Rok need not interact with the data services logic of the underlying storage platform, but only with its persistence logic.

Figure 1:
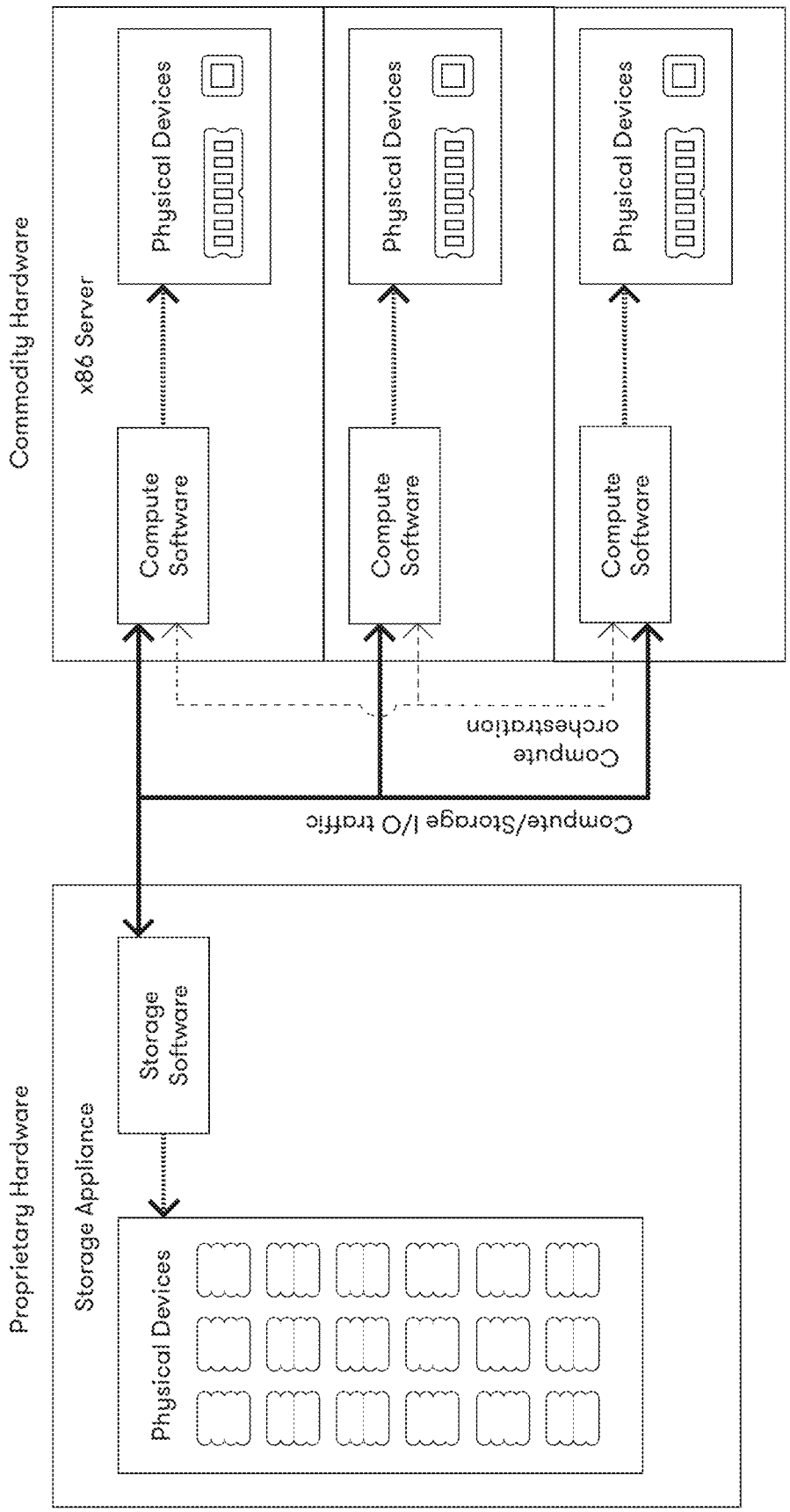
FIG. 1 depicts an environment where traditional compute and storage software run on a non-converged setup, where compute software runs on commodity hardware, and storage software runs on a proprietary appliance.
Figure 2:
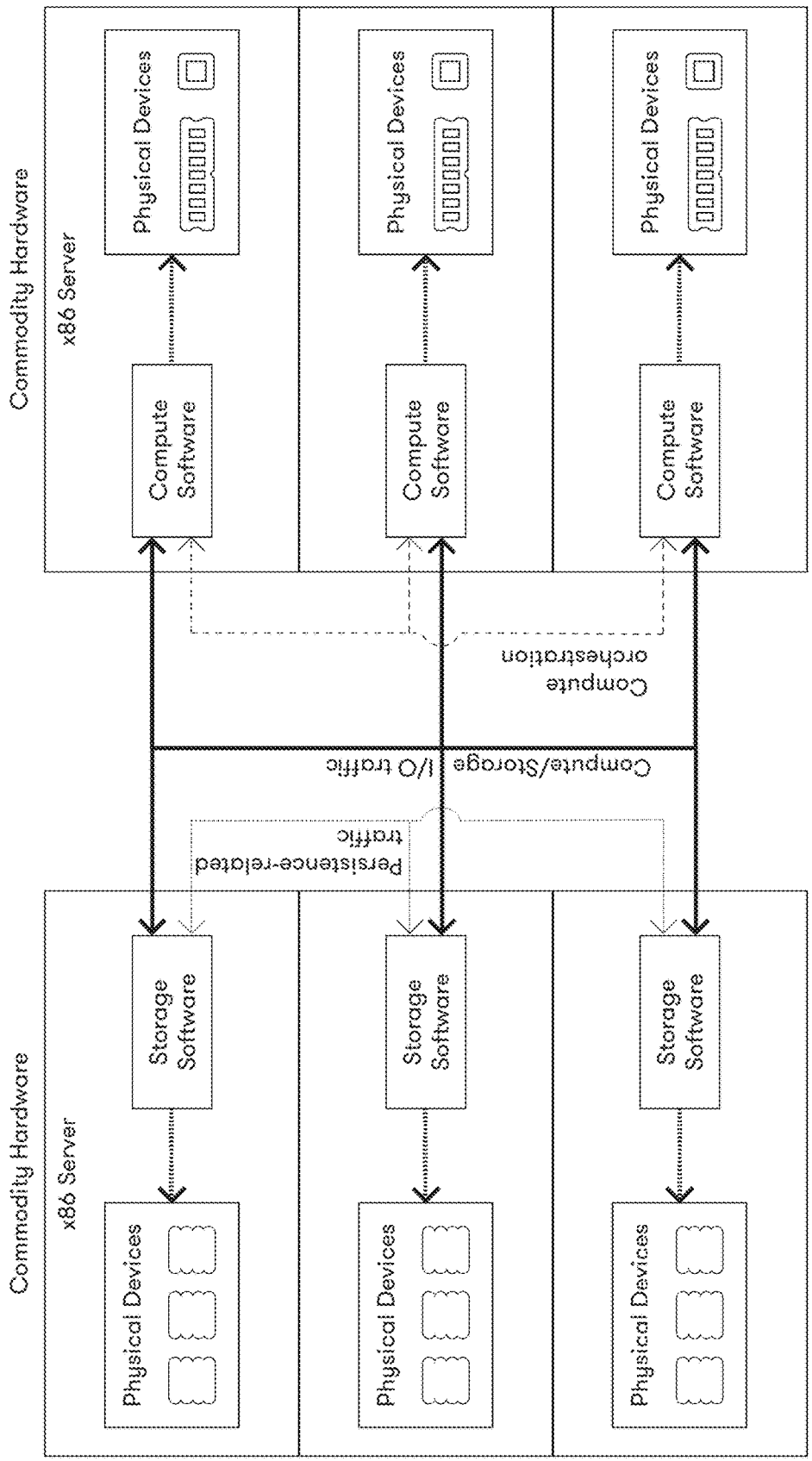
FIG. 2 depicts an environment where traditional compute and storage software run on a converged setup, where compute and storage software run on commodity hardware.
Figure 3:
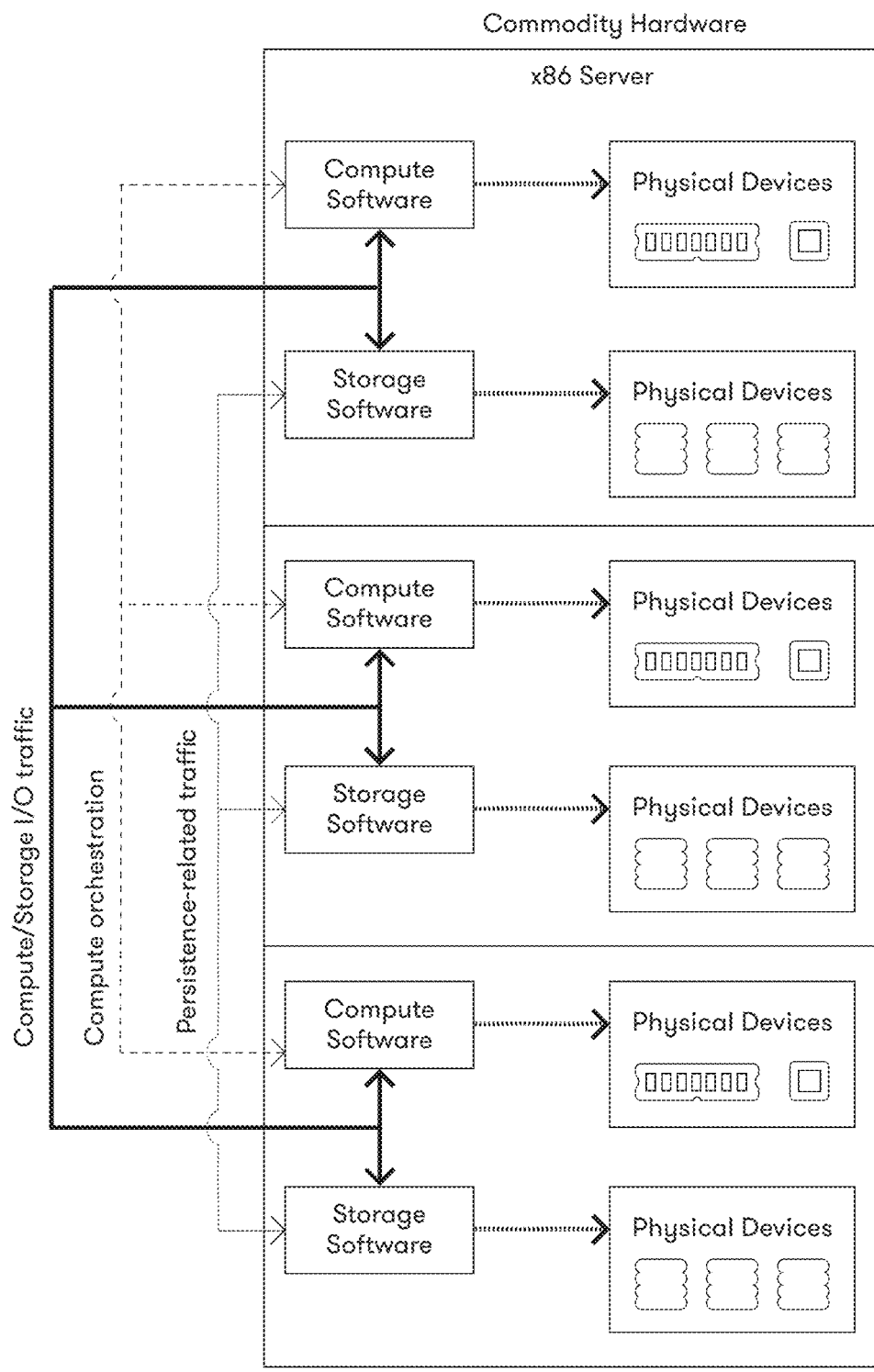
FIG. 3 depicts an environment where traditional compute and storage software run on a hyperconverged setup, where compute and storage software both run on the same commodity hardware.
Figure 6:
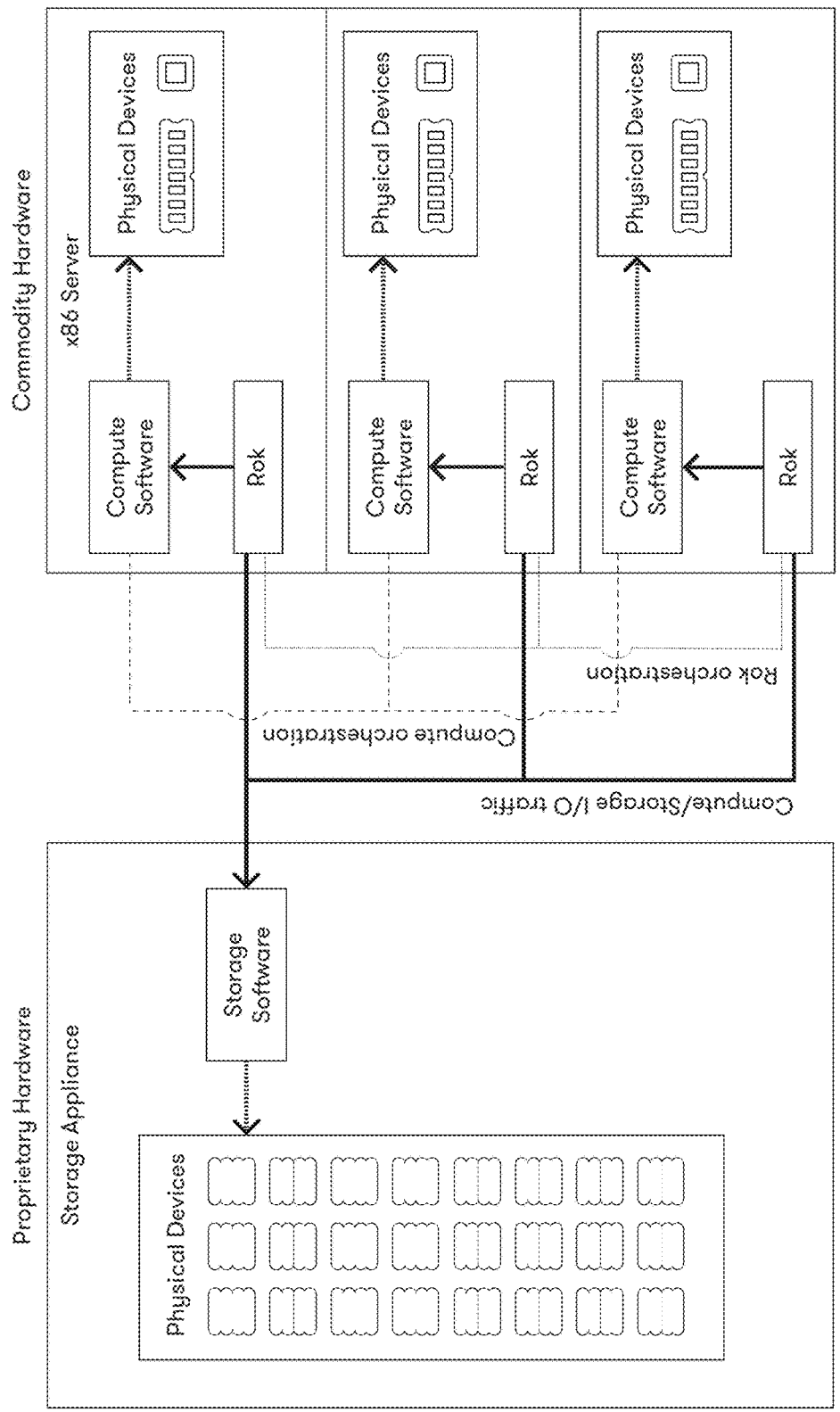
FIG. 6 depicts an environment where compute, Rok, and storage software run on a non-converged setup, according to one embodiment.
Figure 7:
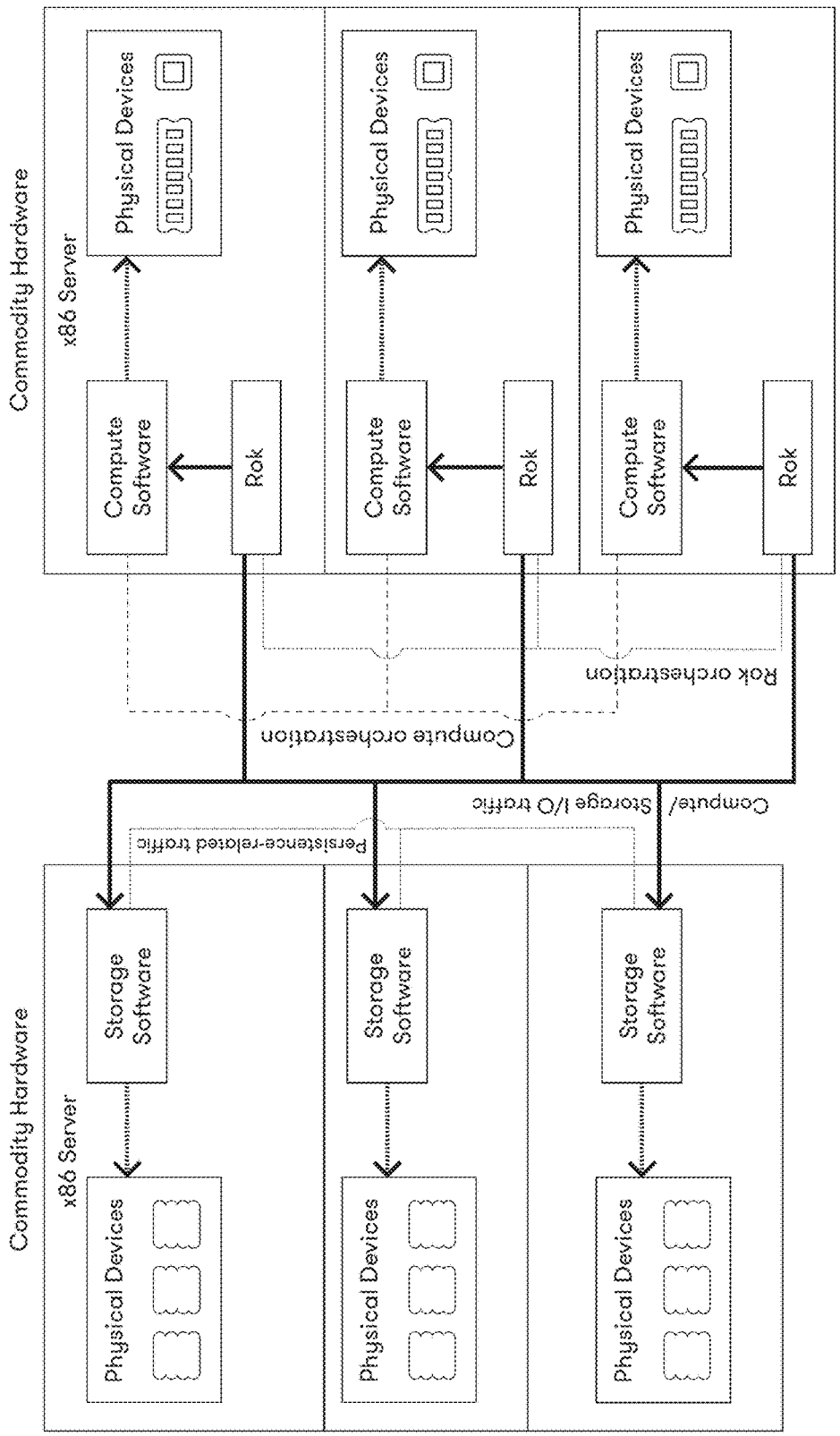
FIG. 7 depicts an environment where compute, Rok, and storage software run on a converged setup, according to one embodiment.
Figure 8:
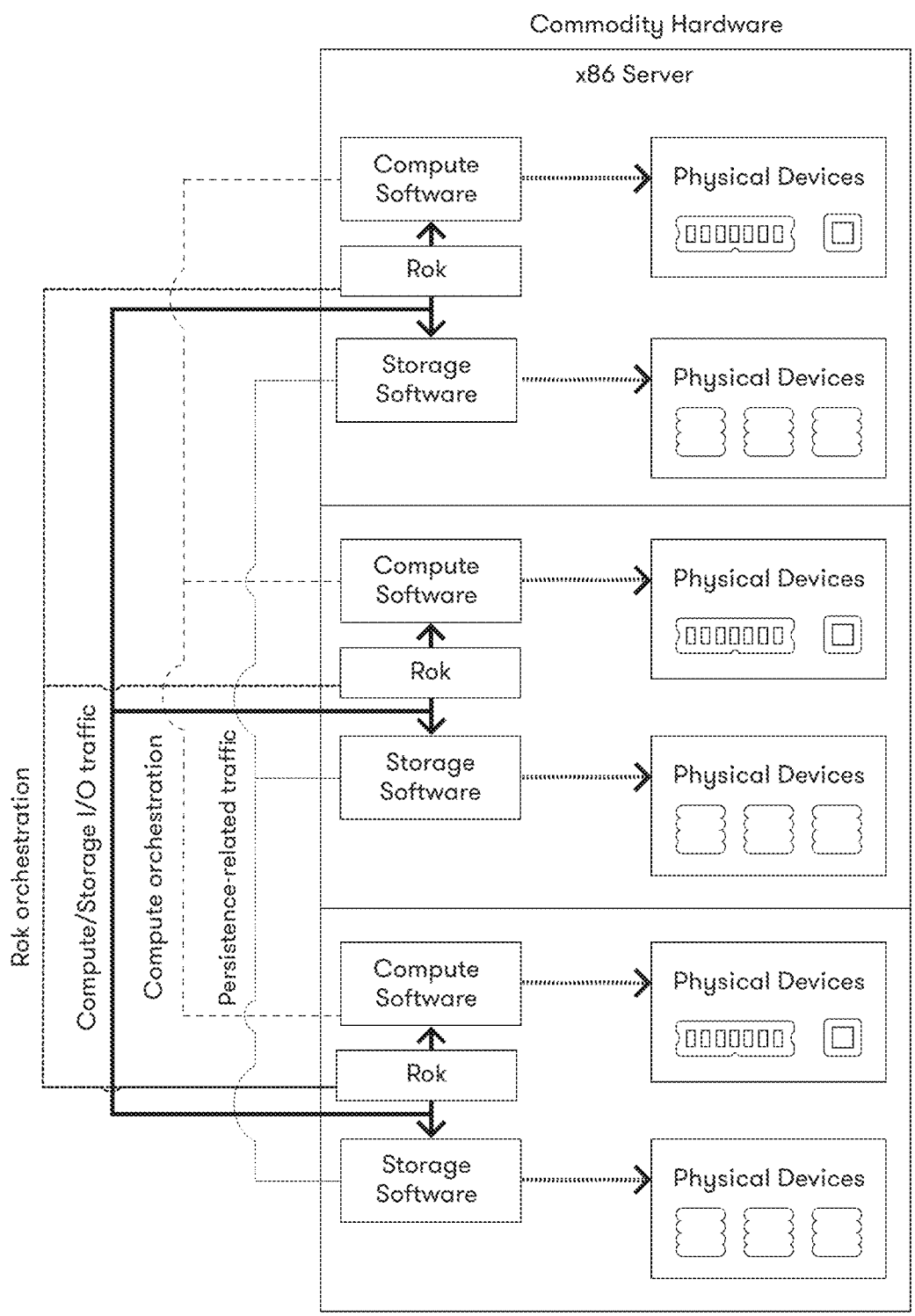
FIG. 8 depicts an environment where compute, Rok, and storage software run on a hyperconverged setup, according to one embodiment.

FIGS. 6, 7, and 8 depict Rok running on a non-converged, converged, or hyperconverged setup, analogous to the setups of FIGS. 1, 2, and 3. On the non-converged setup, Rok runs as a software-only solution on the commodity hardware that the compute platform also runs. Rok interacts with the storage software stack running on the proprietary appliance, and the compute platform interacts with Rok. On the converged setup, Rok runs as a software-only solution on the commodity hardware that the compute platform is also running. Rok interacts with the storage software stack running on the additional commodity hardware, and the compute platform interacts with Rok. On the hyperconverged setup, Rok runs as a software-only solution on the commodity hardware that the compute and storage stacks are also running. Rok interacts with the storage software stack, and the compute platform interacts with Rok.

Figure 9:
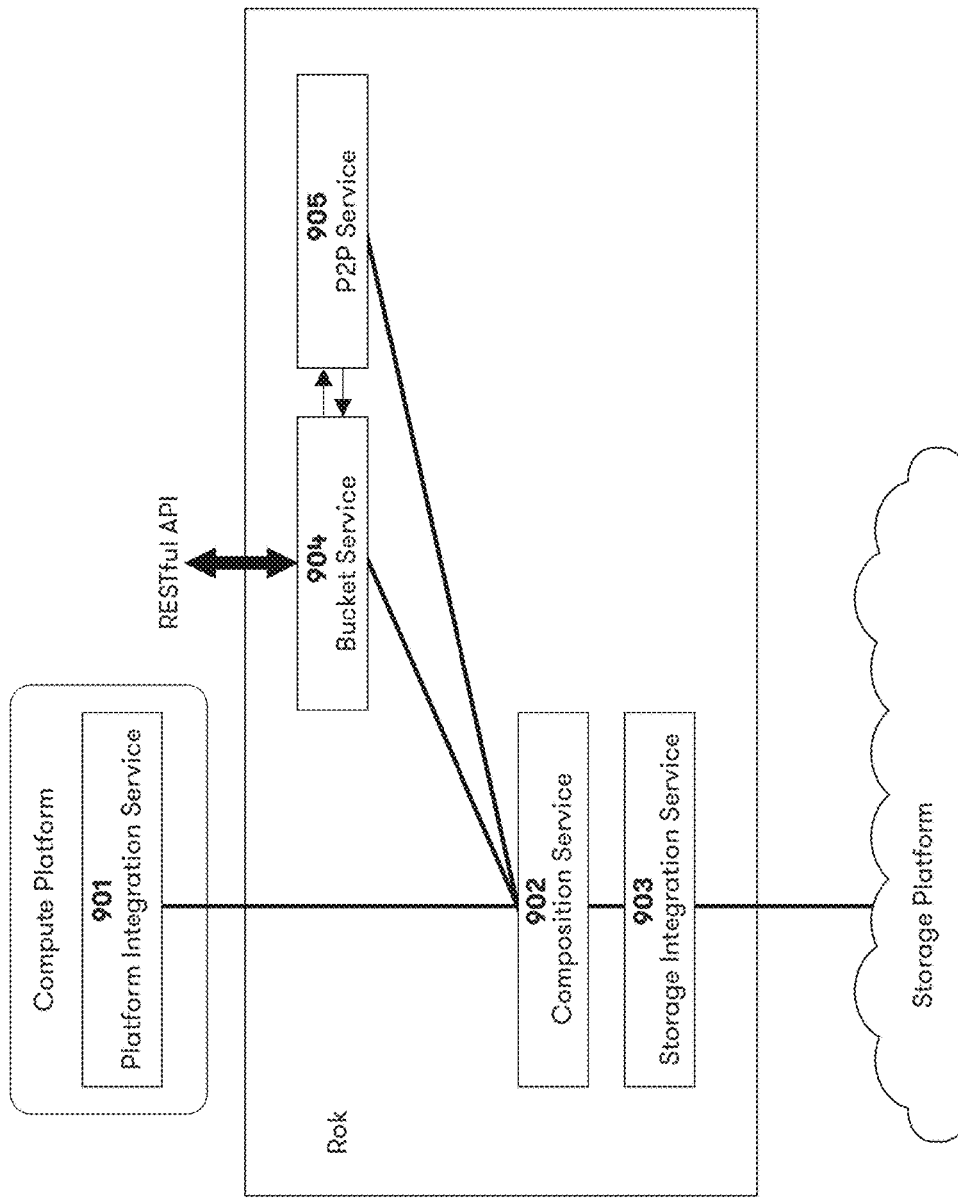
FIG. 9 depicts how data services pertaining to a Snapshot Delivery Network are organized and connected inside Rok, according to one embodiment.

FIG. 9 zooms into a single Rok instance and depicts its internal architecture showing the data services that implement the Snapshot Delivery Network. One can implement a chain of different Data Services, connected with one another. Specifically, as an example:

a. Data Service 901 is a platform integration service (converter).

This Data Service is not part of the Snapshot Delivery Network per se, but needs to exist for integration with the OS, virtualization, or containerization platform running on the higher levels. It provides a data and management path that can be understood and consumed by each specific compute platform. Essentially, on the data path it translates compute platform specific interfaces for I/O, to the Rok I/O interface. On the management path, it again translates compute platform specific interfaces for management of the underlying storage resources to the Rok management interface for resources. Rok comes with different platform integration data services, each one implementing a different combination of data and management paths, depending on the compute platform it needs to integrate with. These services are the northbound interfaces of Rok. In one embodiment, the compute platform only knows and interacts with these services, and knows nothing about all other Rok services. On FIG. 9, one can assume only one of these data services runs, data service 901. The other integration data services are not shown in the figure. Example platform integration data services include: a user-space iSCSI target, a Linux kernel block device using the LIO SCSI target and its TCMU framework, and a service that integrates with QEMU directly in user-space.

b. Data Service 902 is the composition service.

This Data Service is the core of the Snapshot Delivery Network. It is the Data Service that implements the thin clone and snapshot functionality of the underlying data. Data Service 902 can compose virtual storage resources, using virtual data blocks. A virtual storage resource (VSR) represents a linearly-addressable set of fixed-length blocks, and a virtual data block (VDB) represents a named blob. A VSR is composed from a number of VDBs put together, one after the other. The composition service provides VSRs for consumption from the upper layers and stores VDBs on the lower levels. It also allows the upper layers to access the VDBs themselves, if needed. A VSR can be thinly copied to a new immutable VSR (a snapshot), or a new mutable VSR (a clone). This happens without having to copy the actual data, but rather with re-mapping on internal structures that the data service uses to construct the VSRs. Only when data is changed, for example when upper services write to a VSR, new VDBs get allocated and the relative re-mappings happen, following a copy-on-write methodology. Accordingly, garbage collection can take place when data gets deleted and no more references to VDBs exist.

c. Data Service 903 is a storage integration service (converter).

Similarly to Data Service 901, this Data Service is not part of the Snapshot Delivery Network per se, but needs to exist for integration with the underlying storage technology, used to store the actual data. It provides a data and management path for communication with the storage technology. Essentially, on the data path it translates the Rok-specific interface for I/O, to the I/O interface of the storage technology underneath. On the management path, again translates the Rok-specific management interface for resources, to the management interface of the storage technology underneath. Rok can include with different storage integration data services, each one implementing a different combination of data and management paths, depending on the storage technology it needs to integrate with. These services are the southbound interfaces of Rok. In one embodiment, the storage technology only knows and interacts with these services, and knows nothing about all other Rok services.

On FIG. 9, one can assume only one of these data services runs, data service 903. The other integration data services are not shown in the figure. Example storage integration data services include: a service supporting NFS-based storage solutions, a service supporting object-based storage solutions, a service supporting Red Hat's Ceph solution, a service supporting block-based storage solutions, including independent LUNs as provided by a SAN.

Data Services 901, 902, and 903 establish the data path for I/O requests to flow from the compute platform to the storage platform, and the management path to handle the storage resources. They can also provide the functionality of thin cloning and snapshotting for the compute platform to consume, independently of the technology used to store the data. At this point one can have a fully functional system, where one can have decoupled the cloning/snapshotting functionality from the compute platform and from the traditional storage solution that is used to persist the data.

Building on top of the functionality provided by Services 901, 902, and 903, one can add two services (904, 905) that take care of organizing the snapshots into arbitrary, named groups, called buckets, and then efficiently distributing these buckets to other Rok installations over a peer-to-peer network.

d. Data Service 904 is the bucket service.

Data Service 904 is a service that connects to Data Service 902 (the composition), and organizes existing VSRs, as known by Data Service 902, into arbitrary groups, called buckets. The service is exposed to end users. Users can login and create empty buckets, which they can then fill with Snapshots, by associating a user-provided filename with an underlying VSR of Data Service 902. One can call this process a registration. The user can register an underlying storage resource, a VSR, with Data Service 904, by giving it a human-friendly name and putting it inside one of their buckets. No data gets moved or copied during the registration process, since Data Service 904 has access to the same VSRs as the compute platform, via its direct connection to Data Service 902. Registration needs to take place when the compute platform produces new storage resources (snapshots) on Data Service 902. When that happens, new platform-specific entities get created on the platform (e.g., Volumes, Images, Disks, Snapshots), and new entities (VSRs) get created on Data Service 902, but none of the above are recognized by Data Service 904. During the registration process, where the Data Service 904—specific entity gets created, one can successfully associate a platform-specific resource with a Data Service 904—specific resource via a VSR.

Figure 10:
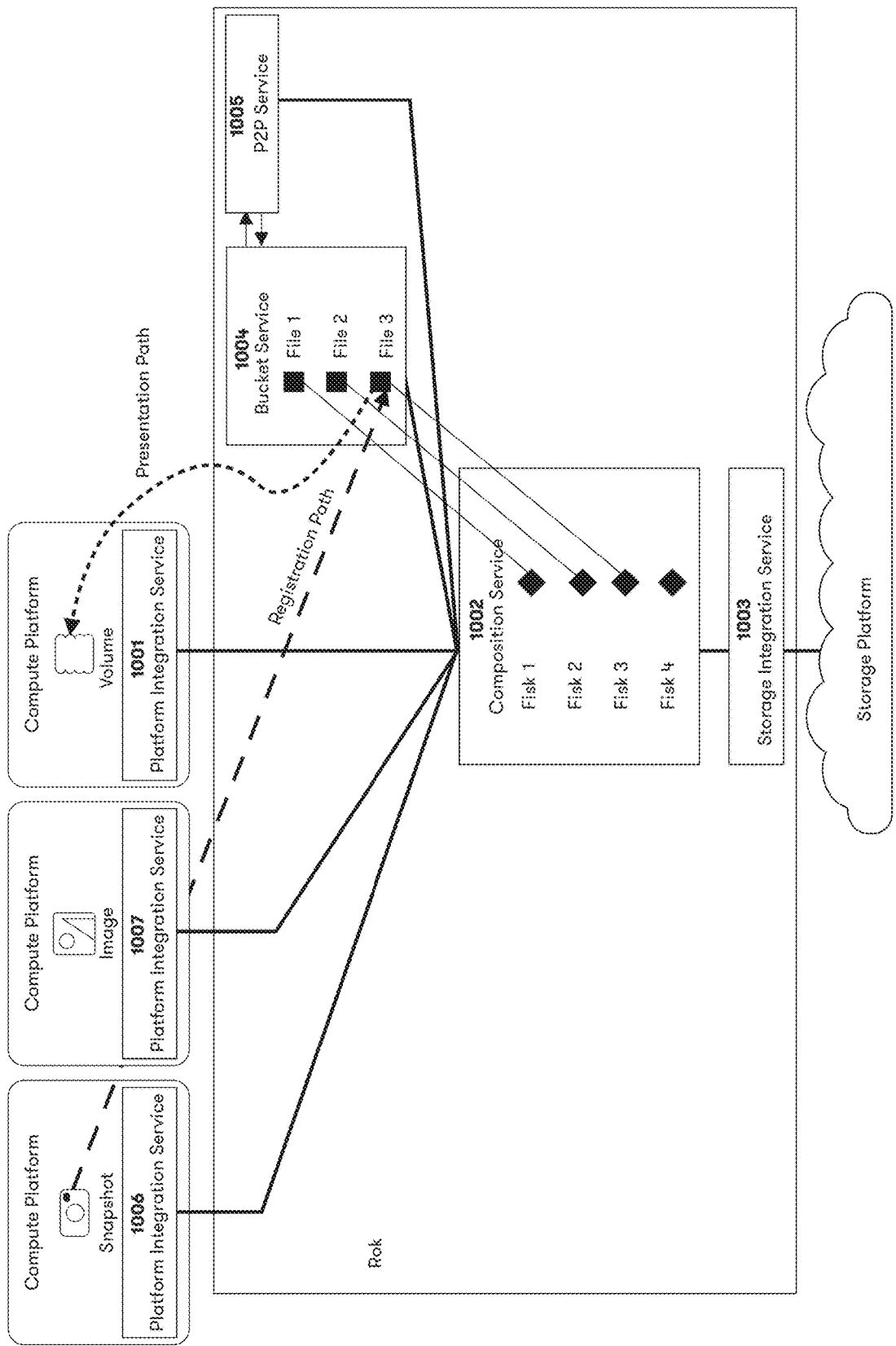
FIG. 10 depicts the process of registering and presenting resources between Rok and external services, according to one embodiment.

Besides the registration process, Data Service 904 also implements a presentation process. This is the exact opposite procedure. There are cases when one can have a VSR existing on Data Service 902, and is associated with a snapshot inside a bucket of Data Service 904, but the compute platform knows nothing about this VSR. Data Service 904 supports compute platform-specific drivers that present a snapshot of Data Service 904 as a compute platform-specific resource on that platform. To do so, the driver can integrate with the platform and create the compute platform-specific resource, and then associate it with the corresponding underlying VSR on Data Service 902. FIG. 10, depicts the registration and presentation processes, and how Data Service 904 (now 1004 in this figure) interacts with the compute platform, and Data Service 902 (now 1002) respectively.

Besides one-time manual registration/presentation, Data Service 904 (1004 on FIG. 10) can implement user-defined registration and presentation policies. Policies enable the user to dynamically fill up buckets automatically, due to certain criteria (via registration), and also create compute platform-specific resources in batch and bulk, again automatically. All the above procedures do not require any data movement or copying. They can also be programmatically controlled via a RESTful API, exposed by Data Service 904.

e. Data Service 905 is the Peer-to-Peer (P2P) service.

The actual data distribution across the network is done by Service 905. With Services 902 and 904 one is able to (a) produce thin snapshots instantly, (b) organize these snapshots inside buckets, and/or (c) present these snapshots to different compute platforms. All the above are done with no data copying or movement, inside the boundaries of a single Rok installation, which may run inside a data center, a ROBO, or an end-user device, such as a laptop or desktop. The efficient distribution of these thin snapshots among different Rok installations that may run on different locations or different types of infrastructure can be implemented by Data Service 905.

To take care of the distribution, Data Service 905 need not utilize the traditional methods for data replication found in today's persistent storage solutions, which have pre-defined source and destination targets for replication, or replication goes through a central point of storing data, where every location pulls from. Instead, the Data Service 905 implements a protocol heavily inspired by the peer-to-peer BitTorrent protocol. Partly acting as a torrent client, it enables each Rok installation to become one edge (or peer) of a peer-to-peer network. This network does not exchange traditional media or file content in our case, as happens with typical peer-to-peer networks based on torrent technology, but rather snapshots which are essentially VM, container or even bare metal machine disks.

Data Service 905 interacts with Data Service 904 and connects with Data Service 902. This happens because Data Service 905 does not distribute single snapshots, but whole buckets, so it needs information from both sides. A bucket containing snapshots on Data Service 904 becomes the analogous to a torrent file containing multiple files in BitTorrent via Data Service 905.

The big difference and added complexity compared to BitTorrent technology, is that the contents of a torrent file are static, whereas the contents of a bucket on Data Service 904 may change over time. This happens because new snapshots get registered inside a bucket manually by the end-user, or automatically via a registration policy. The protocol used in this invention is able to distribute dynamically-changing content over the Peer-to-Peer network.

Data Service 905 implements two major operations on a bucket of Data Service 904 that allow for data distribution to take place. Publishing of a bucket, and subscription to a published bucket. When Data Service 905 publishes a bucket, it creates a unique bucket reference in the form of a URL that is discoverable by other instances of the service running inside other Rok installations. It is also able to serve the contents of the bucket by keeping track of the snapshots inside the bucket, and the specific VDBs that make up the VSR that backs each snapshot. To do so, it interacts with Data Service 904 to consume the bucket information and connects to Data Service 902 to have access to the underlying VSRs and retrieve their VDBs. The unique reference for a published bucket is stored on a service one can call the Indexer, independent of the Rok installation, in the same way torrent files are stored in a torrent index, independently of where the content's data are actually stored. Data Service 905 undertakes the other half of the publishing operation too, which is subscription to a bucket reference, discovery of the peers (Rok installations) that are serving the desired data, pulling of the desired VDBs from each peer, recreating the VSRs, and the bucket with all its contents on Data Service 904. The protocol supports peer discovery via a Tracker service, again independent of a Rok installation, and similar to the tracker service of the BitTorrent protocol. Data Service 905 asks the Tracker service for the peers that are serving the specific bucket reference, then connects to all these peers and downloads VDBs from them, for all VDBs that are missing from the local Rok installation.

Figure 11:
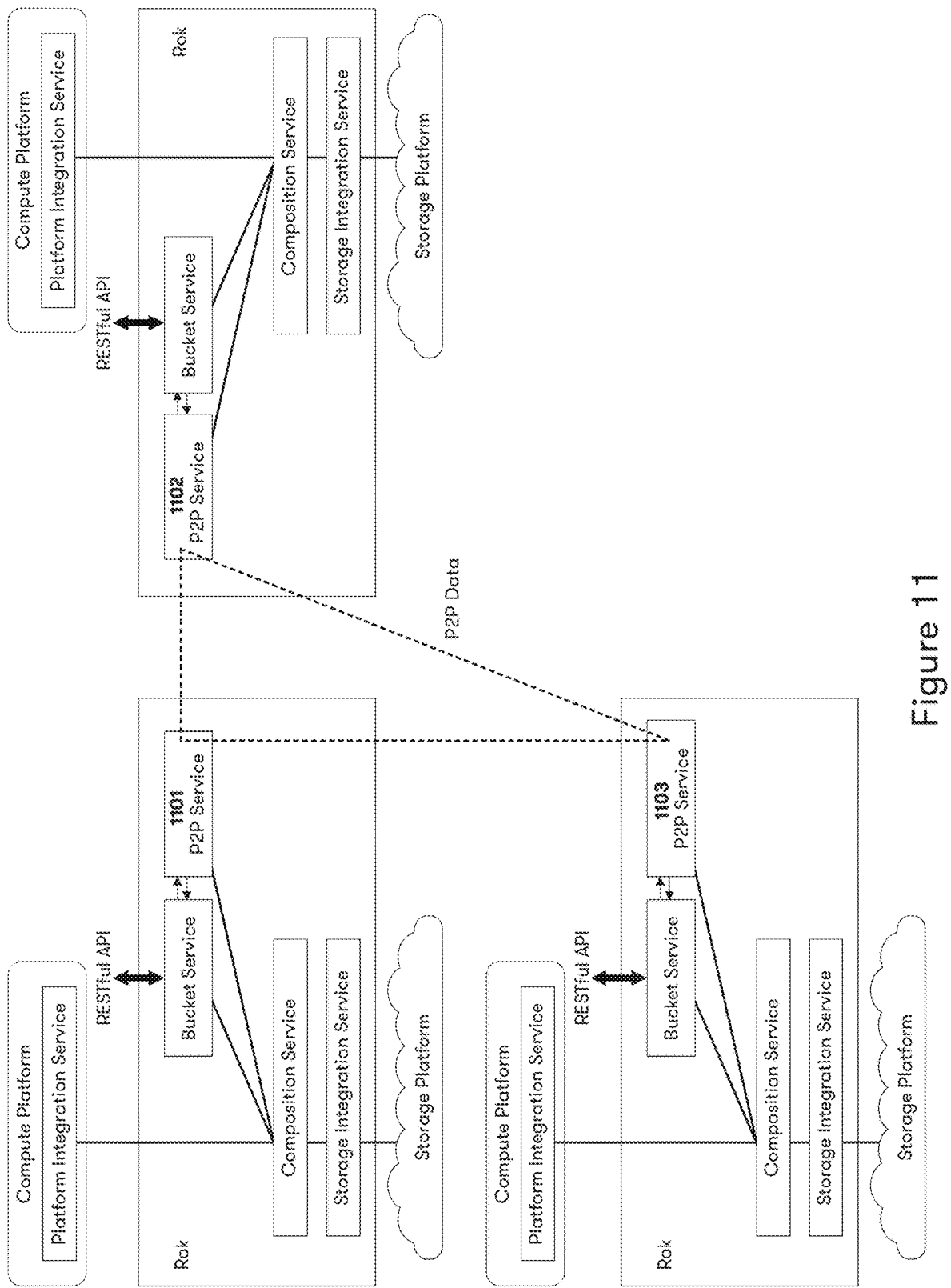
FIG. 11 depicts how one or more embodiments of the present patent are interconnected between them to exchange data in a peer-to-peer fashion, according to one embodiment.

FIG. 11 depicts how one or more embodiments can be interconnected among them to exchange data in a peer-to-peer fashion. On this figure, many instances of Data Service 905 (instances 1101, 1102, and 1103) communicate over the invention's protocol to exchange the actual data.

The Indexer service 1204 is a web service that implements a RESTful API and web user interface for storing and discovering bucket references. It implements reference ownership and permissions, along with Access Control Lists (ACLs). The Indexer service 1204 is the global meeting point, where cross-domain users can discover, share and exchange bucket references, and where cross-domain Rok installations can discover published buckets to which they can subscribe. The Indexer service 1204 is completely independent from Rok.

The Tracker service 1205 is a web service that implements the part of the protocol for peer discovery. After retrieving a bucket reference, an instance of the P2P Service (1201 on FIG. 12) will contact the Tracker service 1205 to find out where to find the other instances of the P2P Service that are serving the data it needs for this reference. The Tracker service 1205 is not a user-facing service, as is the Indexer 1204, and it only interacts with instances of the P2P Service. The Tracker service 1205 is also completely independent from Rok.

Figure 12:
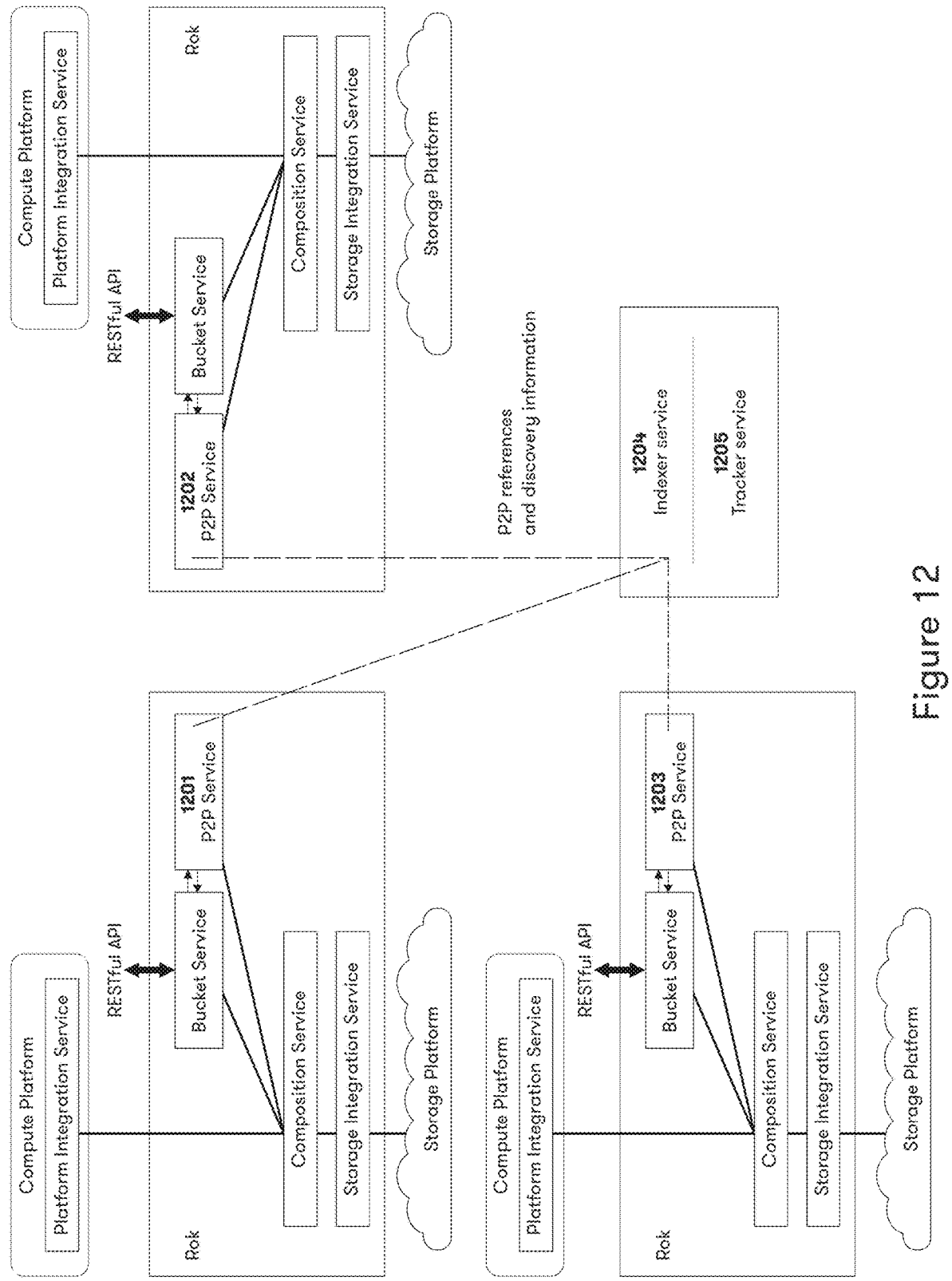
FIG. 12 depicts how multiple Rok installations connect to an Indexer and Tracker service to discover and exchange references, according to one embodiment.

FIG. 12 depicts how multiple Rok installations connect to the Indexer and Tracker web service to discover and exchange bucket references. On this figure, the links between the instances of the P2P Service do not transfer actual data, but rather just discovery information.

Figure 13:
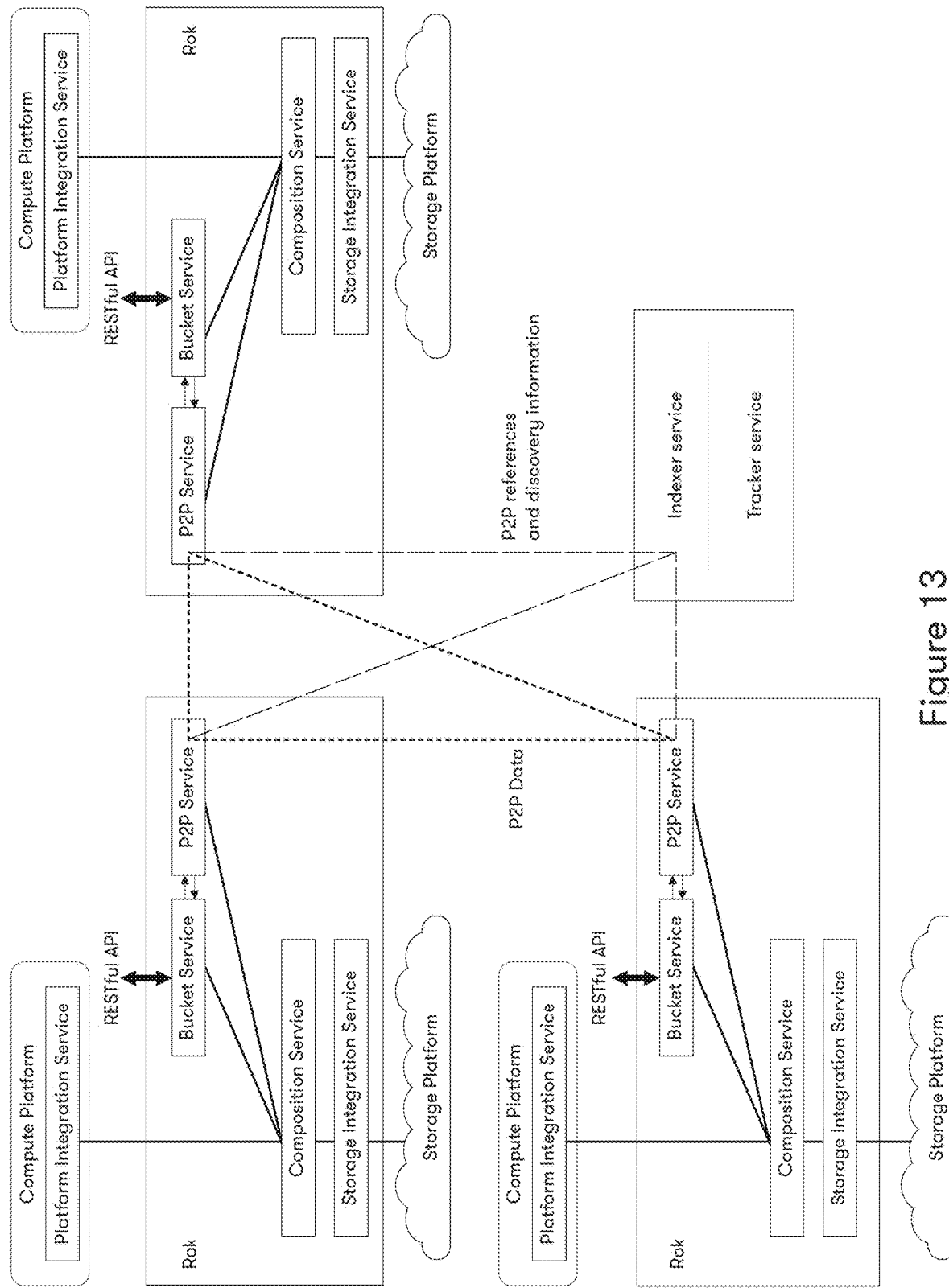
FIG. 13 depicts a Global Snapshot Delivery Network, including multiple Rok installations, the Indexer service, and the Tracker service, according to one embodiment.

FIG. 13 depicts an embodiment of the invention that comprises the Global Snapshot Delivery Network, including multiple Rok installations, and the Indexer and Tracker web services. This figure depicts the Global Snapshot Delivery Network connecting separate instances of Rok, running on completely different types of infrastructure, on distinct locations.

Figure 14:
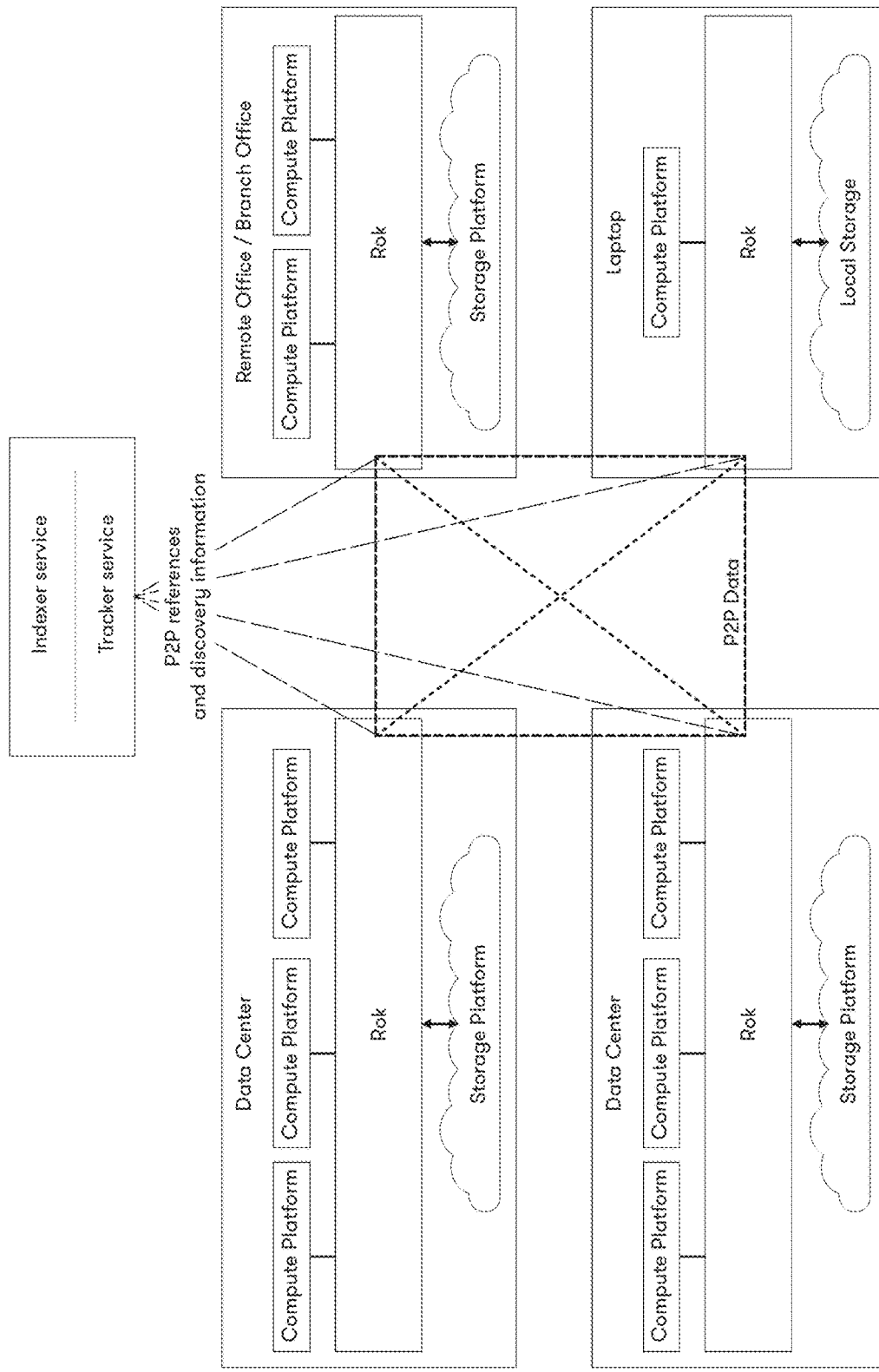
FIG. 14 depicts an overview of a deployed system on multiple locations across data centers, ROBO offices, and end-user devices around the globe, according to one embodiment.

FIG. 14 depicts an embodiment of the invention running on multiple locations, across data centers, ROBO offices, and end-user devices around the globe. The Global Snapshot Delivery Network connects different compute platforms with different storage platforms, while thin snapshots are distributed and presented in a transparent way across the network.

Figure 15A:
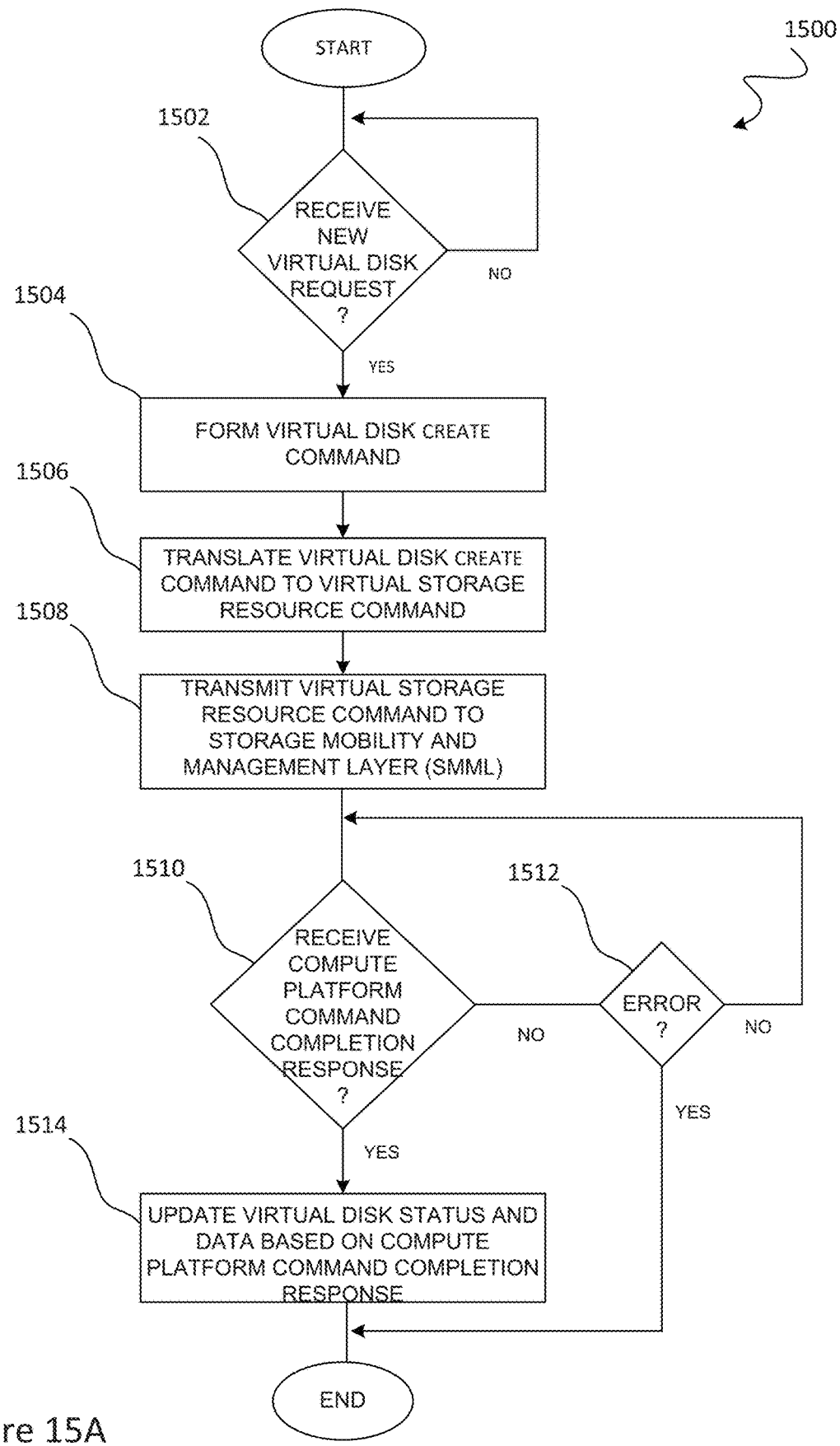
FIG. 15A is a flow diagram of a virtual storage resource creation process according to one embodiment.

FIG. 15A is a flow diagram of a virtual storage resource creation process 1500 according to one embodiment. The virtual storage resource creation process 1500 is processing associated with formation of a virtual disk in a virtual storage system. The virtual storage resource creation process 1500 typically operates on a compute platform that interfaces with the virtual storage system. For example, the compute platform is a computer system, such as the compute platforms 504 illustrated in FIG. 5A.

The virtual storage resource creation process 1500 can begin with a decision 1502 that determines whether a new virtual disk request has been received. When the decision 1502 determines that a new virtual disk request has not yet been received, the virtual storage resource creation process 1500 can await such a request. On the other hand, when the decision 1502 determines that a new virtual district request has been received, then a virtual disk command can be formed 1504. In this case, a new virtual disk is being requested, so the virtual disk command can be a virtual disk create command. Next, the virtual disk command can be translated 1506 to a virtual storage resource command. Typically, the translation of the compute platform commands is performed at the compute platform by the platform integration service. In this case, the virtual storage resource command is a command that is utilized to create a new virtual disk at a storage mobility and management layer (SMML) that manages virtual storage. After the virtual disk command has been translated 1506 to the virtual storage resource command, the virtual storage resource command can be transmitted 1508 to a storage mobility and management layer (SMML).

After the virtual storage resource command has been transmitted 1508 to the SMML, the virtual storage resource creation process 1500 can await a response from the SMML. In this regard, the virtual storage resource creation process 1500 includes a decision 1510 that determines whether a compute platform completion response has been received. When the decision 1510 determines that a compute platform command completion response has not yet been received, a decision 1512 can determine whether an error condition is present. For example, the error condition could be that the newly requested virtual disk already exists and thus cannot be newly created. When the decision 1512 determines that an error condition is present, then the virtual storage resource creation process 1500 can end.

Alternatively, when the decision 1512 determines that an error condition is not present, the virtual storage resource creation process 1500 can return to repeat the decision 1510 and subsequent blocks and thus the virtual storage resource creation process 1500 can await a compute platform command completion response. For example, the computer platform command completion response can indicate that the requested virtual disk has been created. Once the decision 1510 determines that a compute platform command completion response has been received, the virtual disk status and data for the newly created virtual disk can be updated 1514 based on the compute platform command completion response. Following the update 1514 of the virtual disk status and data, the virtual storage resource creation process 1500 can end. Additionally, prior to the virtual storage resource creation process 1500 ending, a user interface can be presented to advise a user that the requested virtual disk was either successfully created or failed for some specified reason.

Figure 15B:
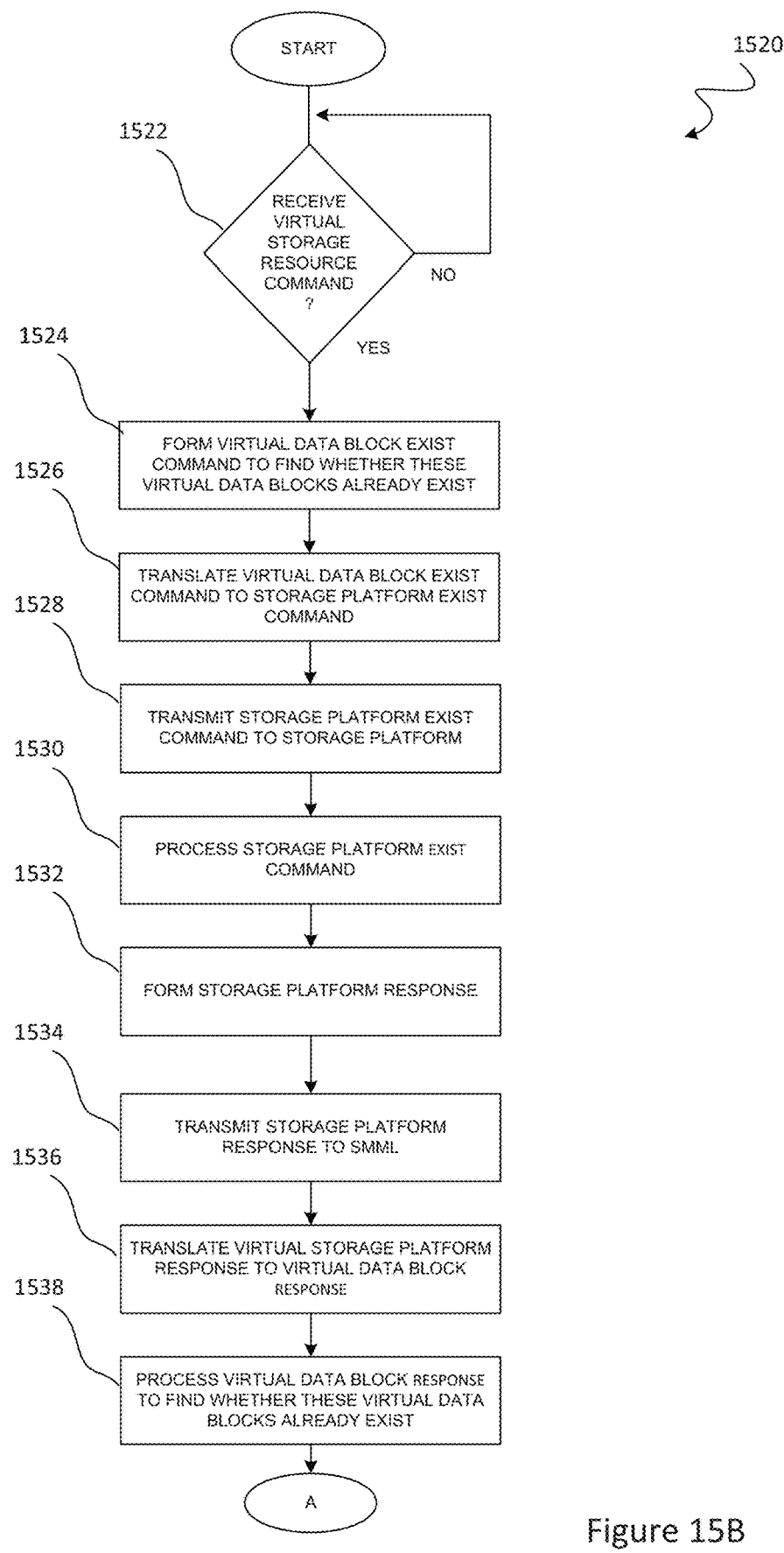
FIGS. 15B-15D are flow diagrams of a virtual storage resource command request process according to one embodiment.
Figure 15C:
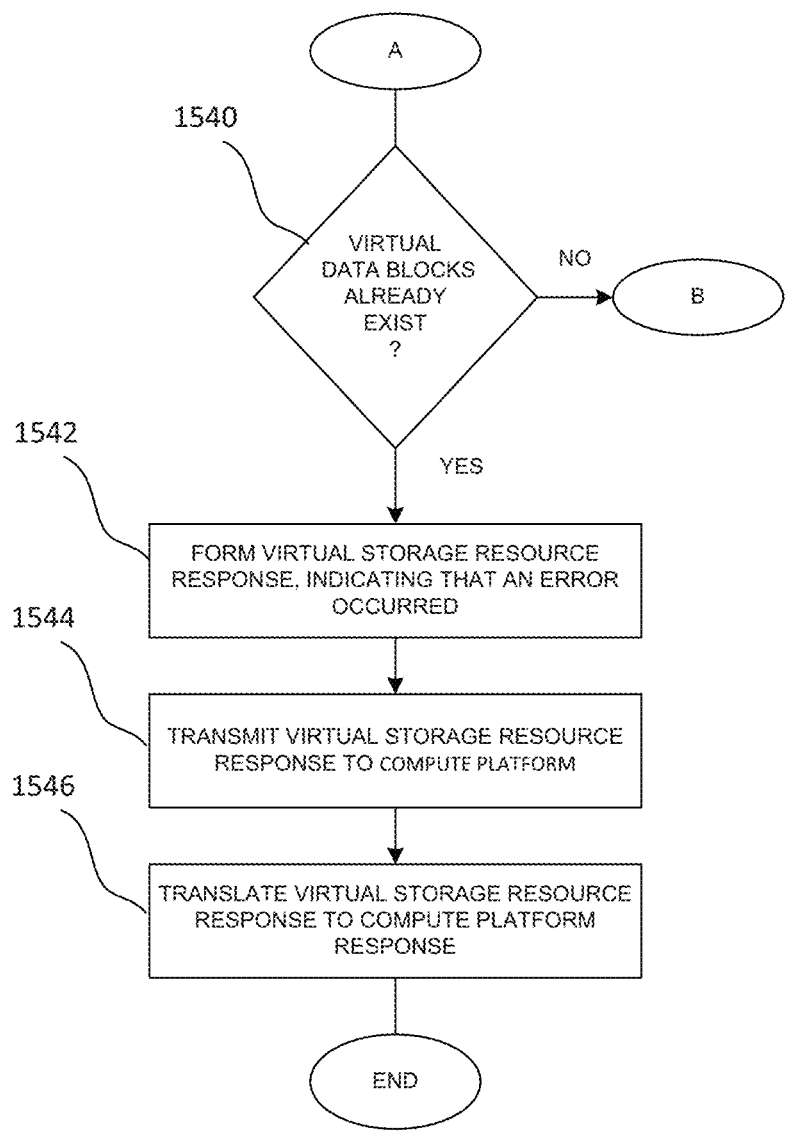
Figure 15D:
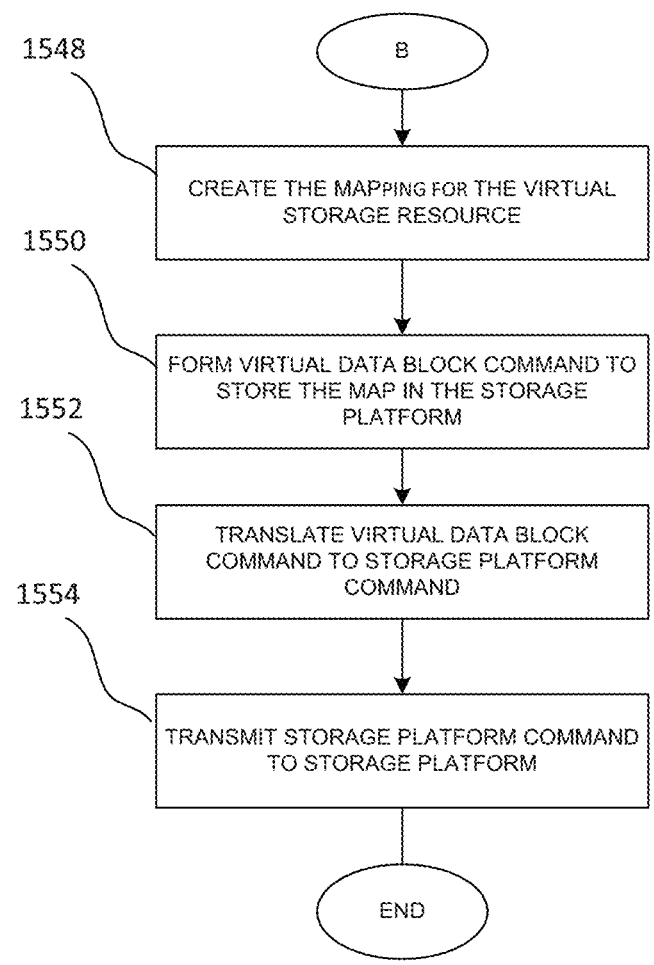

FIGS. 15B-15D are flow diagrams of a virtual storage resource command request process 1520 according to one embodiment. The virtual storage resource command request process 1520 is performed by the storage mobility and management layer (SMML) but maybe also assisted with processing performed at the storage platform or the compute platform.

The virtual storage resource command request process 1520 can begin with a decision 1522 that determines whether a virtual storage resource command has been received. When the decision 1522 determines that a virtual storage resource command has not yet been received, the virtual storage resource command request process 1520 can await such a request.

On the other hand, when the decision 1522 determines that a virtual storage resource command has been received, the virtual storage resource command request process 1520 can continue. In particular, a virtual data block exist command can be formed 1524 to find out whether the one or more corresponding virtual data blocks already exist. Next, the virtual data block exist command can be translated 1526 to a storage platform exist command. Thereafter, the storage platform exist command can be transmitted 1528 to the storage platform.

Thereafter, the storage platform exist command can be processed 1530. Typically, the storage platform exist command would be processed at the storage platform. In response to processing 1530 the storage platform exist command, a storage platform response can be formed 1532. The storage platform response is the response to the storage platform exist command and indicates whether or not virtual data blocks already are provided for in the storage platform. The storage platform response can then be transmitted 1534 to the SMML. Subsequently, at the SMML, the virtual storage platform response can be translated 1536 to a virtual data block response. The virtual data block response can then be processed 1538 to determine whether these virtual data blocks already exist in the virtual data storage.

Following the processing 1538 of the virtual data block response, a decision 1540 determines whether the one or more virtual data blocks already exist. When the decision 1540 determines that the one or more virtual data blocks already exist, a virtual storage resource response can be formed 1542. Here, the virtual storage resource response can indicate that an error occurred. Next, the virtual storage resource response can be transmitted 1544 to the compute platform. Thereafter, at the compute platform (or at a platform integration service thereof), the virtual storage resource response can be translated 1546 to a compute platform response. Following the block 1546, the virtual storage resource command request process 1520 can end.

On the other hand, when the decision 1540 determines that the one or more virtual data blocks do not already exist, then mapping for the virtual storage resource is created 1548.

According to one implementation, the composition service of the SMML can divide a virtual disk address page in pieces of 4 MB size. Every 4 MB piece can be considered a virtual data block with a unique name. The composition service can then create a virtual storage resource, which is implemented as a map. The map, for example, can contain a header with information such as a size of the virtual storage resource, a size of the virtual data block, a UUID of this virtual storage resource, a field called snapshot_counter that is a counter which indicates how many snapshots have been created out of this virtual storage resource. The map can also contain a virtual data block table (VDB table). The VDB table can contain every virtual data block name, and whether a virtual data block is writable or read-only, allocated or unallocated, content addressable or not. The mapping, in one implementation, can be stored in a virtual data block. In this case, a virtual data block command can be formed 1550 to store the mapping in the SMML. The mapping for the virtual storage resource is maintained at the SMML and used for subsequent access to virtual data blocks allocated to the particular virtual storage resource. Next, the virtual data block command can be translated 1552 to a storage platform command. After the virtual data block command has been translated 1552 to the storage platform command, the storage platform command can be transmitted 1554 to the storage platform. Following the transmission of the storage platform command to the storage platform, the virtual storage resource command request process 1520 can end.

Figure 15E:
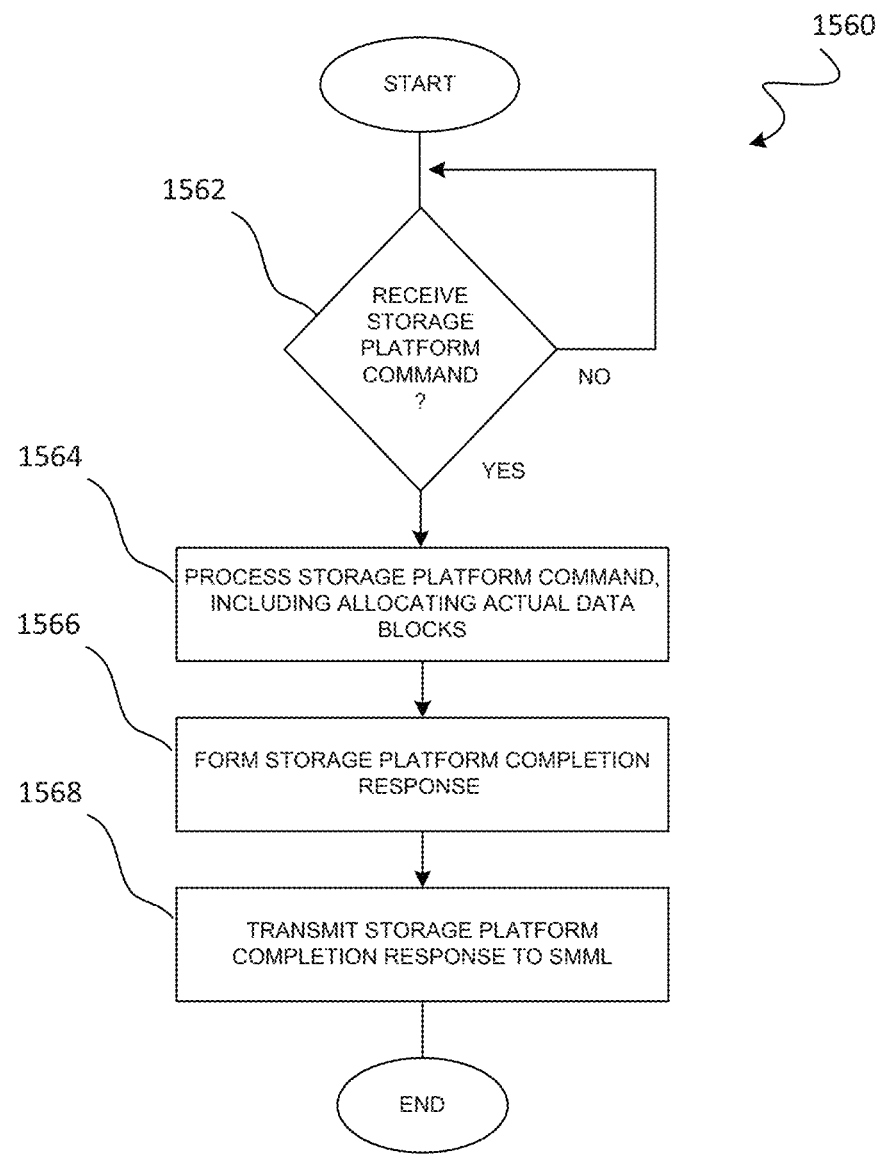
FIG. 15E illustrates a flow diagram of a storage platform command process according to one embodiment.

FIG. 15E illustrates a flow diagram of a storage platform command process 1560 according to one embodiment. The storage platform command process 1560 can, for example, be performed at the storage platform. The storage platform command process 1560 can begin with a decision 1562 that determines whether a storage platform command has been received. When the decision 1562 determines that a storage platform command has not been received, then the storage platform command process 1560 can await the receipt of such a command. On the other hand, once the decision 1562 determines that a storage platform command has been received, the storage platform command can be processed 1564. The processing 1564 of the storage platform command can, for example, include allocating actual data blocks at the storage platform that are to be associated with the virtual data blocks. After the storage platform command has been processed 1564, a storage platform completion response can be formed 1566. Thereafter, the storage platform completion response can be transmitted 1568 to the SMML. After the storage platform completion response has been transmitted 1568, the storage platform command process 1560 can end.

Figure 15F:
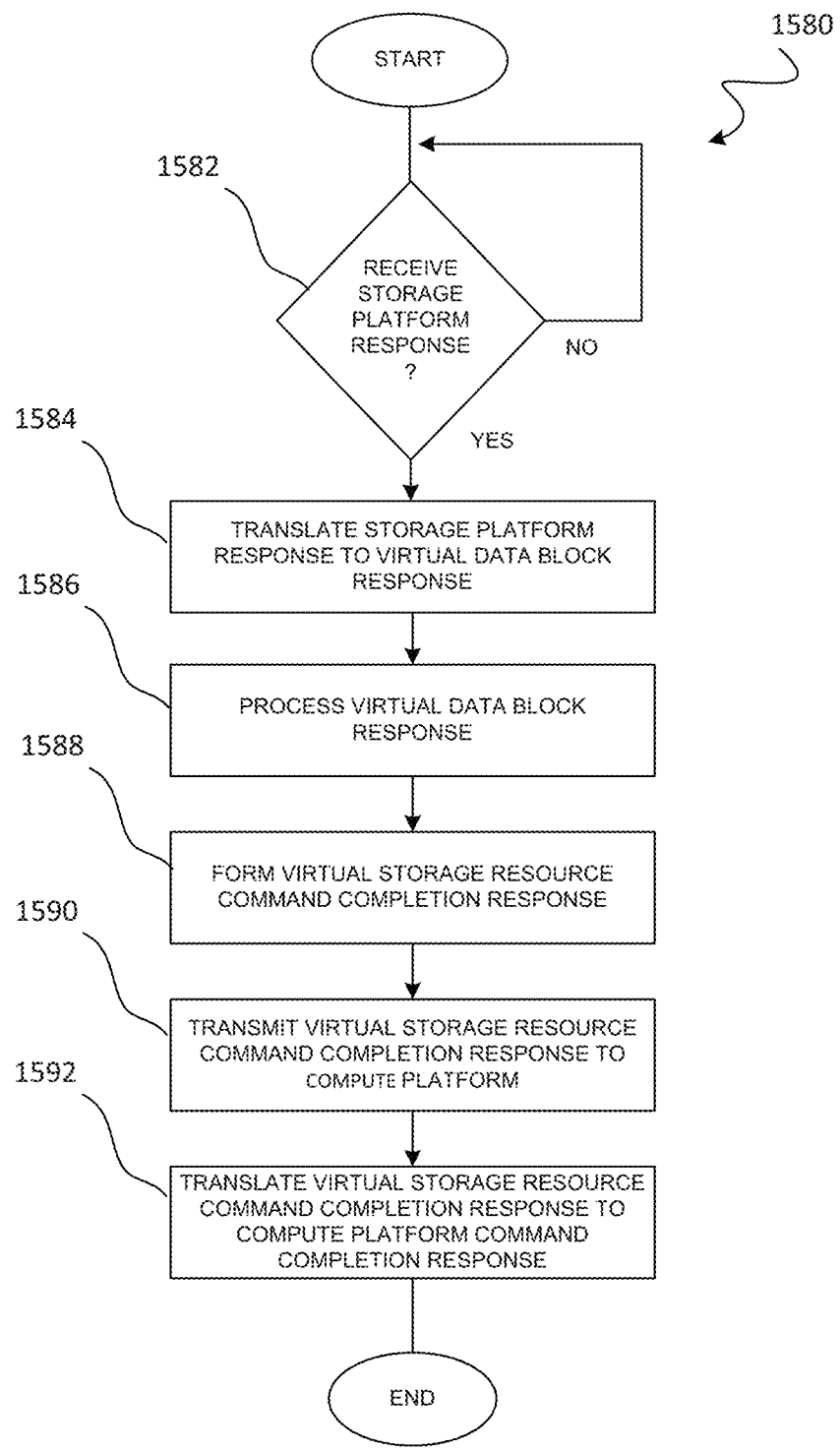
FIG. 15F is a flow diagram of a virtual storage resource command response process according to one embodiment.

FIG. 15F is a flow diagram of a virtual storage resource command response process 1580 according to one embodiment. The virtual storage resource command response process 1580 can, for example, be performed by the SMML and/or wholly or partially assisted or integrated within the compute platform.

The virtual storage response command response process 1580 can begin with a decision 1582 that determines whether a storage platform response has been received. When the decision 1582 determines that a storage platform response has not yet been received, the virtual storage resource command response process 1580 can await such a response.

Once the decision 1582 determines that a storage platform response has been received, then the storage platform response can be processed. In particular, the storage platform response can be translated 1584 to a virtual data block response. Then, the virtual data block response can be processed 1586. Following the processing 1586 of the virtual data block response, a virtual storage resource command completion response can be formed 1588. The virtual storage resource command completion response can then be transmitted 1590 the compute platform. Additionally, at the compute platform, the virtual storage resource command completion response can be translated 1592 to a compute platform command completion response. The compute platform command completion response can then be processed at the compute platform, see FIG. 15A, where additional processing can notify a user, such as through a user interface, that the requested new virtual disk has been successfully created. Following the translation 1592, the virtual storage resource command response process 1580 can end.

Figure 16A:
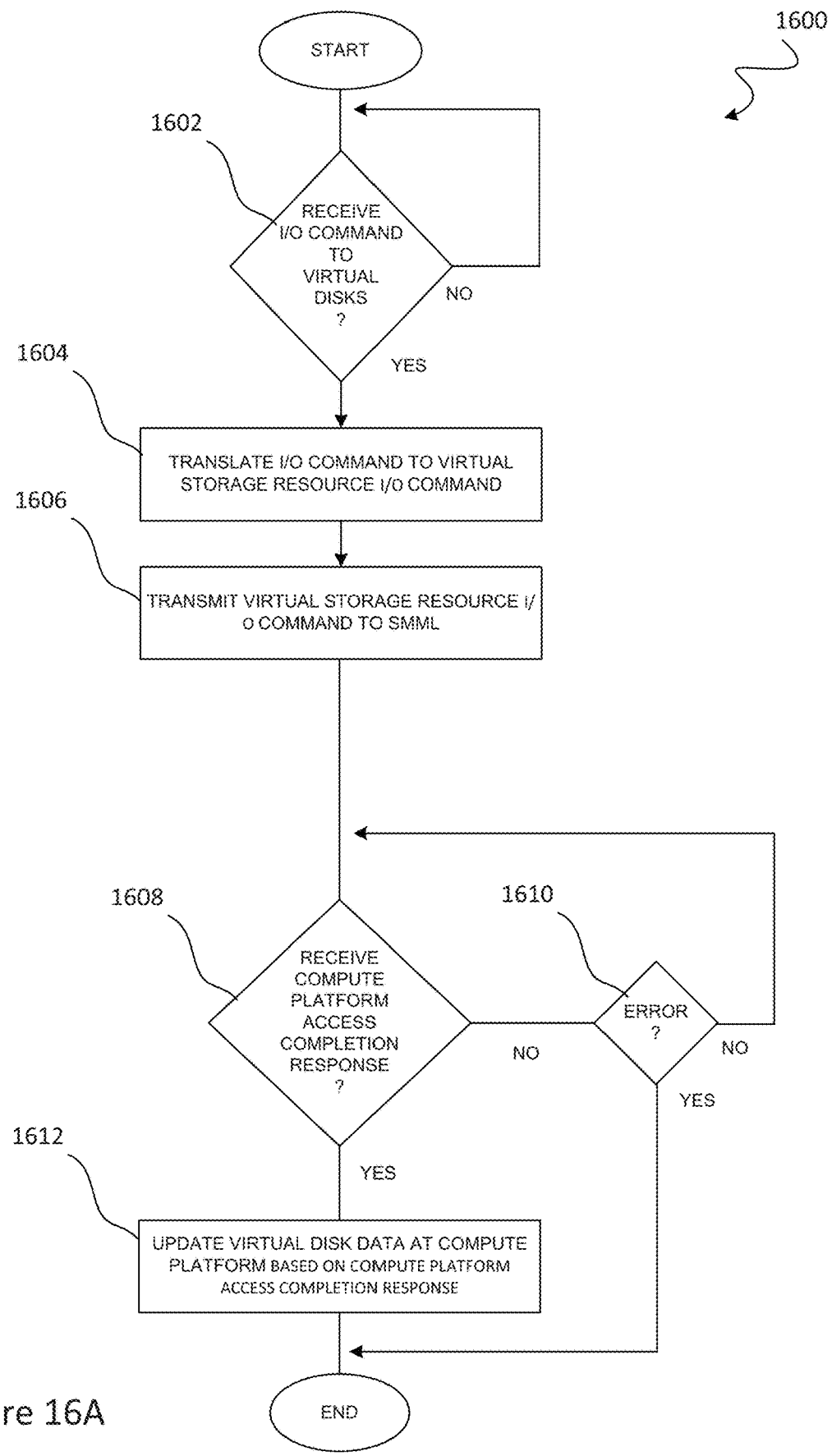
FIG. 16A is a flow diagram of a virtual storage access process according to one embodiment.

FIG. 16A is a flow diagram of a virtual storage access process 1600 according to one embodiment. The virtual storage access process 1600 can, for example, be performed by the compute platform.

The virtual storage access process 1600 can begin with a decision 1602. The decision 1602 can determine whether an I/O command to one or more virtual disks has been received. When the decision 1602 determines that an I/O command to one or more virtual disks has not yet been received, the virtual storage access process 1600 can await such a request.

Once the decision 1602 determines that an I/O command to one or more virtual disks has been received, the I/O command can be translated 1604 to a virtual storage resource I/O command. The virtual storage resource I/O command can then be transmitted 1606 to the storage mobility and management layer (SMML).

Thereafter, a decision 1608 can determine whether a compute platform access completion response has been received. Here, the compute platform is awaiting a response from the SMML, that response is referred to as the compute platform access completion response. When the decision 1608 determines that a compute platform access completion response has not yet been received, a decision 1610 can determine whether an error has occurred. When the decision 1610 determines that an error has not occurred, the virtual storage access process 1600 can return to repeat the decision 1608. Alternatively, when the decision 1610 determines that an error has occurred, the virtual storage access process 1600 can end.

On the other hand, when the decision 1608 determines that a compute platform access completion response has been received, the virtual disk data at the compute platform can be updated 1612 based on the compute platform access completion response. Following the update 1612 to the virtual disk data, the virtual storage access process 1600 can end.

FIGS. 16B-19B illustrate exemplary processing to carry out a virtual storage resource I/O command according to one embodiment.

Figure 16B:
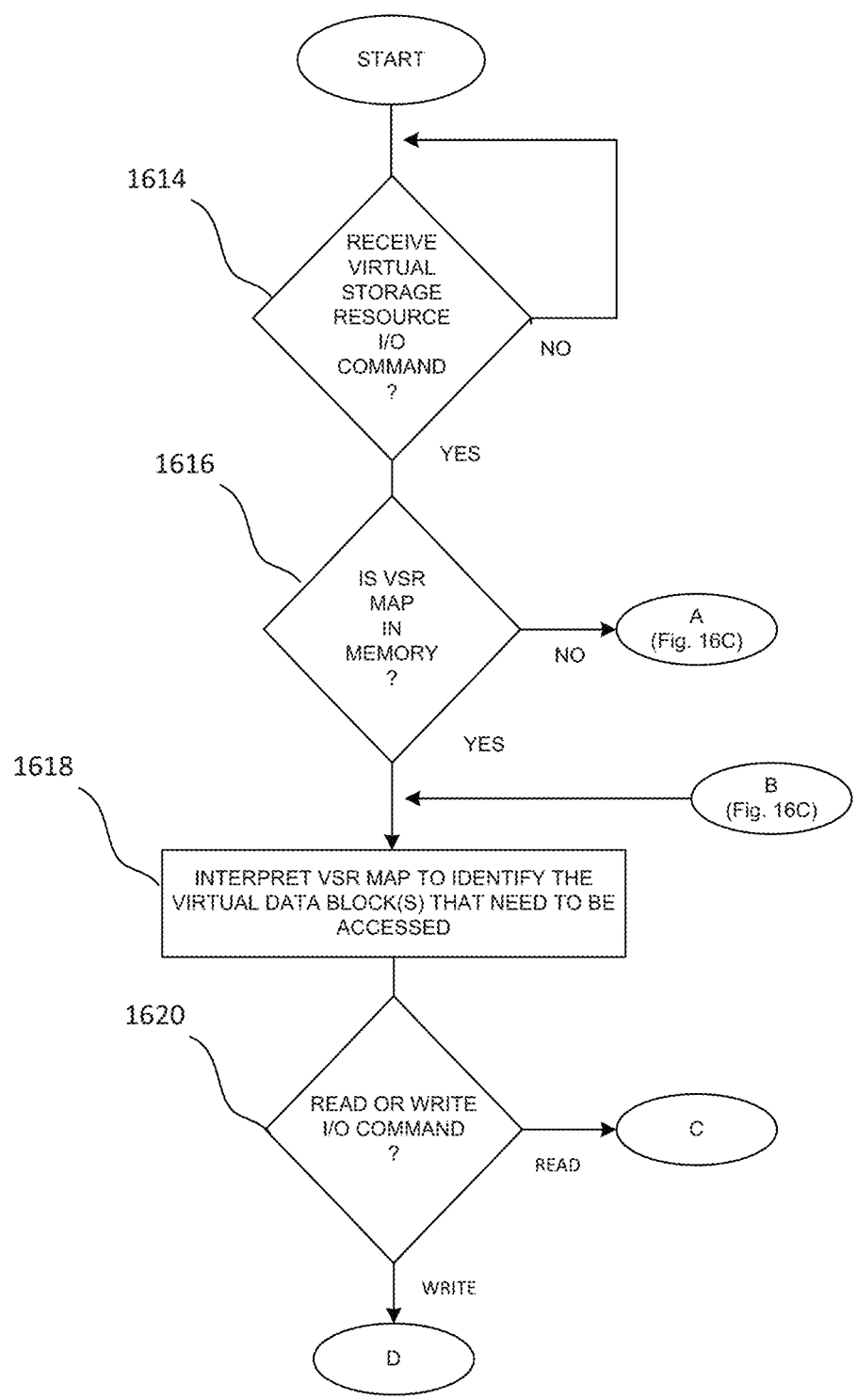
FIGS. 16B-19B illustrate exemplary processing to carry out a virtual storage resource I/O command according to one embodiment.

In FIG. 16B, a decision 1614 determines whether a virtual storage resource I/O command has been received. In one embodiment, the processing associated with FIG. 16B can, for example, be provided at the SMML. When the decision 1614 determines that a virtual storage resource I/O command has not yet been received, the processing can await such a command.

On the other hand, when the decision 1614 determines that a virtual storage resource I/O command has been received, a decision 1616 can determine whether a virtual storage resource (VSR) mapping is present in memory. When the decision 1616 determines that the VSR mapping is not present in memory, the processing shown in FIG. 16C can be performed. On the other hand, when the decision 1616 determines that the VSR mapping is present in memory, the VSR mapping can be interpreted 1618 to identify the one or more virtual data blocks that need to be accessed. Next, a decision 1620 can determine whether the virtual storage resource I/O command is a read or write I/O command. When the decision 1620 determines that the virtual storage resource I/O command is a read command, then processing illustrated in FIGS. 17A and 17B can be performed. On the other hand, when the decision 1620 determines that the virtual storage resource I/O command is a write command, then the processing illustrated in FIGS. 18A-19B can be performed.

Concerning FIGS. 16C-19B, most of processing can, for example, be performed by the SMML but some processing can be wholly or partially performed by the storage platform and/or compute platform.

Figure 16C:
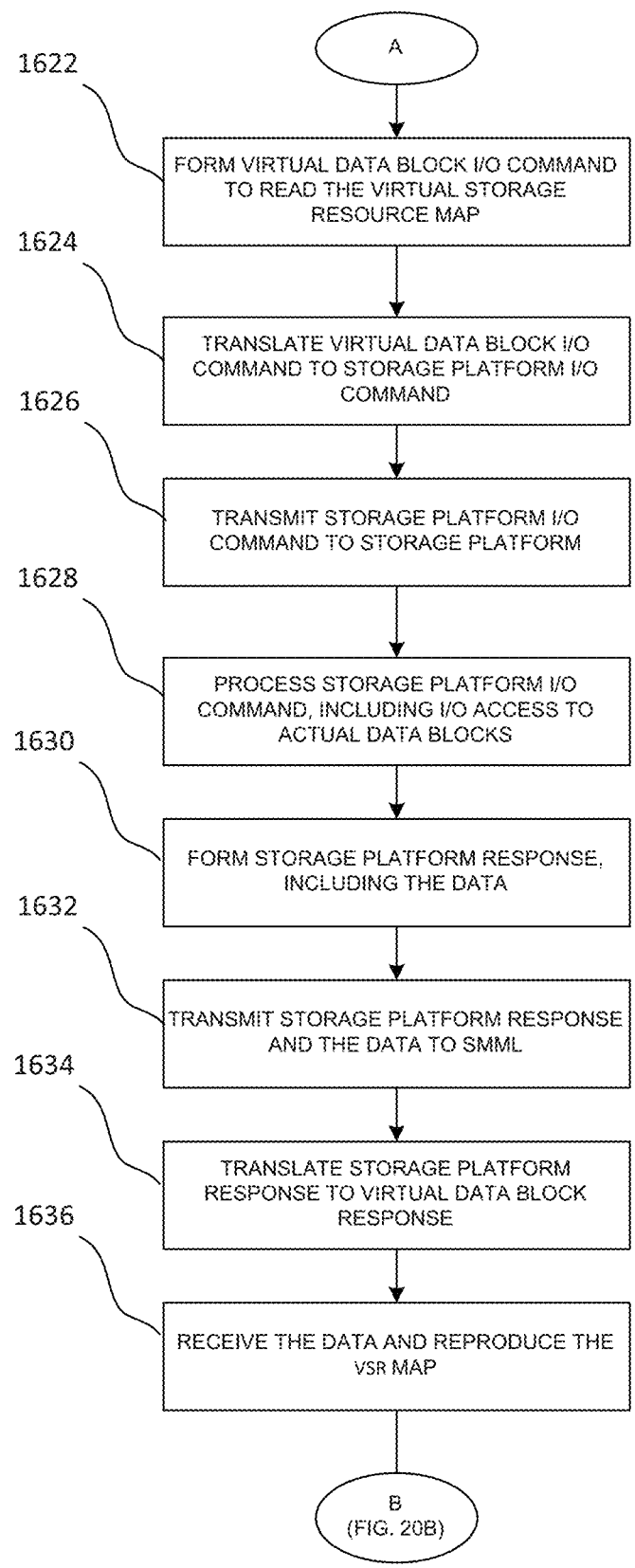

In FIG. 16C, at the SMML, a virtual data block I/O command can be formed 1622 to read the virtual storage resource (VSR) map. The virtual data block I/O command can then be translated 1624 to a storage platform I/O command. The storage platform I/O command can then be transmitted 1626 to the storage platform.

Subsequently, at the storage platform, the storage platform I/O command can be processed 1628. The processing 1628 of the storage platform I/O command can include I/O access to actual data blocks maintained by the storage platform. Then, a storage platform response, including the data from the actual data blocks, can be formed 1630. The storage platform response can then be transmitted 1632 to the SMML.

Thereafter, at the SMML, the storage platform response can be translated 1634 to a virtual data block response. At block 1636, based on the virtual data block response, the data associated with the virtual data block response can be received and also the VSR map can be reproduced. Following the block 1636, the processing can return to perform the block 1618 and subsequent blocks illustrated in FIG. 16B.

Figure 17A:
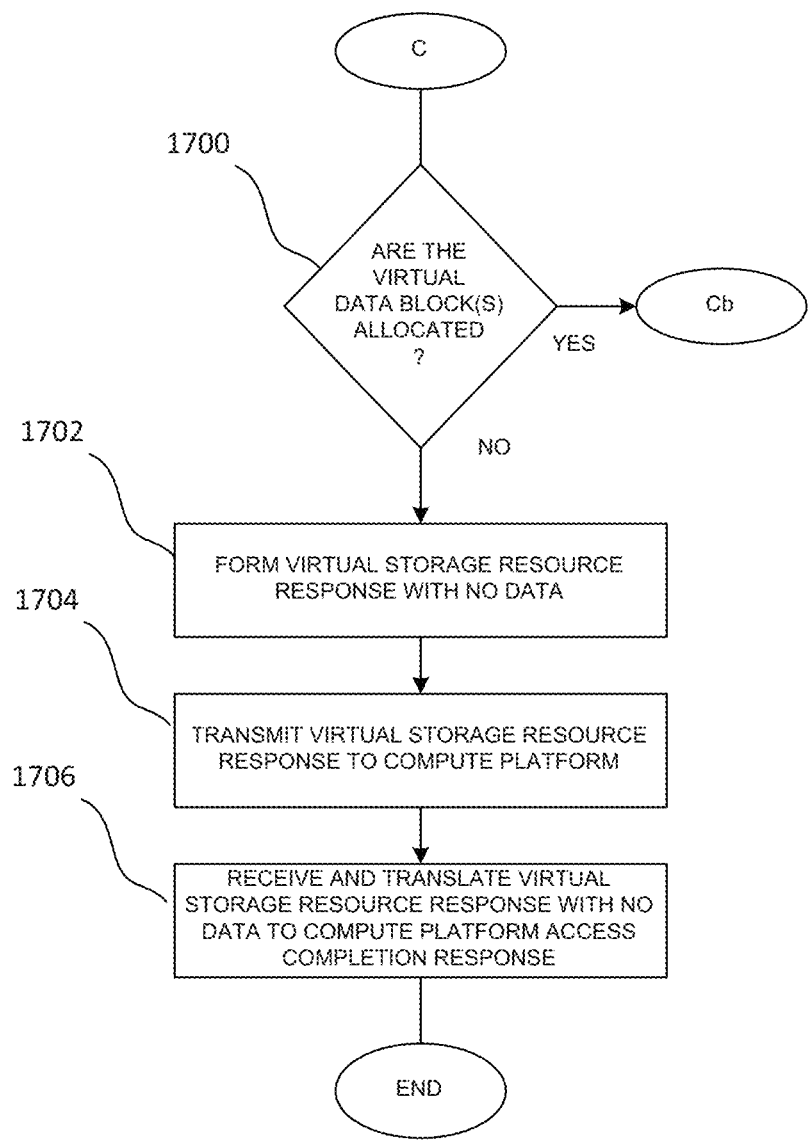

In FIG. 17A, at the SMML, a decision 1700 can determine whether the one or more virtual data blocks are allocated for processing of a read command. Here, the processing can evaluate the VSR mapping to determine whether the one or more data blocks are already allocated. When the decision 1700 determines that the one or more virtual data blocks are not already allocated, a virtual storage resource response can be formed 1702 with no data. In other words, since the one or more virtual data blocks were not allocated, there is no data to return in response to the virtual storage resource I/O command. Hence, the virtual storage resource response can be formed 1702 with no data. Next, the virtual storage resource response can be transmitted 1704 from the SMML to the compute platform.

Thereafter, at the compute platform, the virtual storage resource response with no data can be received and translated 1706. The translation can operate to translate the virtual storage resource response into a compute platform access completion response that is understood by the compute platform. Following the receipt and translation 1706 of the virtual storage resource response, the processing associated with the read command can end.

Alternatively, when the decision 1700 determines that the one or more virtual data blocks are already allocated, then read processing can be performed to acquire and return the requested data. Such associated read processing is described below with respect to FIG. 17B.

Figure 17B:
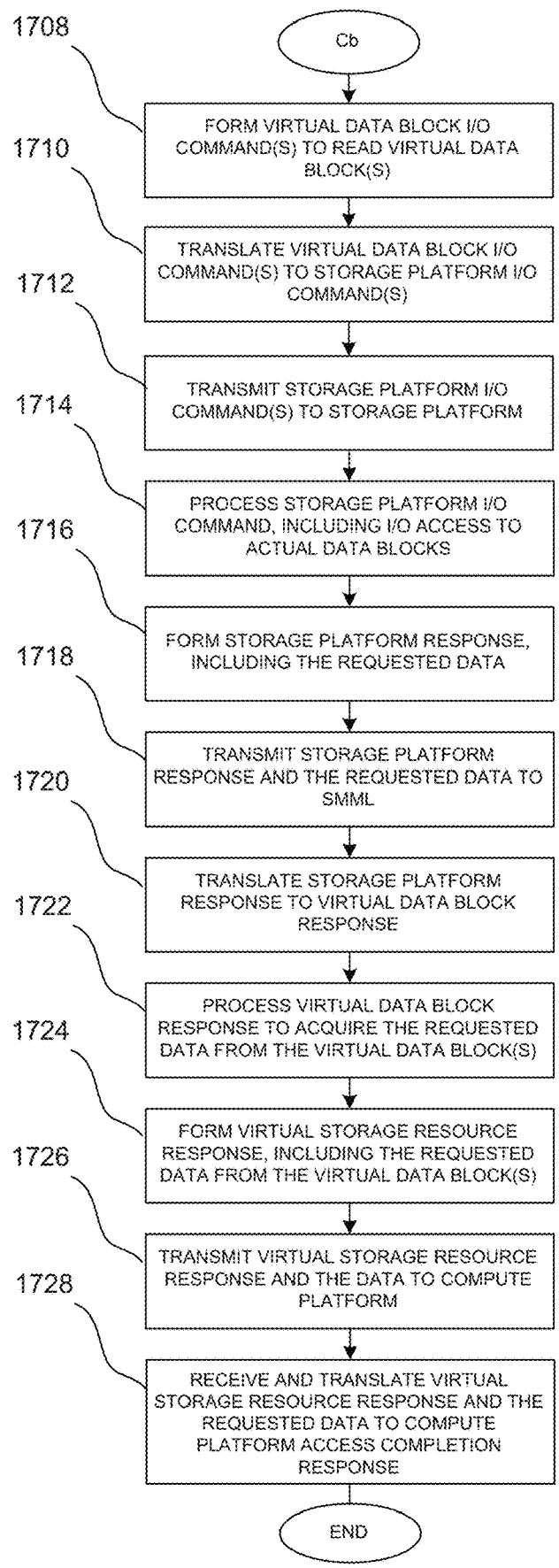

In FIG. 17B, at the SMML, the read processing can continue with processing initially at the SMML. In this regard, one or more virtual data block I/O commands can be formed 1708 to read one or more virtual data blocks. The one or more virtual data block I/O commands can then be translated 1710 to one or more storage platform I/O commands. The one or more storage platform I/O commands can then be transmitted 1712 from the SMML to the storage platform.

At the storage platform, the one or more storage platform I/O commands can be processed 1714. Such processing can include access to actual data blocks maintained by the storage platform. A storage platform response, including the requested data, can then be formed 1716. The storage platform response including the requested data can then be transmitted 1718 to the SMML.

Subsequently, at the SMML, the storage platform response can be translated 1720 into a virtual data block response. The virtual data block response can then be processed 1722 to acquire the requested data from the one or more virtual data blocks. Next, a virtual storage resource response can be formed 1724, with the virtual storage resource response including the requested data acquired from the one or more virtual data blocks. Next, the virtual storage resource response, including the requested data, can be transmitted 1726 to the compute platform. Thereafter, at the compute platform, the virtual storage resource response and the requested data can be received and translated 1728. Following the block 1728, the read processing is complete with the read data having been read.

FIGS. 18A-19B pertained to write processing. When the decision 1620 determines that the I/O command being requested is a write command, then the processing illustrated in FIG. 18A can be utilized.

Figure 18A:
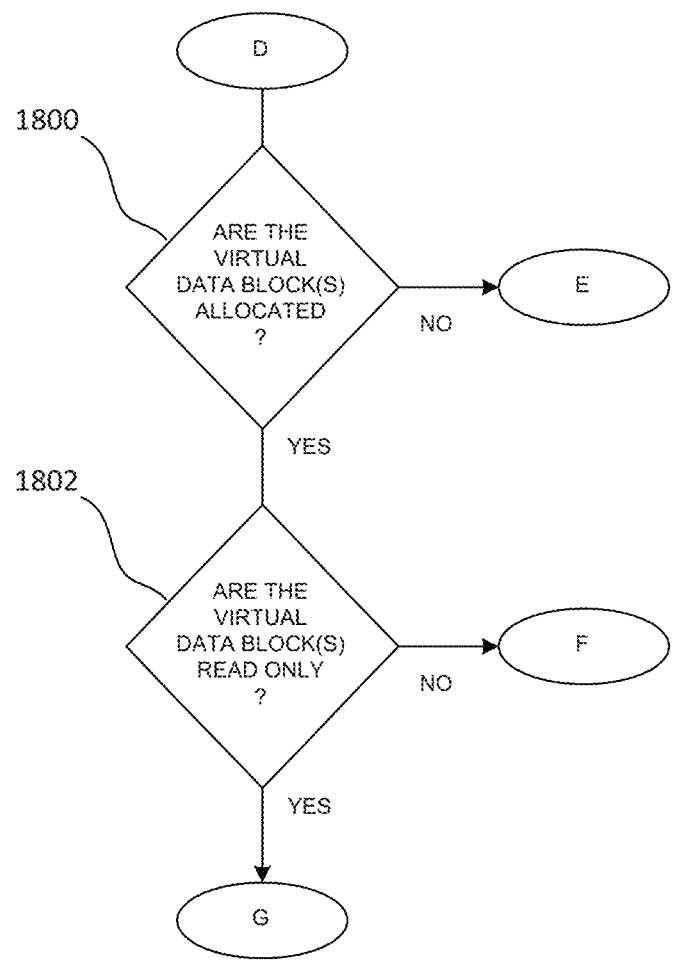

In FIG. 18A, at the SMML, a decision 1800 can determine whether the one or more virtual data blocks are allocated. When the decision 1800 determines that the one or more virtual data blocks have not already been allocated, then processing illustrated in FIGS. 18B and 18C can be performed. On the other hand, when the decision 1800 determines that the one or more virtual data blocks have been allocated, a decision 1802 can determine whether the one or more virtual data blocks are read-only. When the decision 1802 determines that the one or more virtual data blocks are not read-only, then processing illustrated in FIG. 18D can be performed. On the other hand, when the decision 1802 determines that the one or more virtual data blocks are read-only, then the processing illustrated in FIGS. 19A and 19B can be performed.

Figure 18B:
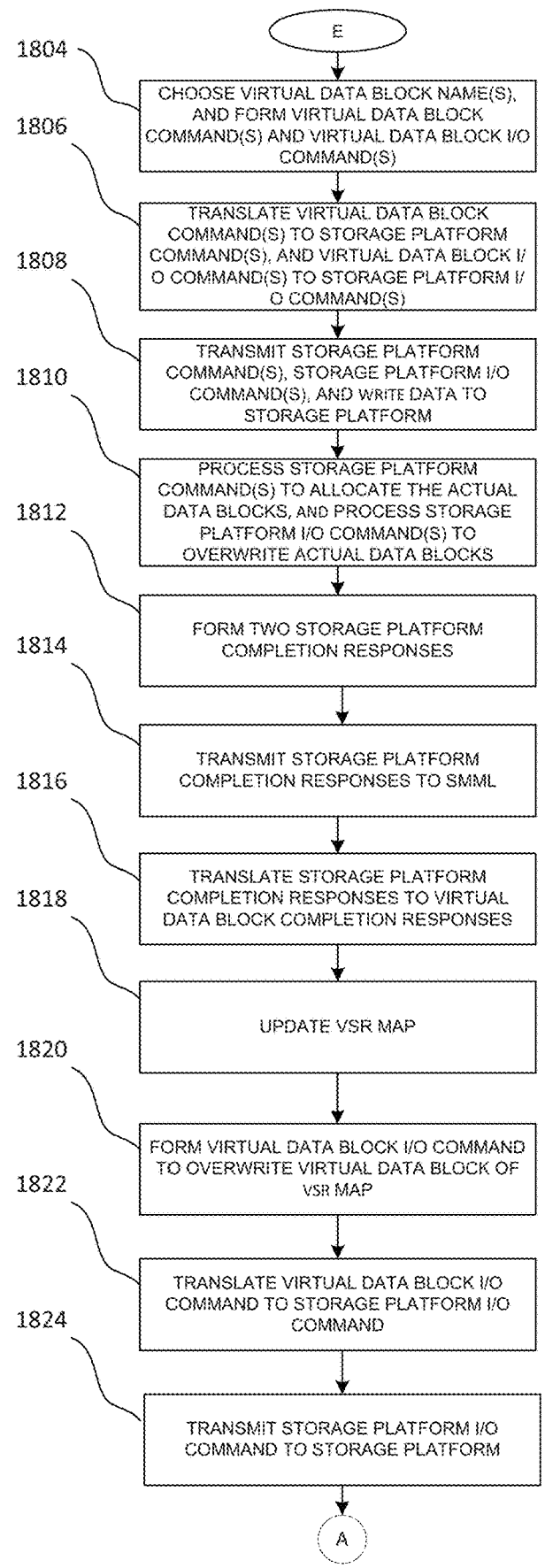
Figure 18C:
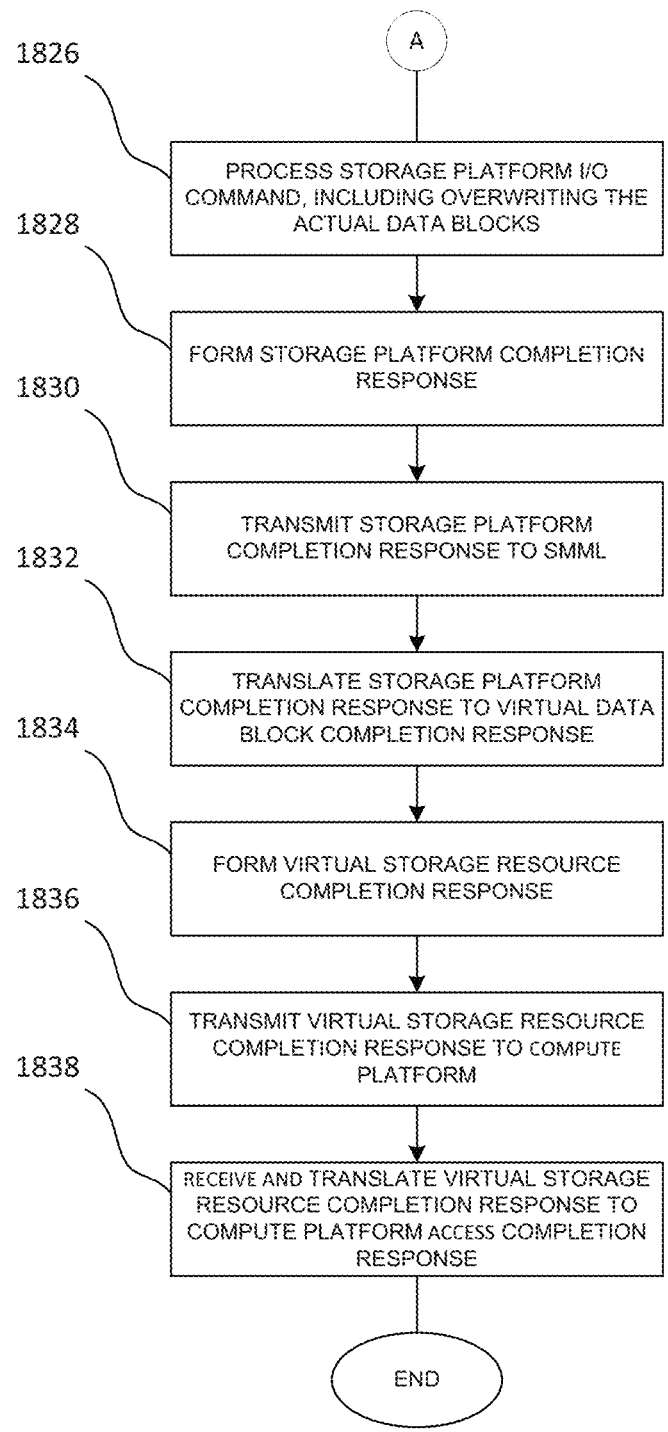

With respect to the processing associated with FIGS. 18B and 18C, the processing serves to allocate the virtual data blocks and then process the write command. In this regard, at the SMML, one or more virtual data block names can be chosen 1804 and used to form one or more virtual data block commands and one or more virtual data block I/O commands. In one implementation, the composition service can choose a name for each of the one or more virtual data blocks, and allocate the virtual data block(s) to store the data that came from the VM or container. The one or more virtual data block I/O command(s) can include overwriting the virtual data block(s) with the data that came from the VM or container.

Subsequently, in a translation operation 1806, the one or more virtual data block commands are translated to one or more storage platform commands, and the one or more virtual data block I/O commands are translated to one or more storage platform I/O commands. Next, the one or more storage platform commands, the one or more storage platform I/O commands, and data to be written (write data) can be transmitted 1808 from the SMML to the storage platform.

Then, at the storage platform, the one or more storage platform commands and the one or more storage platform I/O commands can be processed 1810. The one or more storage platform commands can be processed to allocate one or more actual data blocks. The one or more storage platform I/O commands can also be processed to overwrite the one or more actual data blocks. Next, two storage platform completion responses can be formed 1812. The one response is a storage platform completion response regarding the completion of the storage platform I/O commands, and the other is regarding the completion of the storage platform commands. The storage platform completion responses can then be transmitted 1814 to the SMML.

Subsequently, at the SMML, the storage platform completion responses can be translated 1816 to virtual data block completion responses. The virtual storage resource (VSR) map can then be updated 1818. Next, a virtual data block I/O command can be formed 1820 to overwrite the virtual data block pertaining to the VSR map. The virtual data block I/O command can then be translated 1822 to a storage platform I/O command. Thereafter, the storage platform I/O command can be transmitted 1824 to the storage platform.

After the storage platform I/O command is received at the storage platform, the storage platform can process 1826 the storage platform I/O command. The processing 1826 can include overwriting the actual data blocks maintained by the storage platform. After the storage platform I/O command has been processed 1826, a storage platform completion response can be formed 1828. The storage platform completion response can then be transmitted 1830 the SMML.

When the storage platform completion response is received at the SMML, the storage platform completion response can be translated 1832 to a virtual data block completion response. Next, a virtual storage resource completion response can be formed 1834. The virtual storage resource completion response can then be transmitted 1836 to the compute platform. Subsequently, at the compute platform, the virtual storage resource completion response can be received and translated 1838 to a compute platform access completion response.

Figure 18D:
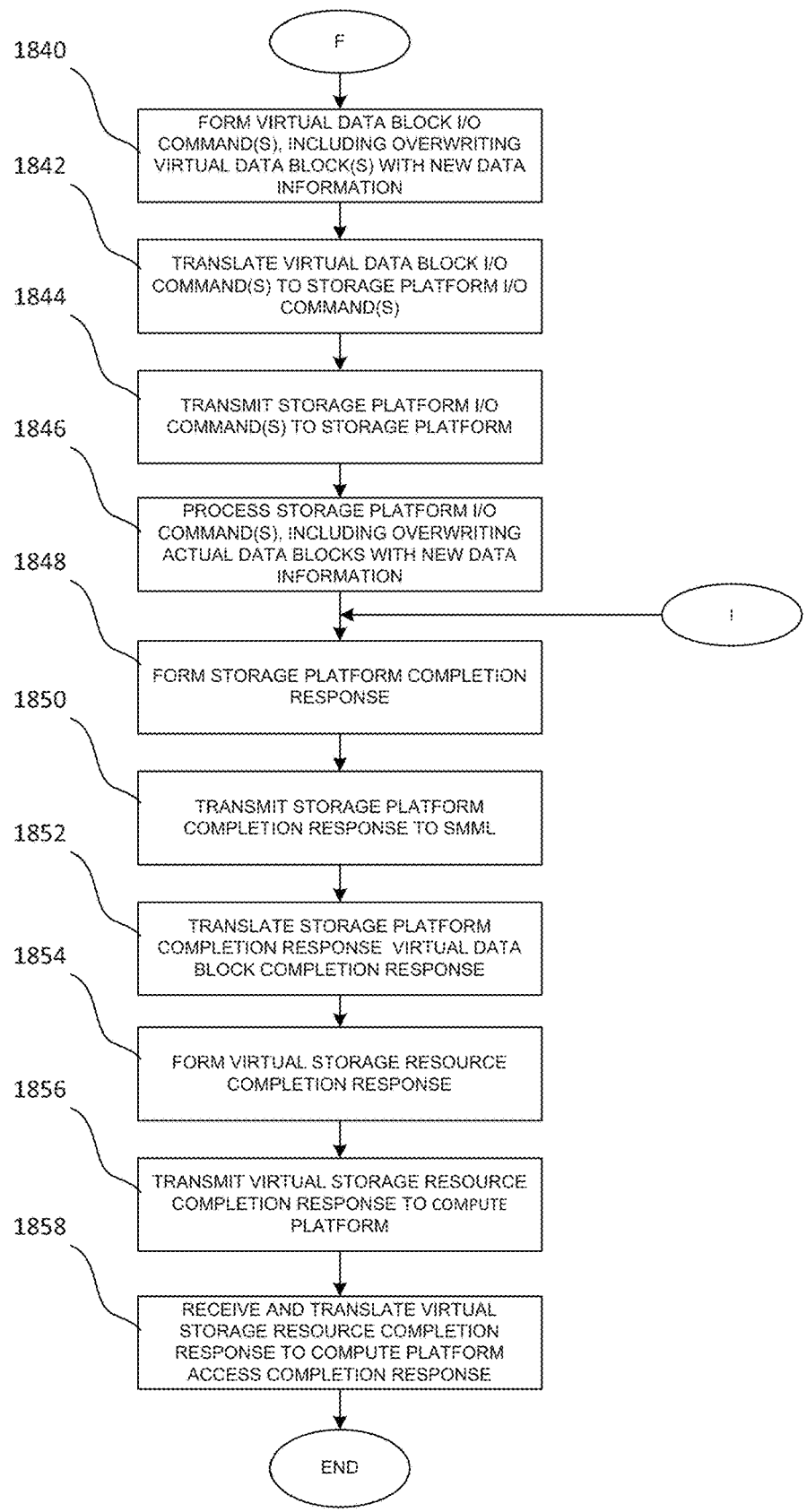

As previously noted, when the decision 1802 determines that the one or more virtual data blocks are not read-only, then processing illustrated in FIG. 18D can be performed. With respect to the processing illustrated in FIG. 18D, the processing pertains to a write command to one or more virtual data blocks that are not read-only. In this regard, at the SMML, one or more virtual data block I/O commands can be formed 1840. The virtual data block I/O commands can specify one or more virtual data blocks to be overwritten with new data information. Next, the one or more virtual data block I/O commands can be translated 1842 to one or more storage platform I/O commands. The one or more storage platform I/O commands can then be transmitted 1844 to the storage platform.

Thereafter, at the storage platform, the one or more storage platform I/O commands can be processed 1846. The processing 1846 can perform the write command by overwriting one or more actual data blocks with the new data information. A storage platform completion response can then be formed 1848. The storage platform completion response can then be transmitted 1850 to the SMML.

Subsequently, at the SMML, the storage platform completion response can be translated 1852 to a virtual data block completion response. The virtual storage resource completion response can then be formed 1854. The virtual storage resource completion response can then be transmitted 1856 to the compute platform. Subsequently, at the compute platform, the virtual storage resource completion response can be received and translated 1858 to a compute platform access completion response, which denotes completion of the write command.

Figure 19A:
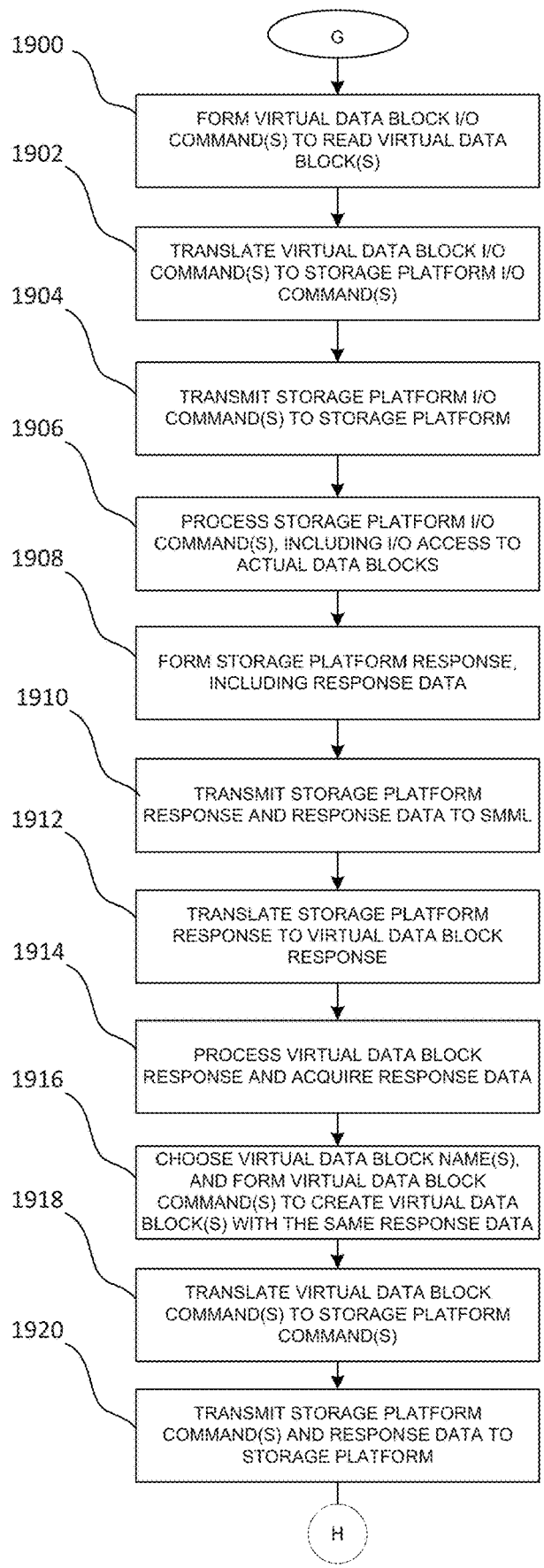
Figure 19B:
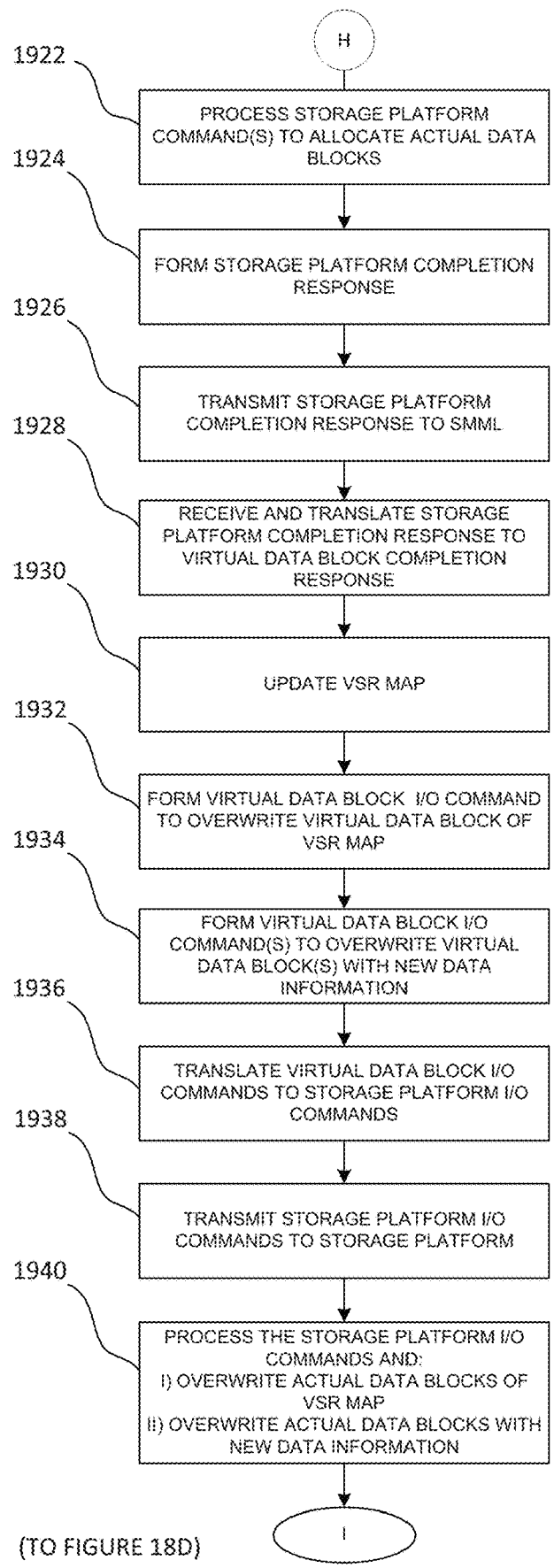

As previously noted, when the decision 1802 determines that the one or more virtual data blocks are read-only, then processing illustrated in FIGS. 19A-19B can be performed. With respect to the processing illustrated in FIGS. 19A-19B, the processing pertains to a write command to one or more virtual data blocks that are read-only. Here, the one or more virtual data blocks are probably shared between multiple virtual storage resources, e.g. shared due to snapshots and clones or content-addressable VDBs. As such, the one or more virtual data blocks should not be overwritten without first copying them (because one or more virtual storage resources could lose part of their data and consequently one or more virtual disks would lose part of their data).

Nevertheless, with respect to the processing illustrated in FIGS. 19A-19B and performed at the SMML, one or more virtual data block I/O commands can be formed 1900 to read one or more virtual data blocks. The one or more virtual data block I/O commands can then be translated 1902 to one or more storage platform I/O commands. The one or more storage platform I/O commands can then be transmitted 1904 to the storage platform.

Thereafter, at the storage platform, the one or more storage platform I/O commands can be processed 1906. The processing 1906 can include I/O access to the one or more actual data blocks maintained at the storage platform. Then, a storage platform response can be formed 1908. The storage platform response can include response data obtained from the I/O access to the one or more actual data blocks. The storage platform response and the response data can then be transmitted 1910 to the SMML.

Next, at the SMML, the storage platform response can be translated 1912 to a virtual data block response. The virtual data block response can be processed 1914 to acquire the response data. Next, one or more virtual data blocks are created 1916, each one containing the corresponding part of the response data. In doing so, one or more virtual data block names can be chosen, and one or more virtual data block commands can be formed. The one or more virtual data block commands can create one or more virtual data blocks that altogether contain the response data. This can be referred to as creating a snapshot at the SMML. Next, the one or more virtual data block commands can be translated 1918 to one or more storage platform commands. Thereafter, the one or more storage platform commands and the response data can be transmitted 1920 to the storage platform.

Thereafter, at the storage platform, the one or more storage platform commands can be processed 1922 to allocate one or more actual data blocks. Then, a storage platform completion response can be formed 1924. The storage platform completion response can then be transmitted 1926 to the SMML.

Subsequently, at the SMML, the storage platform completion response can be received and translated 1928 into a virtual data block completion response. Next, the virtual storage resource (VSR) map can be updated 1930 based on the virtual data block completion response. Next, a virtual data block I/O command can be formed 1932 to overwrite the virtual data block pertaining to the VSR map. In addition, one or more virtual data block I/O commands can be formed 1934 to overwrite the one or more virtual data blocks with new data information. Next, the one or more virtual data block I/O commands can be translated 1936 to storage platform I/O commands. The one or more storage platform I/O commands can then be transmitted 1938 to the storage platform.

Thereafter, at the storage platform, the one or more storage platform I/O commands can be processed 1940. The processing 1940 can include overwriting the actual data blocks pertaining to the VSR map, and overwriting the actual data blocks with new data information. Following the processing 1940, the write command processing can proceed to block 1848 and subsequent blocks illustrated in FIG. 18D to provide additional processing.

Figure 20A:
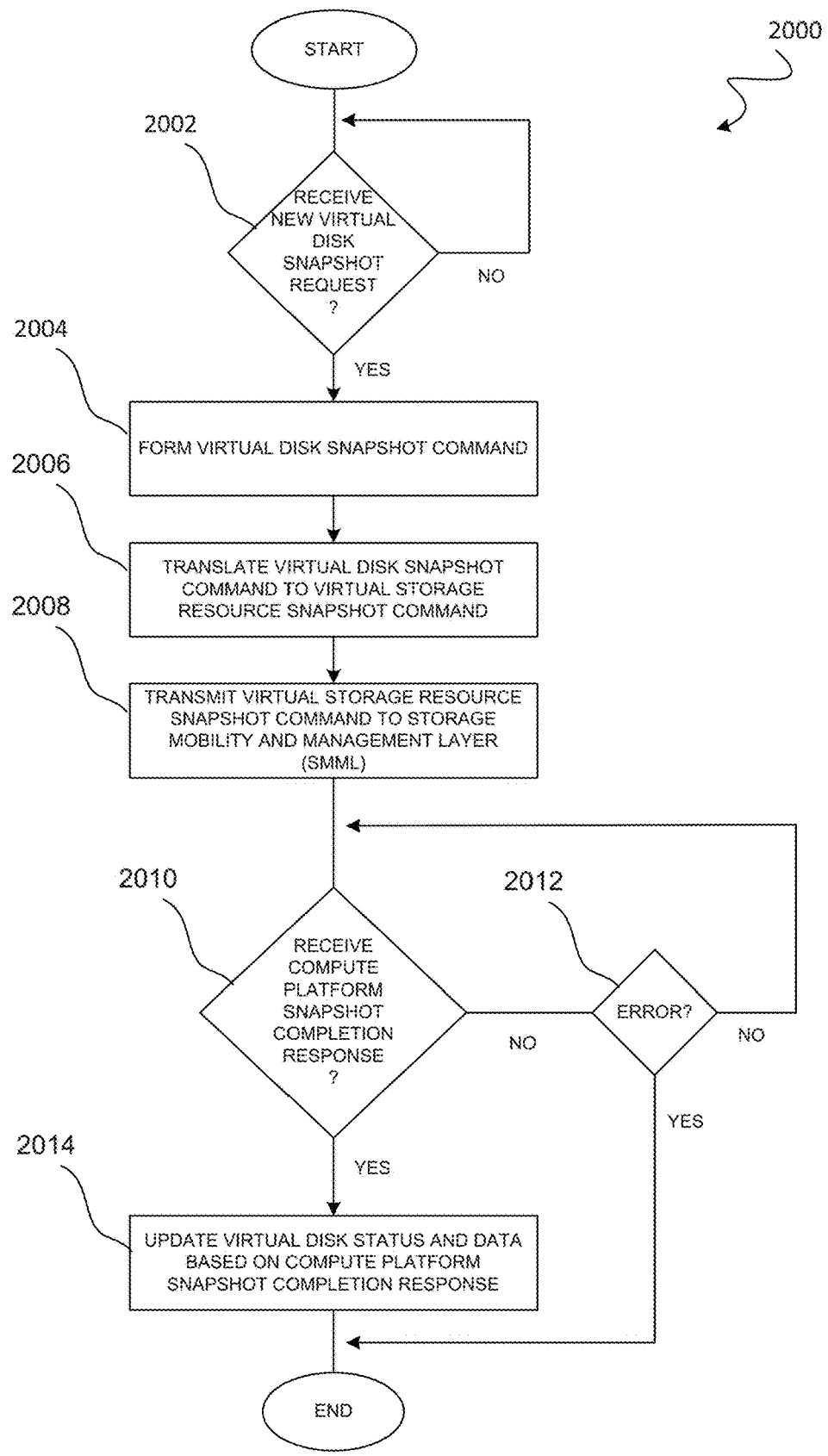
FIGS. 20A and 20B are flow diagrams of a virtual disk snapshot process according to one embodiment.
Figure 20B:
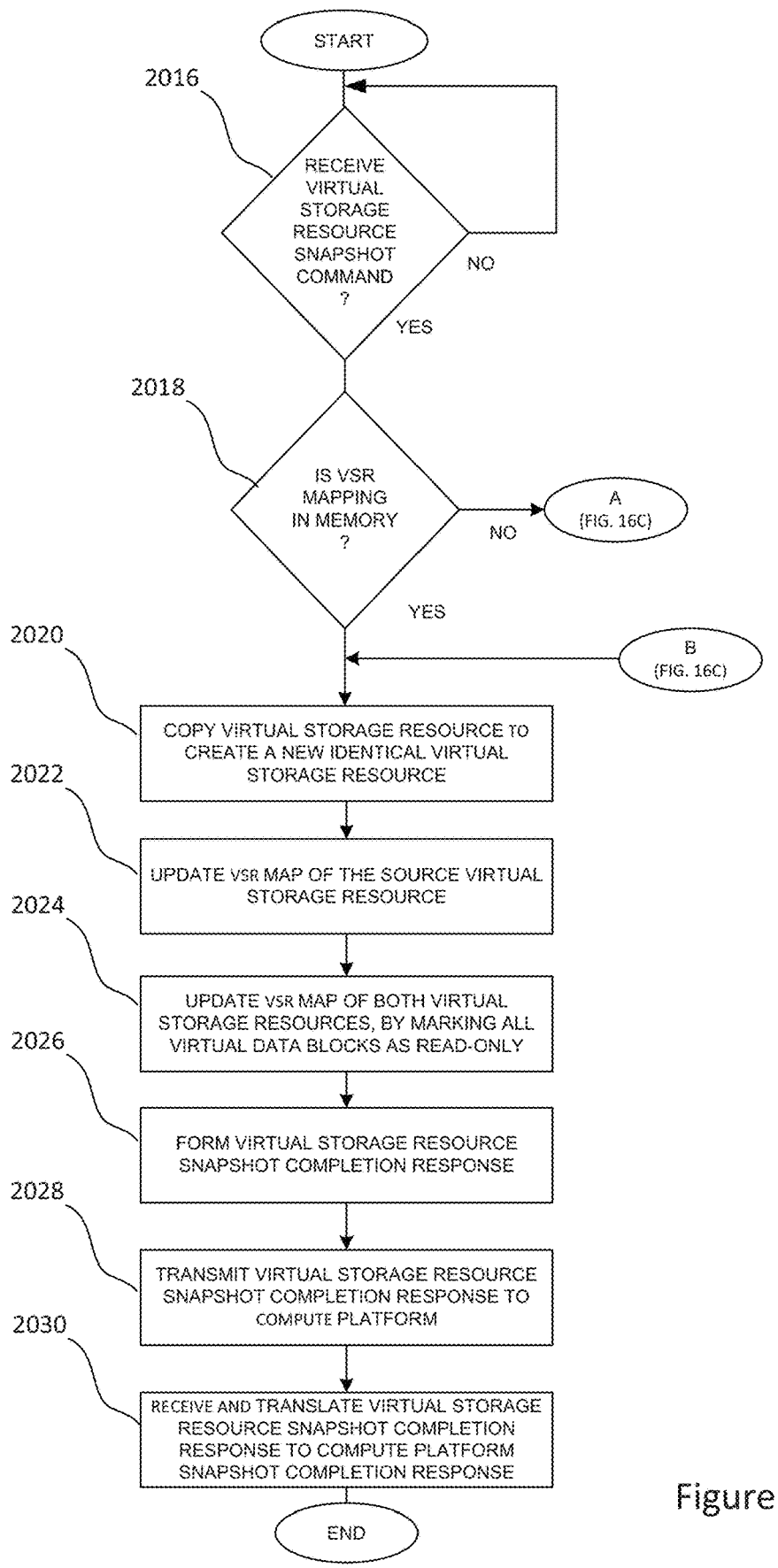

FIGS. 20A and 20B are flow diagrams of a virtual disk snapshot process 2000 according to one embodiment. The virtual disk snapshot process 2000 concerns operations to create a snapshot of a virtual storage resource.

In FIG. 20A, the processing for the illustrated portion of the virtual disk snapshot process 2000 can, for example, be performed by the compute platform. The virtual disk snapshot process 2000 can begin with a decision 2002. The decision 2002 can determine whether a new virtual disk snapshot request has been received. When the decision 2002 determines and that a new virtual disk snapshot request has not yet been received, the virtual disk snapshot process 2000 can await such a request.

Once the decision 2002 determines that a new virtual disk snapshot request has been received, a virtual disk snapshot command can be formed 2004. Next, the virtual disk snapshot command can be translated 2006 to a virtual storage resource snapshot command. The virtual storage resource snapshot command can then be transmitted 2008 to the storage mobility and management layer (SMML).

Thereafter, a decision 2010 can determine whether a compute platform snapshot completion response has been received. Here, the compute platform is awaiting a response from the SMML. The response is referred to as the compute platform snapshot completion response. When the decision 2010 determines that a compute platform snapshot completion response has not yet been received, a decision 2012 can determine whether an error has occurred. When the decision 2012 determines that an error has not occurred, the virtual disk snapshot process 2000 can return to repeat the decision 2010. Alternatively, when the decision 2012 determines that an error has occurred, the virtual disk snapshot process 2000 can end.

On the other hand, when the decision 2010 determines that a compute platform snapshot completion response has been received, virtual disk status and data at the compute platform can be updated 2014 based on the compute platform snapshot completion response. Following the update 2014 to the virtual disk status and the virtual disk data, the virtual disk snapshot process 2000 can end.

FIG. 20B illustrates exemplary processing to carry out a virtual storage resource snapshot command. In one embodiment, the processing associated with FIG. 20B can, for example, be principally provided at the SMML. A decision 2016 determines whether a virtual storage resource snapshot command has been received. When the decision 2016 determines that a virtual storage resource snapshot command has not yet been received, the processing can await such a command.

On the other hand, when the decision 2016 determines that a virtual storage resource snapshot command has been received, a decision 2018 can determine whether a virtual storage resource (VSR) mapping is present in memory. When the decision 2018 determines that the VSR mapping is not present in memory, the processing shown in FIG. 16C can be performed. On the other hand, when the decision 2016 determines that the VSR mapping is present in memory (as well as following the processing in FIG. 16C when the VSR mapping was not previously present in memory), the virtual storage resource can be copied 2020 to create a new identical virtual storage resource. In one implementation, the only difference is that the new virtual storage resource, which is the snapshot of the source virtual storage resource, has a different mapUUID from the source virtual storage resource.

The map of the source virtual storage resource can then be updated 2022. Here, the map can be updated 2022 to indicate the number of snapshots that have been taken of the source virtual storage resource. For example, a snapshot counter for the source virtual storage resource can be incremented. Additionally, the map (VSR mapping) of both the new and source virtual storage resources can be updated 2024 by marking all corresponding virtual data blocks as read-only. Thereafter, a virtual storage resource snapshot completion response can be formed 2026. The virtual storage resource snapshot completion response can then be transmitted 2028 to the compute platform. Next, at the compute platform, the virtual storage resource snapshot completion response can be translated 2030 to a compute platform snapshot completion response. Following the receipt and translation 2030 of the virtual storage resource snapshot completion response, the virtual disk snapshot processing in FIG. 20B can end.

A virtual storage resource, which is implemented as a map, can be stored as a virtual data block. The virtual data block has a name, and it depends on the compute platform, which typically gives a UUID to every virtual disk that it creates. For example, the compute platform can create a virtual disk and gives it the UUID 0001-0001-0001. The platform integration service can choose a name for the virtual storage resource. This name, for example, can have a prefix and the UUID that the compute platform has chosen. For example, a name could be:

cinder_vol_0001-0001-0001

That is, prefix_$UUID, where: prefix=cinder_vol and $UUID=0001-0001-0001

Then, the composition service creates a virtual storage resource that has the name that the platform integration service has chosen, in this case cinder_vol_0001-0001-0001. This is a named virtual data block for a virtual storage resource.

Every map of a virtual storage resource can include a UUID. Moreover, the map of a virtual storage resource can include a virtual data block table that contains the names of all the virtual data blocks, and whether the associated virtual data block is writable or read-only, allocated or unallocated, content addressable or not. These virtual data blocks contain the data of the virtual storage resource. The name of each virtual data block depends on the UUID of the map, the value of the snapshot counter, and the row index number on the virtual data block table. For example, if a virtual storage resource has a map UUID 1110-0001-1001 and snapshot counter equal to 3, then a virtual data block that lies on row 7, can have a name like the following: 1110-0001-1001_3_7 ($mapUUID_$snapshot_counter_$index)

The composition service of the SMML can perform asynchronous hashing of the virtual data blocks using a hashing function. In one embodiment, a hashing algorithm such as SHA-256 function (Secure Hash Algorithm 2) can be used. This can be performed as an offline procedure that the composition service can perform on administrator defined intervals. The composition service can read the map of a virtual storage resource, and then (i) reads the data of every virtual data block of this virtual storage resource, (ii) hashes the data, and (iii) produces a hexadecimal string. For example, to hash the virtual data blocks of a virtual storage resource, the composition service of the SMML can read the data of a virtual data block which has the name 1110-0001-1001_3_7, hashes the data, and produces a hexadecimal string like the following:

7f83b1657ff1fc53b92dc18148a1d65dfc2d4b1fa3d6772-84adfd200176d9069

Then, the composition service can create a new virtual data block with this name and the exact same data as the named virtual data block, and update the map of the virtual storage resource to (i) change the virtual data block name and (ii) mark the VDB as content-addressable and read-only. This is a content addressable virtual data block. However, the composition service does not delete the named virtual data block because it is possible that another virtual storage resource points to the same virtual data block. For example, a snapshot that came from a virtual storage resource that had this virtual data block, will also have this virtual data block with the same name. The content addressable virtual data blocks are always read-only.

In one embodiment, every time the composition service of the SMML hashes a named virtual data block, it creates a file that has the name of the named virtual data block, and the ending ".hash". For example, when the composition service hashes the virtual data block 1110-0001-1001_3_7, it creates a file with the name 1110-0001-1001_3_7.hash. This file contains the hexadecimal string that was derived when the composition service hashed the data of this virtual data block. The composition service, before hashing the data of a virtual data block, checks whether a .hash file with the name of the virtual data block already exists. If it does exist, then it does not have to hash the data of the virtual data block because it can find the hexadecimal string in the .hash file.

Read/write operations for content-addressable virtual data blocks are exactly the same as the read/write operations for the read-only named virtual data blocks.

Given the hashing process, there may be many virtual data blocks with the exact same name. This means that the data of these virtual data blocks is the same and is not stored multiple times. The content addressable virtual data blocks ensure that there are not any duplicate copies of repeating data. Data deduplication not only improves the storage platform's utilization in terms of capacity, but also reduces the time that is needed when sharing data among different SMML installations.

For example, consider a situation in which a Windows VM snapshot was taken and then cloned it two times. The snapshot and the two clones have the same data and the same virtual data block names, so the composition service need not allocate new virtual data blocks. However, assume that a user installs Windows updates to both the clones. This action demands the allocation of new virtual data blocks with different names from the initial data blocks. Moreover, the virtual data block names will be different between the two clones. For instance, a virtual data block of the snapshot can have the name 1110-0001-1001_3_7. This virtual data block exists on both clones before installing the Windows updates. After the Windows update, the two clones will not have this virtual data block. Instead, new virtual data blocks will have been allocated with different names, but the exact same data. For example, these virtual data blocks might now have the names: 0111-1001-1001_3_7 and 1111-0001-0001_3_7. They have different names, but they have the same data. As such, they are duplicate virtual data blocks, and thus the same data is stored two times on the storage platform. When the composition service hashes these virtual data blocks, they will have the same hexadecimal string as a name. As an example, the hexadecimal string might be:

7d54b1657ff1fc26b92dc18148a1d65dfc2d4b1fa3d6772-84abfd200176d8790

Later, when a garbage collection process runs, it will delete the named virtual data blocks 0111-1001-1001_3_7 and 1111-0001-0001_3_7, but not the content addressable one. Thus, there will be only one virtual data block that will be part of two virtual storage resources, and thus duplicate data is eliminated.

Figure 21A:
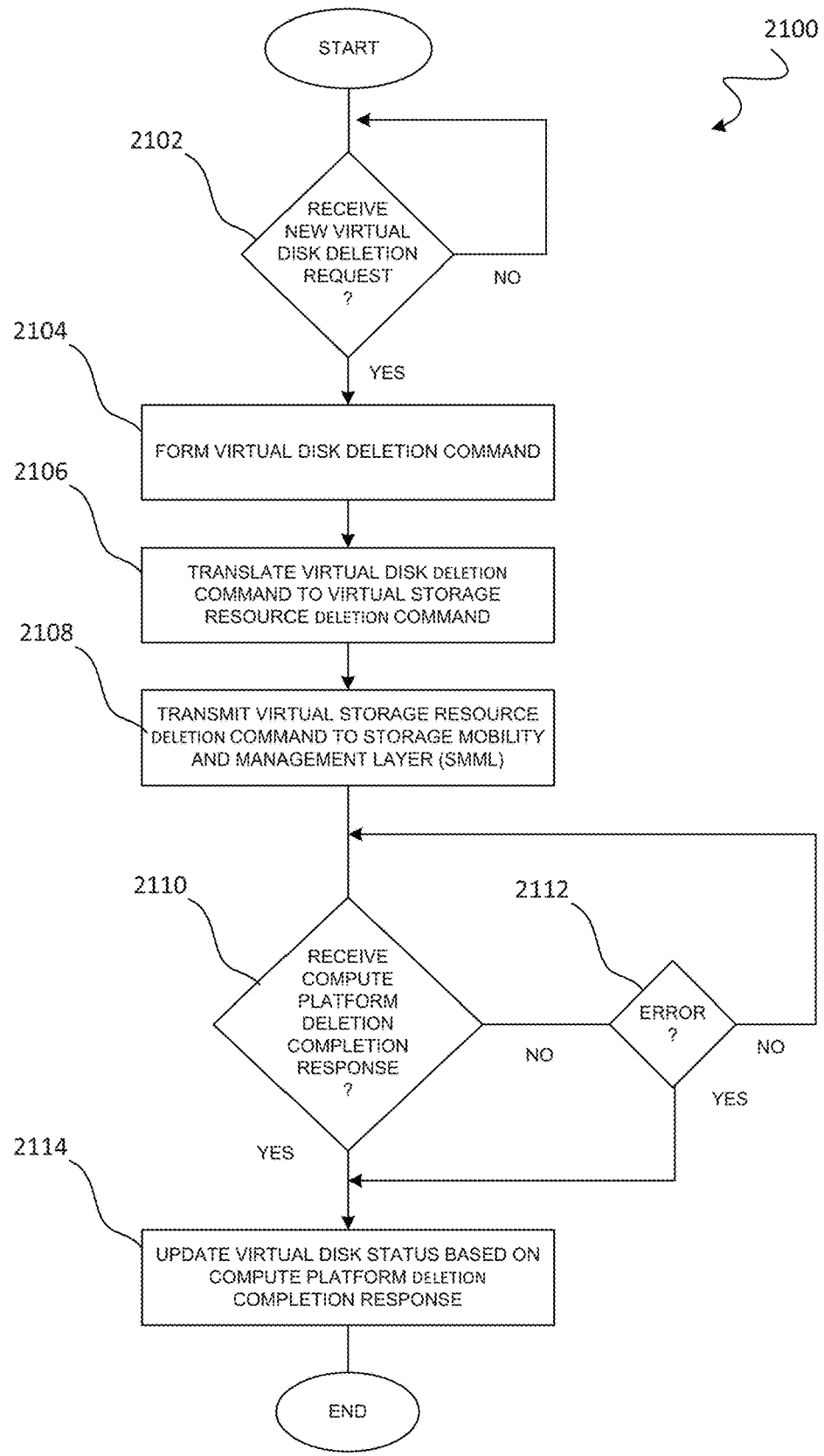
FIGS. 21A-21C flow diagram of a virtual disk deletion process according to one embodiment.
Figure 21B:
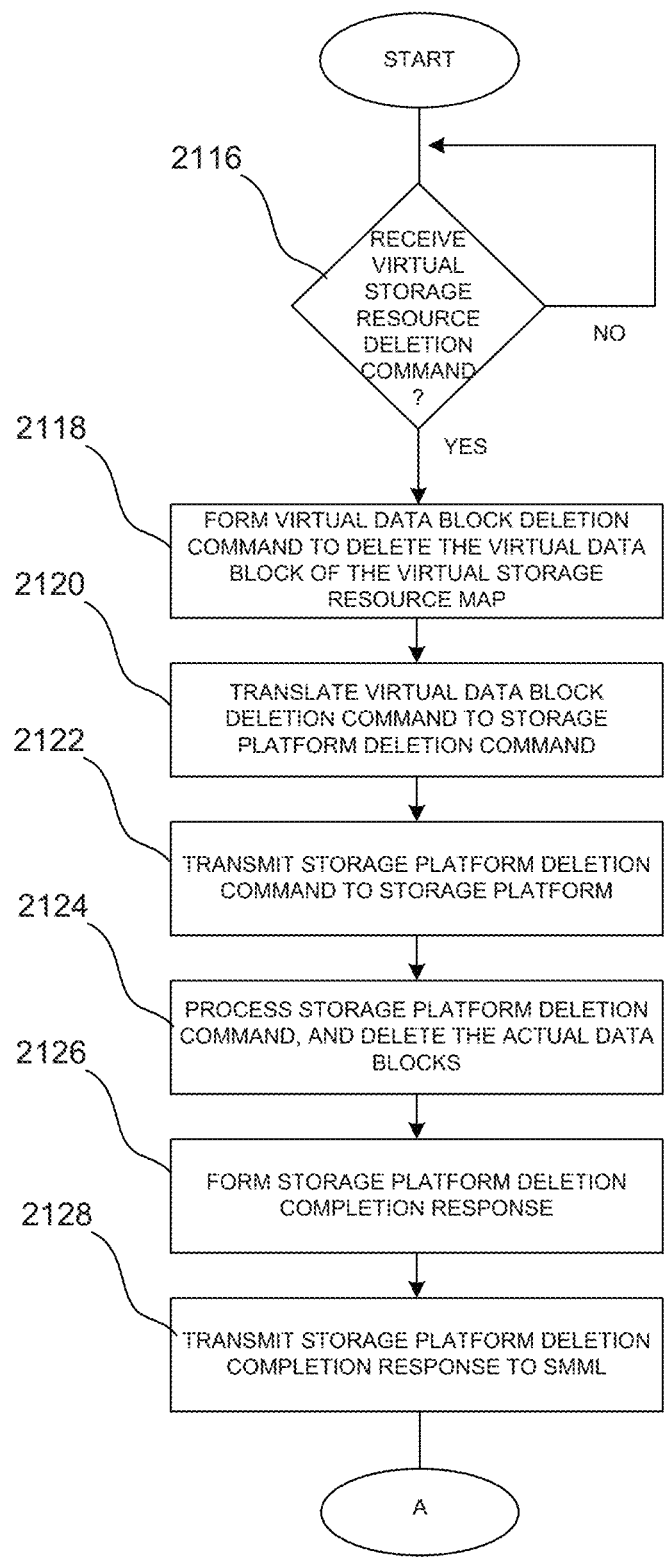
Figure 21C:
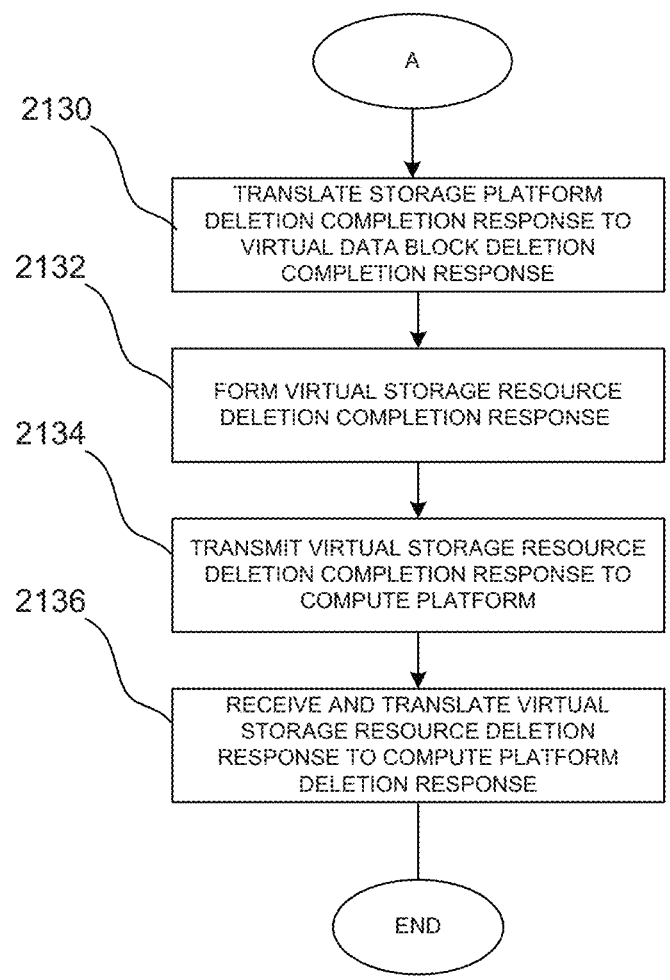

FIGS. 21A-21C flow diagram of a virtual disk deletion process 2100 according to one embodiment. The virtual disk deletion process 2100 concerns operations to delete a virtual storage resource.

In FIG. 21A, the processing for the illustrated portion of the virtual disk deletion process 2100 can, for example, be performed by the compute platform. The virtual disk deletion process 2100 can begin with a decision 2102. The decision 2102 can determine whether a new virtual disk deletion request has been received. When the decision 2102 determines and that a new virtual disk deletion request has not yet been received, the virtual disk deletion process 2100 can await such a request.

Once the decision 2102 determines that a new virtual disk deletion request has been received, a virtual disk deletion command can be formed 2104. Next, the virtual disk deletion command can be translated 2106 to a virtual storage resource deletion command. The virtual storage resource deletion command can then be transmitted 2108 to the storage mobility and management layer (SMML).

Thereafter, a decision 2110 can determine whether a compute platform deletion completion response has been received. Here, the compute platform is awaiting a response from the SMML. The response is referred to as the compute platform deletion completion response. When the decision 2110 determines that a compute platform deletion completion response has not yet been received, a decision 2112 can determine whether an error has occurred. When the decision 2112 determines that an error has not occurred, the virtual disk deletion process 2100 can return to repeat the decision 2110. Alternatively, when the decision 2112 determines that an error has occurred, the virtual disk deletion process 2100 can end.

On the other hand, when the decision 2110 determines that a compute platform deletion completion response has been received, virtual disk status at the compute platform can be updated 2114 based on the compute platform deletion completion response. Following the update 2014 to the virtual disk status, the virtual disk deletion process 2100 can end.

FIGS. 21B and 21C illustrate exemplary processing to carry out a virtual storage resource deletion command. In one embodiment, the processing associated with FIGS. 21B and 21C can, for example, be provided at the SMML and the storage platform. A decision 2116 determines whether a virtual storage resource deletion command has been received. When the decision 2116 determines that a virtual storage resource deletion command has not yet been received, the processing can await such a command.

On the other hand, when the decision 2116 determines that a virtual storage resource deletion command has been received, a virtual data block deletion command can be formed 2118 to delete the virtual data block that contains the virtual storage resource (VSR) map. The virtual data block deletion command can then be translated 2120 to a storage platform deletion command. The storage platform deletion command can then be transmitted 2122 to the storage platform.

Subsequently, at the storage platform, the storage platform deletion command can be processed 2124. The processing 2124 of the storage platform deletion command can include deletion of the actual data blocks maintained by the storage platform. Then, a storage platform deletion completion response can be formed 2126. The storage platform deletion completion response can then be transmitted 2128 to the SMML.

Thereafter, at the SMML, the storage platform deletion completion response can be translated 2130 to a virtual data block deletion completion response. Next, a virtual storage resource deletion completion response can be formed 2132. The virtual storage resource deletion completion response can then be transmitted to 2134 to the compute platform. At the compute platform (e.g., platform integration service), the virtual storage resource deletion completion response can be translated 2136 to compute platform deletion completion response. Following the block 2136, the virtual disk deletion request at the SMML and the storage platform has completed.

In one embodiment, the composition service does not form virtual data block commands to delete the virtual data blocks that contain the data of a virtual storage resource. This is avoided because some or all the virtual data blocks may belong to other virtual storage resources. If the composition service were to delete them, then one or more virtual storage resources could lose part of their data, and consequently one or more virtual disks will lose part of their data. Instead, the deletion of the virtual data blocks that contain the data of virtual storage resources is performed during a garbage collection process, and only if the virtual data blocks do not belong to any virtual storage resource.

Garbage collection can be used to delete unneeded virtual data blocks. Garbage collection is the process of deleting the virtual data blocks that are no longer referenced by any virtual storage resource. In one embodiment, the composition service creates two lists, (i) a list that contains all the virtual data block names, and (ii) a list that contains all the virtual data block names that are referenced by the maps. The second list cannot be larger than the first, but it may be shorter because a virtual storage resource may have been deleted or a map may have been updated. Thus, there may be some virtual data blocks that are no longer in use. However, these virtual data blocks have not been deleted, so they still exist, and will appear in the first list. The composition service compares the two lists and creates a new one, which is the difference of the two lists (difference list).

If a garbage collection process is performed offline, it would be reasonable to delete all the virtual data blocks of the difference list. However, with the system installation in use during garbage collection, new virtual data blocks are created. It is also possible for a virtual data block that was not in use by any virtual storage resource to become in use by one or more virtual storage resources during operation. Hence, it is not desired for the composition service to delete such virtual data blocks.

Consequently, in one embodiment, epoch values of the virtual data blocks can be stored on a key-value store (e.g., etcd). Every time the composition service creates a virtual data block and every time the composition service uses an existing virtual data block, the composition service can send a request to the key-value store to update the epoch value of the virtual data block, and make it equal to the global epoch value. The initial value of the global epoch is zero. Every time the garbage collection process starts, the global epoch value can be increased by one. The composition service checks the epoch value of every virtual data block of the difference list. If the epoch value is less than or equal to the value that the global epoch had when the garbage collection process began, it deletes the virtual data block; otherwise, the composition service does nothing.

For example, assume that the global epoch value is 6 when the garbage collection process begins. Hence, the global epoch value at the beginning of the garbage collection is 6, and then it is increased by 1 and becomes 7. There is a content addressable virtual data block with a hexadecimal string for a name (e.g., $CA1). This virtual data block is not part of the second list, which is the list that contains all the virtual data block names that are referenced by the maps. Hence, when the garbage collection process begins, this virtual data block belongs to the difference list, and the composition service is going to delete it. However, the system installation is active, and VMs and containers are running. Assume that the user snapshots a VM. Then, the composition service hashes the data of the virtual data blocks, and the map of the snapshot has a virtual data block with the same name (e.g., $CA1). The composition service changes the epoch value of the VDB with the name $CA1 on the key-value store (e.g., etcd). For example, the epoch value might change from its previous stored value (e.g., 3) to the current global epoch value (e.g., 7). Thus, when the composition service checks the epoch value of this virtual data block, it finds out that its epoch value is 7 and thus does not delete it because it is greater than 6. Alternatively and undesirable, if the composition service does not check for the epoch value of the virtual data block prior to deletion, then it would delete the virtual data block and the snapshot for thus loose content and would be deficient.

Figure 22A:
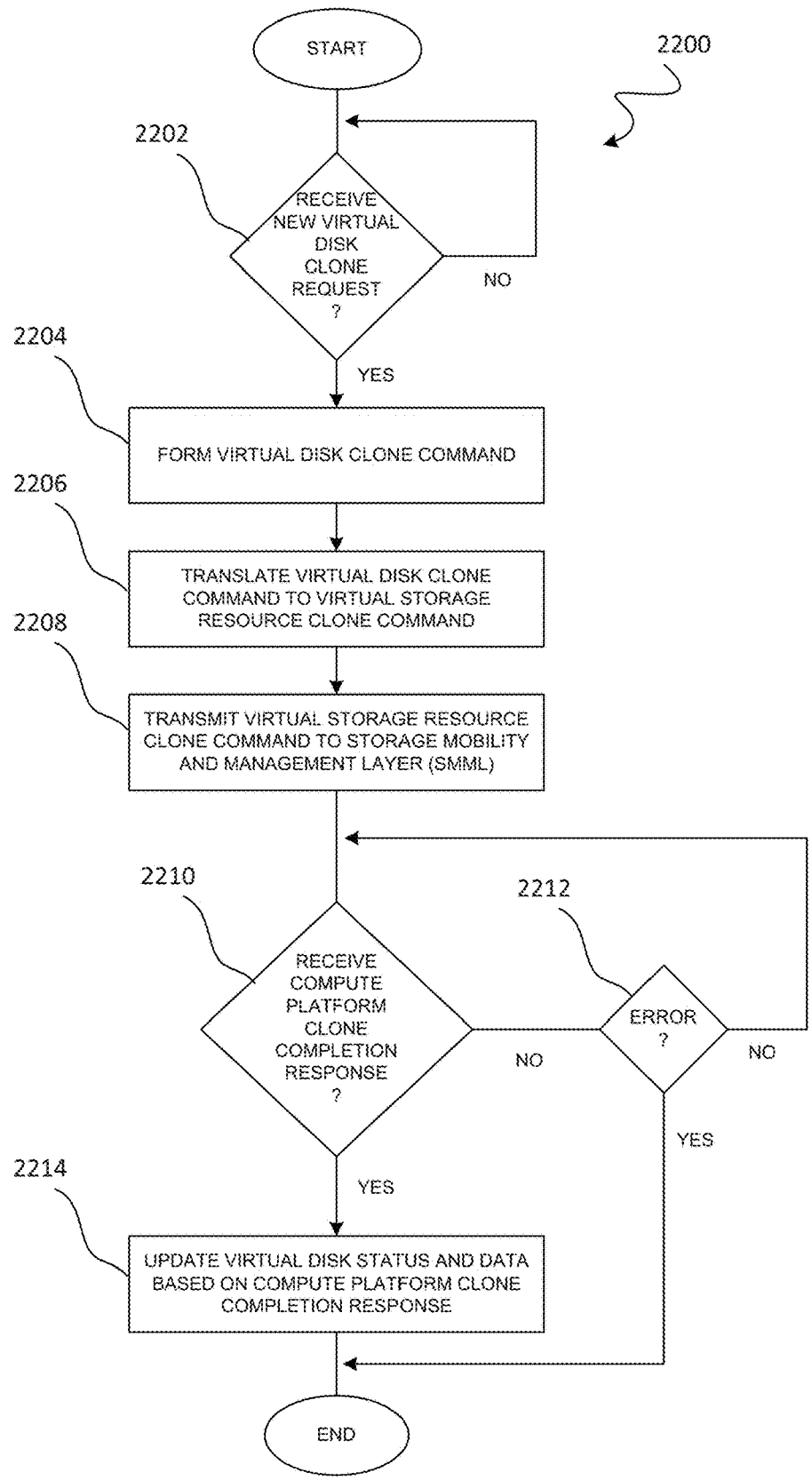
FIGS. 22A and 22B are flow diagrams of a virtual disk clone process according to one embodiment.
Figure 22B:
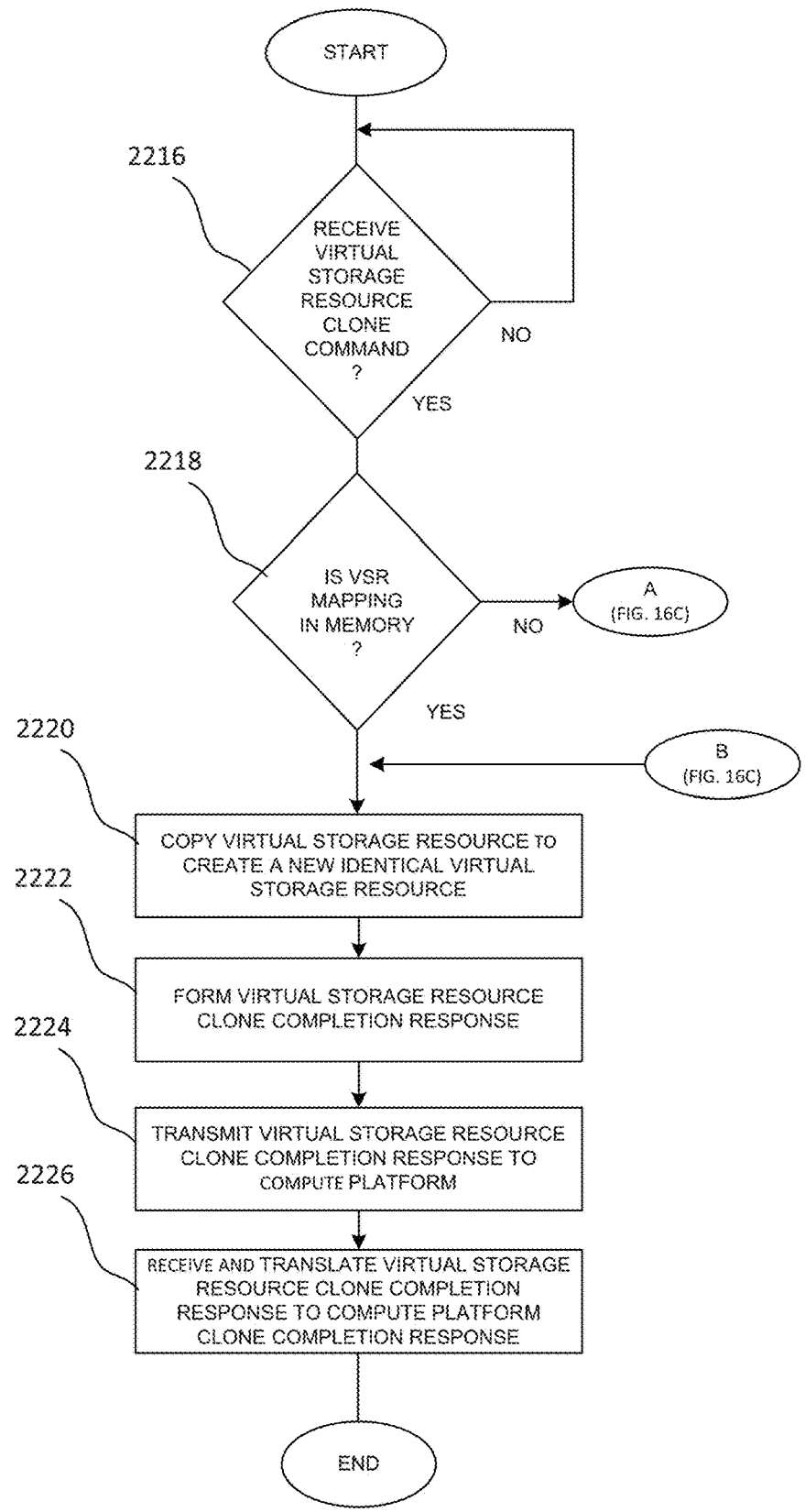

FIGS. 22A and 22B are flow diagrams of a virtual disk clone process 2200 according to one embodiment. The virtual disk clone process 2200 concerns operations to create a clone of a virtual storage resource.

In FIG. 22A, the processing for the illustrated portion of the virtual disk clone process 2200 can, for example, be performed by the compute platform. The virtual disk clone process 2200 can begin with a decision 2202. The decision 2202 can determine whether a new virtual disk clone request has been received. When the decision 2202 determines and that a new virtual disk clone request has not yet been received, the virtual disk clone process 2200 can await such a request.

Once the decision 2202 determines that a new virtual disk clone request has been received, a virtual disk clone command can be formed 2204. Next, the virtual disk clone command can be translated 2206 to a virtual storage resource clone command. The virtual storage resource clone command can then be transmitted 2208 to the storage mobility and management layer (SMML).

Thereafter, a decision 2210 can determine whether a compute platform clone completion response has been received. Here, the compute platform is awaiting a response from the SMML. The response is referred to as the compute platform clone completion response. When the decision 2210 determines that a compute platform clone completion response has not yet been received, a decision 2212 can determine whether an error has occurred. When the decision 2212 determines that an error has not occurred, the virtual disk clone process 2200 can return to repeat the decision 2210. Alternatively, when the decision 2212 determines that an error has occurred, the virtual disk clone process 2200 can end.

On the other hand, when the decision 2210 determines that a compute platform clone completion response has been received, virtual disk status and data at the compute platform can be updated 2214 based on the compute platform clone completion response. Following the update 2214 to the virtual disk status and the virtual disk data, the virtual disk clone process 2200 can end.

FIG. 22B illustrates exemplary processing to carry out a virtual storage resource clone command. In one embodiment, the processing associated with FIG. 22B can, for example, be principally provided at the SMML. A decision 2216 determines whether a virtual storage resource clone command has been received. When the decision 2016 determines that a virtual storage resource clone command has not yet been received, the processing can await such a command.

On the other hand, when the decision 2216 determines that a virtual storage resource clone command has been received, a decision 2218 can determine whether a virtual storage resource (VSR) mapping is present in memory.

When the decision 2218 determines that the VSR mapping is not present in memory, the processing shown in FIG. 16C can be performed. On the other hand, when the decision 2216 determines that the VSR mapping is present in memory (as well as following the processing in FIG. 16C when the VSR mapping was not previously present in memory), the virtual storage resource can be copied 2220 to create a new identical virtual storage resource.

Thereafter, a virtual storage resource clone completion response can be formed 2220. The virtual storage resource clone completion response can then be transmitted 2224 to the compute platform. Next, at the compute platform, the virtual storage resource clone completion response can be translated 2226 to a compute platform clone completion response. Following the receipt and translation 2226 of the virtual storage resource clone completion response, the virtual disk clone processing in FIG. 22B can end.

Another aspect of the invention is file management service, which is referred to as a bucket service since buckets contain one or more files can be shared. A bucket service is a service that enables a user to organize virtual storage resources, such as snapshots. For example, virtual storage resources (e.g., snapshots) can be organized into entities, which can be referred to as buckets. A bucket, which can also be referred to as a container, is capable of containing virtual storage resources (e.g., snapshots). A user can add or remove virtual storage resources from a bucket. Alternatively or additionally, virtual storage resources can be automatically placed in buckets, such as through use of policies, rules or subscriptions. The bucket service can also facilitate providing and managing user-friendly names to buckets and/or virtual storage resources (e.g., snapshots) therein.

A bucket service can have a user system, so one or more users can gain access to the bucket service. The user system can present a graphical user interface (GUI). Users can login to the bucket service via the GUI and create new, empty buckets, and thereafter users can fill the buckets with virtual storage resources (e.g., snaphots). A file can be a snapshot that is managed by the SMML. The snapshots can pertain to files that originated from a virtualization platform like VMware, vSphere, or from a container platform like Docker, but which are backed by a virtual storage resource managed by the SMML. The files have versions so that a user can rollback a resource to a specific point in time. The bucket service can communicate with the SMML, such as via the composition service thereof (e.g., FIG. 9). Every version of a file resident in a bucket can be associated with a distinct virtual storage resource. In addition, every version of a file can have some compute platform-specific metadata and/or user-specific metadata. The compute platform-specific metadata can originate from information that exists on a compute platform database maintained by the compute platform. The user-specific metadata can originate from information provided by a user.

The bucket service can support a plurality of different compute platforms. A version of a file in a bucket can contain metadata that originate from associated compute platforms. The bucket service has drivers that allow the bucket service to communicate with various different compute platforms. Depending on the compute platform, a specific driver of the bucket service can be selected and used to communicate with the compute platform. In one embodiment, the bucket service can receive from the compute platform, via the associated driver, metadata (e.g., compute platform-specific metadata and/or user-specified metadata) for a resource maintained at the compute platform (e.g., compute platform database), and then store such metadata into a bucket service database maintained at the bucket service. In one embodiment, the user-specific metadata, can be any arbitrary key-value pair provided by the end-user, e.g., "hello":"world." Furthermore, the bucket service can use a distributed key-value store to store the file versions and their metadata. Examples of a distributed key-value pair store are etcd, Zookeeper and Consul.

For example, etcd is a distributed reliable key-value store. The SMML can use etcd to store the epoch value of every virtual data block and a global epoch value. The initial value of the global epoch is zero. Every virtual data block that is created takes an epoch value, which is equal to the global epoch value. etcd can store variables and their value. In one implementation, the variables are the names of the virtual data blocks and the values are the epoch values of the virtual data blocks. For example:
    global_epoch=7
    cinder_vol_0110-1111-1001=5
    cinder_snap_1011-0010-0111=7
    7f83b1657ff1fc53b92dc18148a1d65dfc2d4b1fa3d6772-84adfd200176d9069=3
    1110-0001-1001_3_7=1

Hence, etcd represents only one possible implementation for a key-value store. Other implementations might use another key-value store like Zookeeper or Consul.

Files in a bucket can be versioned. When a user creates a file inside a bucket, the file can be given a user-friendly name, e.g., "My_database_backup". The bucket service creates a version for the file, and this is first version of this file, though other versions can be later formed. Each version is associated with a VSR. The versions can be stored as dictionaries on a distributed key-value store. The name of each version can be a random Universally Unique Identifier (UUID) generated by the bucket service. The UUID can be represented as a hexademical string. Every version can have a timestamp that declares the date and time the version was created. An example of a version is the following:
    $version_UUID={'metadata': { }, 'VSR': 'VSR_name', 'timestamp: 'date&time'}

A new version for a file is created when the user stores a file to a bucket that already contains a file with the same name. Every new version of the file gets a different UUID. Typically, the bucket service will retain all previous versions of the file. The information about a file and its versions can be stored on a distributed key-value pair store. For example:
    /Smith/my_snapshots/windows_backup/$version_1_UUID=$version_1_UUID
    /Smith/my_snapshots/windows_backup/$version_2_UUID=$version_2_UUID
    /Smith/my_snapshots/windows_backup/$version_3_UUID=$version_3_UUID In the above example, a user, named "Smith", has created a file with 3 versions inside a bucket hosted by the bucket service. Smith decided to name the bucket "my_snapshots", and the file "windows_backup". Every time Smith created a new version, the bucket service generated a UUID and a timestamp for the new version and stored the information on a distributed key-value pair store. The bucket service uses the timestamp to determine which version is the latest version.

Further, in one embodiment, when a user deletes a file from a bucket, the bucket service does not delete any actual data. Instead, all versions of a file remain in the bucket. The bucket service can create a new version, named "Delete Marker", which contains no data, i.e., it is not associated with any VSR. If a user later wants to restore any of the previous versions of a file, they can do so by using the bucket service to create a new version and associate it with a VSR. For example:
    /Smith/my_snapshots/windows_backup/$version_1_UUID=$version 1_UUID
    /Smith/my_snapshots/windows_backup/$version_2_UUID=$version_2_UUID
    /Smith/my_snapshots/windows_backup/$version_3_UUID=$version_3_UUID
    /Smith/my_snapshots/windows_backup/$version_4_UUID=$version_4_UUID
    /Smith/my_snapshots/windows_backup/$version_5_UUID=$version_5_UUID
where:
    $version_1_UUID={'metadata': { }, 'VSR': 'VSR_name_1'}
    $version_2_UUID={'metadata': { }, 'VSR': 'VSR_name_2'}
    $version_3_UUID={'metadata': { }, 'VSR': 'VSR_name_3'}
    $version_4_UUID={'metadata': { }, 'VSR': 'null', 'delete_marker': 'true'}
    $version_5_UUID={'metadata': { }, 'VSR': 'VSR_name2'}

In the above example, a user created a file, such as by taking a snapshot of a virtual storage resource (VSR). Then, the user took 2 more snapshots of the VSR, and the bucket service created 2 more versions of the file, which are versions 2 and 3. Afterwards, the user deleted the file, and the bucket service created a new version 4, which is the "Delete Marker" version, but also retained all the previous versions. Sometime later, the user decided to restore a version, e.g., version 2. In doing so, the bucket service created a new version (version 5), that is identical to version 2.

The bucket service allows various operations performed by processes, including a registration process and a presenting process. The registration process can operate to register a resource of a local compute platform. The presenting process can operate to present a file of the bucket service to a local compute platform.

In one embodiment, a bucket service provides a registration process, where a resource of a compute platform can be registered as a file inside a bucket. The bucket service can have metadata of the resource, such as (i) the size and the name of its virtual disk, and (ii) the virtual storage resource (VSR) that is related with this virtual disk. A specific driver of the bucket service communicates with the compute platform, and performs the necessary actions. During the registration process, the bucket service can create a version for this file, and the user can choose the name of the file. Here, the user can interact with the bucket service graphical user interface (GUI), and can register a resource of a local compute platform with the bucket service. Specifically, a specific bucket service driver can communicate with the compute platform to discover available resources at the compute platform, and can then make available resources appear on the bucket service GUI. The bucket service GUI enables the user to choose the resource the user wants to register. The user chooses the bucket that the resource being registered is placed in and a name for the file. If the file name that the user chooses already exists in the bucket, then the bucket service creates a new version for this file. Otherwise, if the file name does not already exist, the bucket service creates a new file inside the bucket, as an initial version. For example, a user "Smith" might create a bucket and give the bucket the name "bucket_for_backups", then the user might register a resource that has UUID=0001-0001-0001, and provide a user-friendly name "my_backup" to the file that is to be created.

The bucket service interacts with the specific bucket service driver to register the resource of the compute platform. For example, the bucket service asks from the specific bucket service driver to register the resource that has a UUID equal to 0001-0001-0001. The specific bucket service driver of the bucket service can communicate with the compute platform, and make a request to the compute platform to snapshot this specific resource.

In response to a snapshot request from the specific bucket service driver, the compute platform snapshots the resource. For example, the specific bucket service driver makes a request to the compute platform to snapshot the resource that has a UUID equal to 0001-0001-0001. The compute platform forms a virtual disk command to create a snapshot of this resource. For example, the virtual disk command can be:

disk-snapshot—from 0001-0001-0001—to 0001-0001-0010

The virtual disk command can be translated to a virtual storage resource command.

vsr-snapshot—from cinder_vol_$UUID—to cinder_snap_$UUID2

The resulting snapshot will be a new resource on the compute platform (UUID=0001-0001-0010) that is associated with a VSR (VSR name=cinder_snap_$UUID2). The compute platform can store information pertaining to the snapshot in a compute platform database, as metadata. The metadata can include the UUID and the associated VSR name.

Thereafter, the compute platform can send the UUID of the resource and the associated VSR name to the specific bucket service driver. The specific bucket service driver receives the information and forwards it to the bucket service. The bucket service can then make a request to the composition service of the SMML to snapshot this VSR, and chooses a UUID for the version that is going to be created. The UUID of the version is a part of the name of the VSR that is going to be created. For example, the request to the composition service can be:

vsr-snapshot-from cinder_snap_$UUID2-to bs_$version_UUID

The composition service of the SMML snapshots the VSR, and informs the bucket service about the completion of the snapshot process. The bucket service then creates the version, associates the version with the VSR. Such information can be stored as a dictionary on a distributed key-value pair stored. For example, the distributed key-value pair store can store:

$version_UUID={'metadata': { }, 'VSR': 'bs_$version_UUID', 'events': [registration]}/Smith/bucket_for_backups/my_backup/$version_UUID=$version_UUID The bucket service GUI can then inform the user that the registration process has completed successfully.

Figure 23:
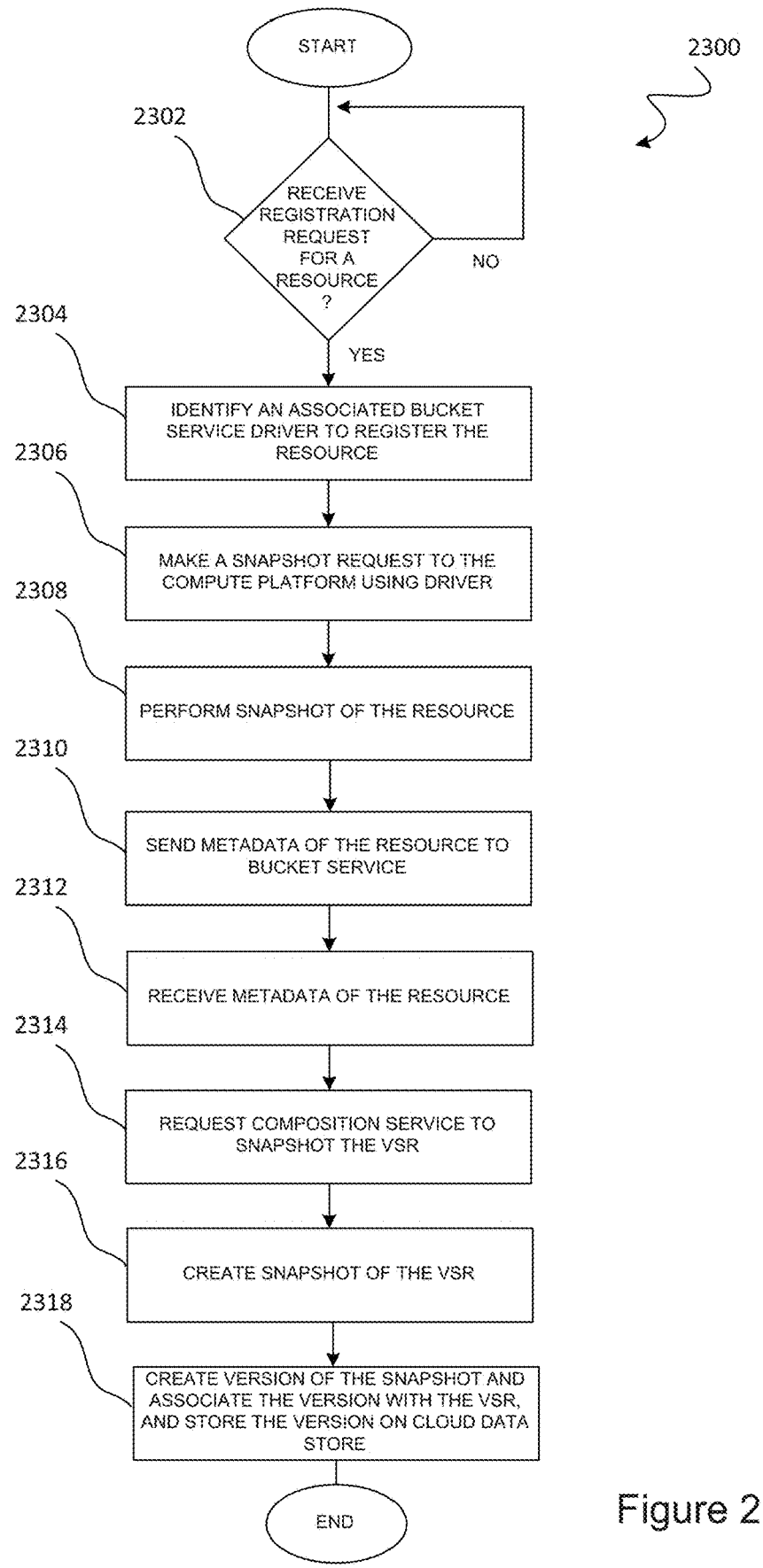
FIG. 23 is a flow diagram of a registration request process according to one embodiment.

FIG. 23 is a flow diagram of a registration request process 2300 according to one embodiment. The registration request process 2300 can be performed primarily by a SMML with interaction with a compute platform. The registration request process 2300 can begin with a decision 2302 that determines whether a registration request for a resource has been received. In one implementation, a user can interact with a user interface associated with a bucket service to initiate a registration request for a particular resource. When the decision 2302 determines that a registration request for a resource has not yet been received, the registration request process 2300 can await such a request.

On the other hand, when the decision 2302 determines that a registration request for a resource has been received, an associated bucket service driver is identified 2304 to register the resource at the compute platform. Here, the associated bucket service driver is one of a plurality of bucket service drivers that are available at the bucket service. The identification 2304 of the associated bucket service driver can be achieved once the involved compute platform is known. A snapshot request can then be made 2306 to the compute platform. Here, the snapshot request can be made 2306 from the bucket service to the compute platform using the associated bucket service driver that has been identified.

Next, at the compute platform, after receiving the snapshot request from the bucket service, the compute platform can perform 2308 a snapshot of the resource that is being registered. A snapshot is a copy of a resource at a specific point in time. Typically, a snapshot preserves the state and data of a resource at a specific point in time. The processing associated with performing 2308 the snapshot of the resource according to one embodiment is detailed, for example, in FIGS. 20A and 20B described above. The processing for forming the snapshot is primarily performed at the SMML. After the snapshot has been performed 2308, metadata of the new resource can be sent 2310 to the bucket service. The metadata, for example, can include the virtual storage resource identifier and a resource descriptor. Typically, the metadata of the resource is sent 2310 by way of the associated bucket service driver from the computer platform to the bucket service.

Thereafter, at the bucket service, the metadata of the resource can be received 2312. Then, the bucket service makes a request to the SMML 2314 (e.g., a composition service of the SMML) to make a snapshot of the virtual storage resource (VSR). The composition service of the SMML, upon receiving the request to make the snapshot, can create 2316 the snapshot of the VSR. After the snapshot has been created 2316, the bucket service can create 2318 a version of the snapshot, associate the version with the VSR, and store the version on a cloud data store. The cloud data store can be implemented in various ways. One implementation can use a distributed key value store, such as etcd, to store data across a plurality of different machines (e.g., cluster of machines). Here, according to one implementation, the version of the snapshot can be stored as a key value pair. Following the block 2318, the registration request process 2300 can end.

The presenting process can operate to present a file of the bucket service to a local compute platform. In one embodiment, a bucket service provides a presentation process, where a version of a file inside a bucket can be presented natively on a local compute platform. The compute platform can be ignorant as to the underlying VSR of the file to be presented. However, the compute platform only needs to know the VSR reference, and learn the metadata of the VSR that are related to the specific virtualization platform. A specific bucket service driver can communicate with the compute platform, and perform the necessary actions to update the compute platform database with the required metadata. The specific bucket service driver can be responsible for selecting the metadata of the version that are related to the specific compute platform, as some of the metadata can be related to another virtualization platform and thus be ignored. Once the resource gets presented, the bucket service ceases to be on the management or access path, and then the compute platform interacts with the composition service of the SMML (through the platform integration service) for access to the resource.

The user can interact with the bucket service GUI to present a version of a file as a resource on the local compute platform. The user can choose a name for the resource that is being created.

For example, the user "Smith" has already formed a bucket called "bucket_for_backups". Inside this bucket, the user has a file named "my_backup". This file has a version ($version_UUID) that is associated with a VSR (bs_$version_UUID). Smith presents this version to the local Compute Platform, and chooses the compute platform specific name "resource_from_my_backup" for the resource being created.

The bucket service interacts with the compute platform using the specific bucket service driver to present the VSR as a resource on the compute platform. For example, the bucket service requests from the specific bucket service driver to present the VSR with version name bs_$version_UUID on the compute platform with the selected name "resource_from_my_backup". The specific bucket service driver of the bucket service can communicate with the compute platform and makes a request to the compute platform to create a new disk that has the same size and data as the VSR.

The compute platform chooses a UUID for the disk that is going to be created, and forms a virtual disk command to create the disk. For example, the virtual disk command can be:

disk-create—UUID 0100-1111-0011—from bs_$version_ UUID—size 4G

At the compute platform, the platform integration service, can translate the virtual disk command to a virtual storage resource command. For example, the virtual storage resource command can be:

vsr-clone—from bs_$version_UUID—to cinder_clone_$UUID where $UUID=0100-1111-0011

Eventually, the compute platform will have a new resource (UUID=0100-1111-0011) that is associated with a VSR (cinder_clone_$UUID). When a VM or container at the compute platform makes an I/O request to the new resource, then the access path to the VSR will be established. Once the resource gets presented at the compute platform, the bucket service no longer needs to participate in the management or access path for the VSR.

The compute platform can update the compute platform database with all the necessary metadata, including for example the UUID of the resource, its size, and the VSR that is associated therewith. In response to a request from the specific bucket service driver, the compute platform sends the UUID of the resource and the name of its associated VSR to the specific bucket service driver. For example, the response from the compute platform can be:

vsr_name=cinder_clone_$UUID, $UUID=0100-1111-0011

The specific bucket service driver receives the information from such response and forwards it to the bucket service. The bucket service can then update the version to include a presentation event in the dictionary that is stored on the distributed key-value pair store. For example, the dictionary can be:

$version_UUID={'metadata': { }, 'VSR': 'bs_$version_ UUID', 'events': ['registration', 'presentation_1']}

Finally, the bucket service GUI informs the user that the presentation process has been completed successfully.

Figure 24:
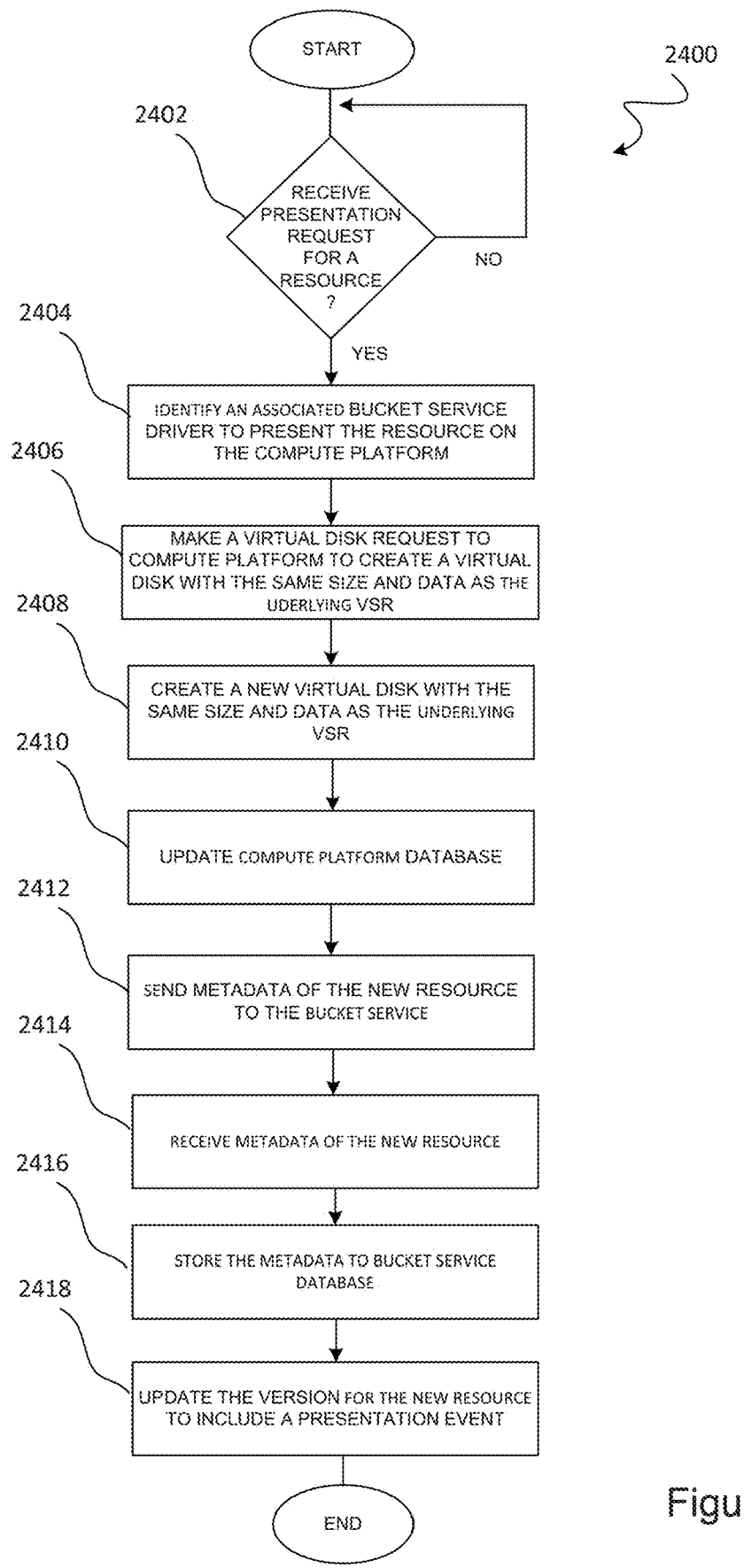
FIG. 24 is a flow diagram of a presentation process according to one embodiment.

FIG. 24 is a flow diagram of a presentation process 2400 according to one embodiment. The presentation process 2400 can be primarily performed at the SMML, though some interaction with the compute platform can be included. The presentation process 2400 can begin with a decision 2402 that determines whether a presentation request for a resource has been received. When the decision 2402 determines that a presentation request has not been received, the presentation process 2400 can await such a request.

Once the decision 2402 determines that a presentation request for resource has been received, additional processing can be performed to carry out the presentation request. Initially, with respect to the additional processing, an associated bucket service driver to present the resource on the compute platform can be identified 2404. Then, a virtual disk request can be made 2406 to the compute platform. The virtual disk request is a request to create a virtual disk on the compute platform with the same size and data as an underlying virtual storage resource (VSR).

Then, at the compute platform, following receiving the virtual disk request from the bucket service, a new virtual disk with the same size and data as the underlying VSR (i.e., a clone) can be created 2408. The processing associated with performing 2408 the clone of the resource according to one embodiment is detailed herein, see, e.g., FIGS. 22A and 22B. A compute platform database can then be updated 2410. Further, metadata of the new resource can then be sent 2412 to the bucket service. Then, at the bucket service, the metadata of the new resource can be received 2414. The metadata can then be stored 2416 to a bucket service database. Finally, the version for the new resource can be updated 2418 to include a presentation event. Following the block 2418, the presentation process 2400 can end.

Another aspect of the invention pertains to sharing of buckets between SMMLs (e.g., Rok installations). Here, buckets containing one or more files can be shared over one or more networks. In one embodiment, different SMMLs can share buckets between one another in a peer-to-peer manner.

In one embodiment, buckets can be published or registered for sharing with a peer-to-peer (P2P) service having an indexing service for making bucket information available for discovery by other system installations (e.g., SMML installations).

Generally speaking, if a user wants to make a bucket available for others to receive (e.g., download), then a publication process is performed to make the bucket available. In this regard, a user can make a request to a bucket service of a source system installation to publish a particular bucket. In doing so, the user can create a unique bucket reference in the form of a URL link. The bucket service can interact with a P2P service and assign the P2P service a task to publish the bucket using the provided URL link. In processing the task, the P2P service can ask the bucket service for each version of each file within the bucket. Here, the bucket service provides the P2P service with all the information about each version, which for each version includes the name of the virtual storage resource that corresponds to the version, the name of the version, its metadata and its creation date.

If a version points to a virtual storage resource that is not content addressable, then the P2P Service makes a request to the composition service to hash the corresponding virtual storage resource (VSR). When all the virtual storage resources are content addressable, the P2P service can create a list that contains information about each version, such as (i) the name of the virtual storage resource that corresponds to this version, (ii) the name of the file that contains this version, (iii) the name of the version, (iv) the metadata of the version, and (v) the creation date of the version. The initial and current state for the bucket can contain the aforementioned list. If the user later performs an action that causes the creation of a new version of a file within the bucket (e.g., user updates metadata of an existing version, or user creates a new file on the bucket service), then the list is updated. Once updated, the list has then a new, current state.

The P2P service can communicate with an indexer service to send the bucket reference to the indexer service. Here, the indexer service is a global meeting point that can be used to find and exchange bucket references. Hence, the indexer service can receive and store the bucket reference received from the P2P Service. The indexer service is typically independent of any of the system installations. In one implementation, user accounts on the indexer service and the bucket service are distinct. In such implementation, a user would need to have an account with the indexer service and an account with the bucket service.

When a user publishes a bucket, the P2P service can create a unique swarm identifier (ID) for the bucket. The swarm ID can be a hex string, and can be stored at the bucket service. Moreover, the P2P service can send the swarm ID to the indexer service. The indexer service can store the swarm ID in association with the bucket reference. Thus, a swarm can be created. A swarm is a group of peers that are sharing a bucket, and the group of peers can include both publishers and subscribers to the bucket. As this point, the only member in that swarm is the system installation (e.g., Rok installation) that has published the bucket.

The P2P service can also communicate with a tracker service to inform the tracker service that this system installation participates in the swarm. The tracker service can serve all the IPs and ports of all the system installations (e.g., Rok installations) that participate in this swarm. Moreover, the P2P service can creates a swarm ID for every version. Each swarm ID can be a hex string, such as the name of the VSR that corresponds to each version. These swarm IDs can also be stored at the bucket service. Hence, a number of static swarms can be created, though initially the only member in these static swarms is the system installation that published the bucket.

Figure 25A:
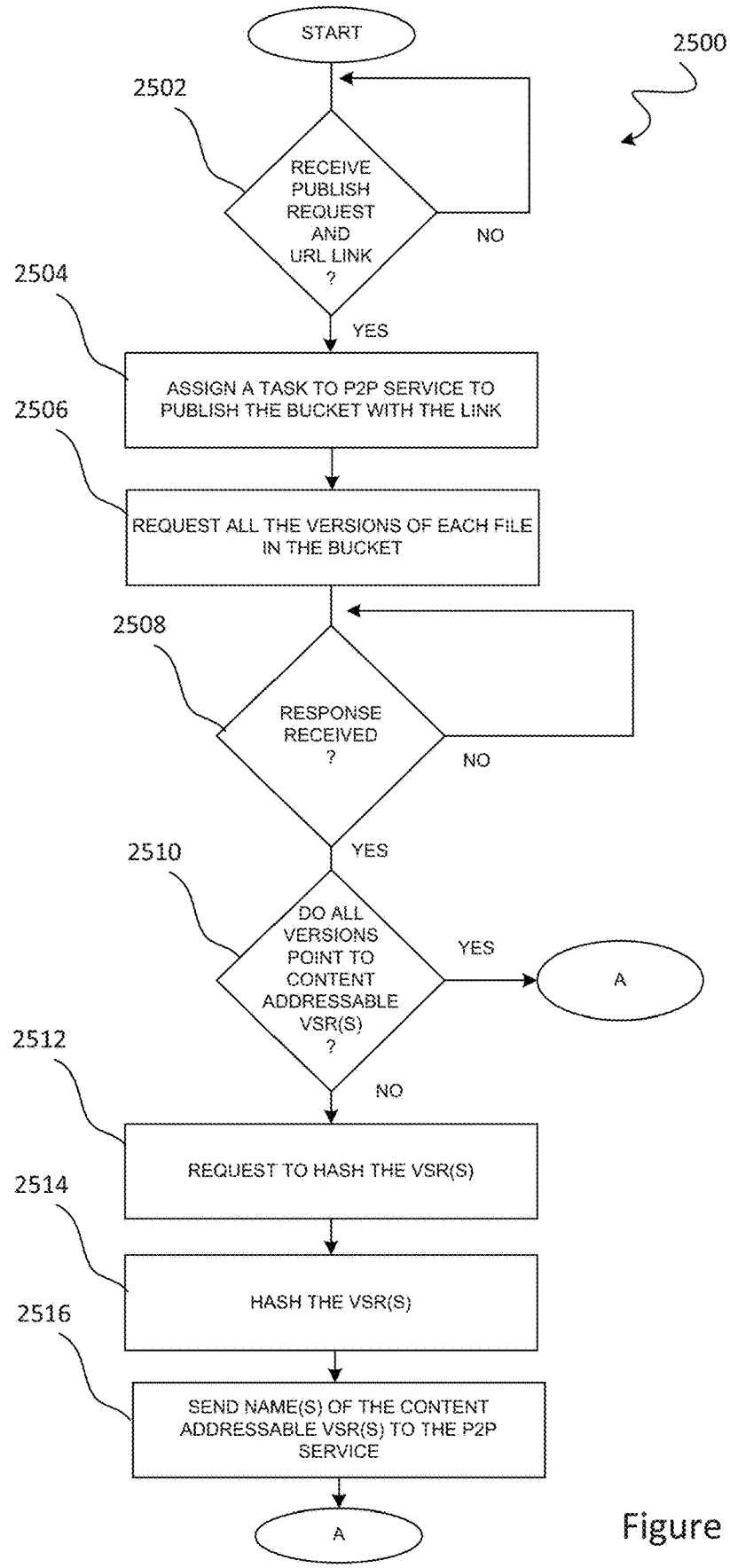
FIGS. 25A-25B are flow diagrams of a bucket publication process according to one embodiment.
Figure 25B:
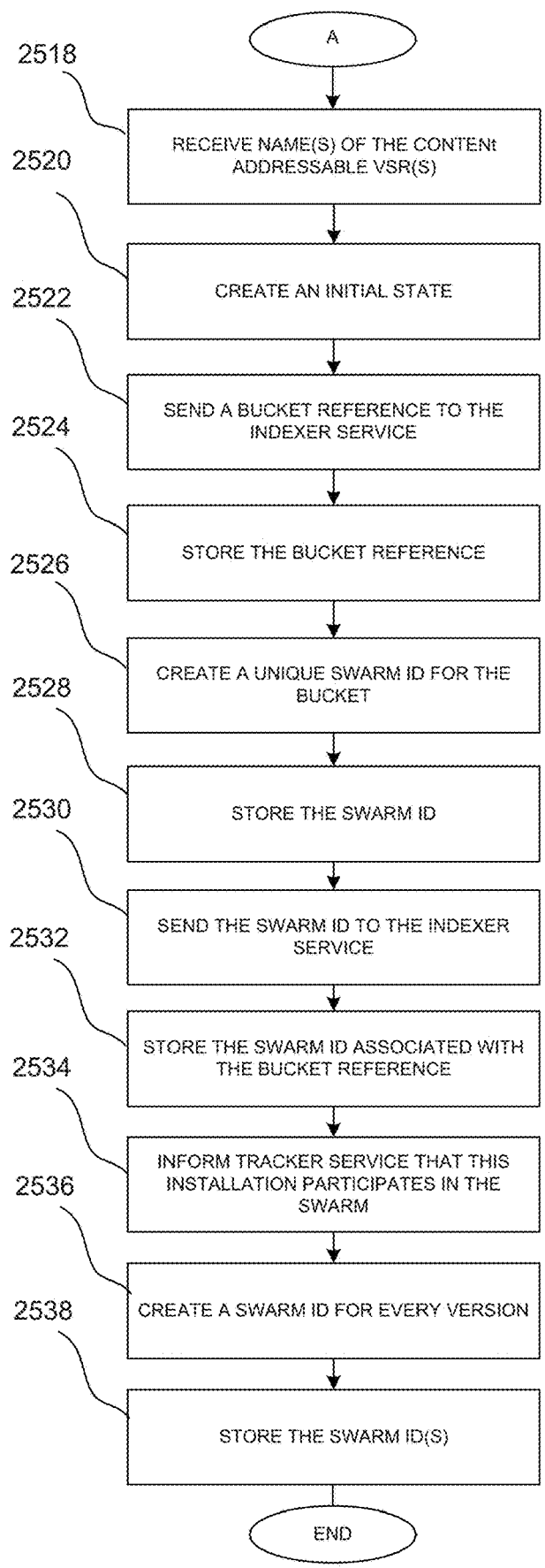

FIGS. 25A-25B are flow diagrams of a bucket publication process 2500 according to one embodiment. The bucket publication process 2500 can be performed by a combination of a bucket service, a peer-to-peer (P2P) service and a composition service.

The bucket publication process 2500 can begin with a decision 2502 that determines whether a publish request has been received. Typically, the publish request will include or reference a URL link to an indexing service. The publish request is a request to publish a bucket on a P2P service. The URL link can specify the URL where the bucket is to be available. For example, the URL can point to the bucket location at an indexer service, e.g., https://indexer.arr/username/bucket_name. When the decision 2502 determines that a publication request has not yet been received, the bucket publication process 2500 can await such a request.

On the other hand, when the decision 2502 determines that a publication request has been received (along with a URL link), the bucket publication process 2500 can continue. When the bucket publication process 2500 continues, a task can be assigned 2504 to the P2P service. The task is to publish the bucket with the URL link. Next, at the P2P service, all the versions of each file in the bucket can be requested 2506.

A decision 2508 can then determine whether a response has been received. When the decision 2508 determines that a response has not yet been received, the bucket publication process 2500 can await such a response. On the other hand, once the decision 2508 determines that a response has been received, a decision 2510 can determine whether all versions of each file in the bucket point to content addressable VSRs.

When the decision 2510 determines that all versions of the files do not point to content addressable VSRs, then a request 2512 can be made to the composition service to hash the VSRs. Next, at the composition service, the VSRs are hashed 2514. Then, names of the content addressable VSRs can be sent 2516 to the P2P service. For example, the names can be implemented as hexadecimal strings.

Following the block 2516 or directly following the decision 2510 when all versions of each file already point to content addressable VSRs, the processing illustrated in FIG. 25B for the bucket publication process 2500 can be performed. As shown in FIG. 25B, the names of the content addressable VSRs can be received 2518 at the P2P service, as needed. For example, if not already present at the P2P service, the content addressable VSRs can be provided from the composition service to the P2P service at block 2516. A bucket reference can be sent 2522 from the P2P service to the indexer service. Thereafter, at an indexer service, the bucket reference can be stored 2524. Additionally, at the P2P service, a unique swarm identifier (ID) for the bucket can be created 2526. The swarm ID the can also be stored 2528 at the bucket service. Further the swarm ID can be sent 2530 to the indexer service. Subsequently, at the indexer service, the swarm ID can be stored 2532 in a manner which associates the swarm ID to the corresponding bucket reference.

Furthermore, the P2P service can also inform 2534 the tracker service that this installation participates in the swarm. In addition, a swarm ID for every version can be created 2536. The swarm identifiers can then be stored 2538 at the bucket service. Following the storage 2538, the bucket publication process 2500 can end.

In one embodiment, buckets that have been published for sharing can then be subscribed to by other system installations. In publishing a bucket, bucket information for the bucket is made available. Other users operating at other distinct system installations can thereafter obtain the bucket information and then subscribe to the corresponding bucket.

In one embodiment, a user at another system location can obtain a bucket reference (e.g., URL link) from an indexer service and request to subscribe to a bucket identified by the bucket reference. For example, a user can interact with the bucket service of their system installation, create a new bucket, and subscribe to the published bucket using the URL link.

The bucket service at the another location can interact with the P2P service at the another location. The P2P service can communicate with the indexer service, and obtain the bucket reference for the bucket to be subscribed to. In addition, the P2P service can also obtain a swarm ID and stores it to the bucket service. The P2P service can also communicate with the tracker service, and informs the tracker service that this another system installation now also participates in the swarm. The tracker service can serve all the IPs and ports of all the systems installations that participate in this swarm. Thus, a system installation is able to discover other system installations that participate in this swarm. Each one of these system installations is a peer and is able to serve data for the associated buckets.

The P2P service connects to all the peers, and gets the current state which is a list that contains information about each version within the corresponding bucket. The P2P service asks the bucket service whether each version is present in that particular bucket service. A new subscriber to the bucket reference initially does not have any of the versions. On the other hand, an existing subscriber typically has all the versions of a previous state, but does not yet have some of the versions of a new state. So, the P2P service inquires to the bucket service to ask about the existence of the versions. This allows the P2P service to know which versions need to be downloaded. Alternatively, the P2P service could download all the versions, though this would be less efficient.

For every version that is not already present, the P2P service can ask the composition service if there is a virtual storage resource (VSR) with the same name as the virtual storage resource that corresponds to this version. The name of a content addressable virtual storage resource is unique. Thus, if such a VSR exists, then it is certain that this system installation has a VSR identical to the VSR of the other system installation, and thus there would be no need to download that corresponding version. Now, the P2P service knows which data are available on this system installation, and can then proceed to download data of the versions that are not present. For every version, the P2P service begins a static swarm. The ID of each swarm can be the name of the VSR that corresponds to each version, and which is stored in the bucket service. In one implementation, the P2P service begins a static swarm for all the versions, even for those that are already present. This happens, because this system installation can also later be used to seed data of these versions to other system installations that subscribe to the same URL link (i.e., bucket reference).

The P2P service can connect to all the peers, and inquire about the virtual data blocks (VDBs) that it needs to download and the virtual data blocks that each peer can share. At this point, the P2P service has a list of the VDBs that are to be downloaded. The P2P service can then ask the composition service whether it can compose the VSRs with the existing VDBs. If it can, then the P2P service does not have to download any additional VDBs. On the other hand, if the composition service cannot compose the VSRs, then the composition service sends a list of the missing VDBs to the P2P service. The P2P service can then request the missing VDBs from the peers, and downloads the VDBs. Then, again, the P2P service can ask the composition service whether it can compose the VSRs with the existing VDBs. If it can, then the P2P service does not have to download any additional VDBs. Alternatively, if the SMML still cannot compose the VSRs, the composition service sends a list of the missing VDBs to the P2P service, and this procedure iterates until the composition service is able to compose all the VSRs with the existing VDBs. When all the data has been downloaded, and the composition service is able to compose the VSRs, the bucket service of the another location will have a bucket identical to the one that has been published by the user of the bucket service of the source location.

Figure 26A:
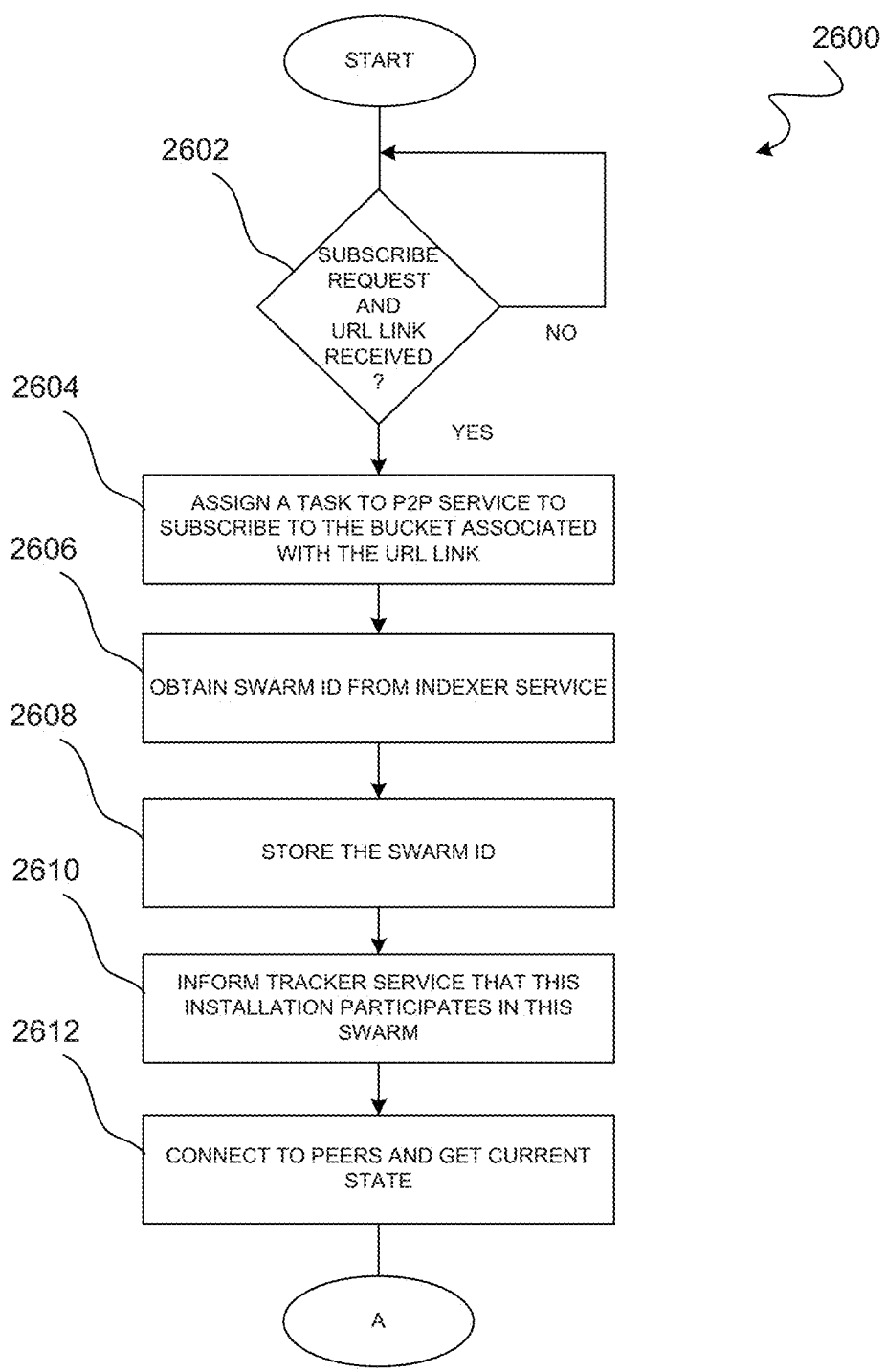
FIGS. 26A-26C are flow diagrams of a bucket subscription process according to one embodiment.
Figure 26B:
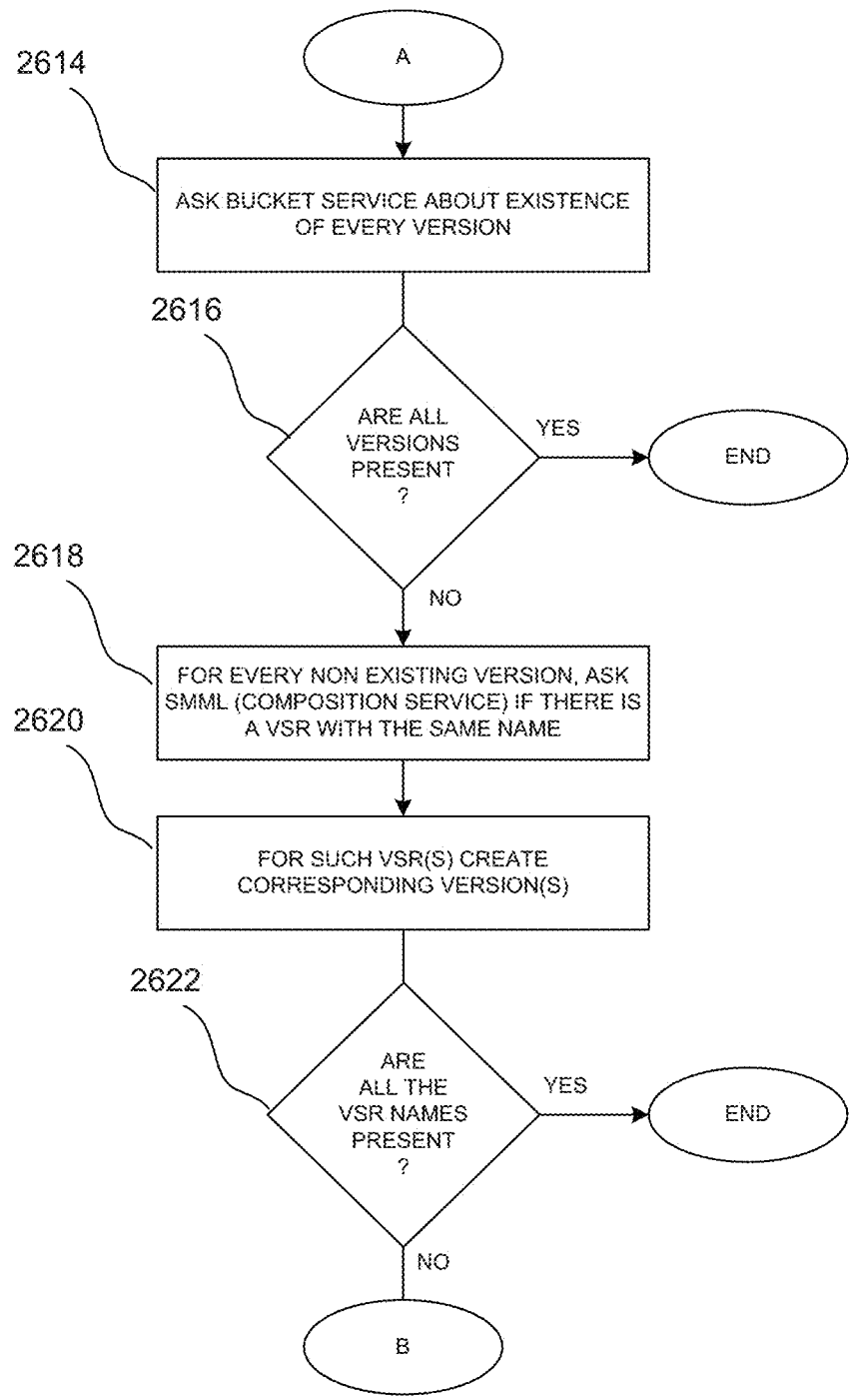
Figure 26C:
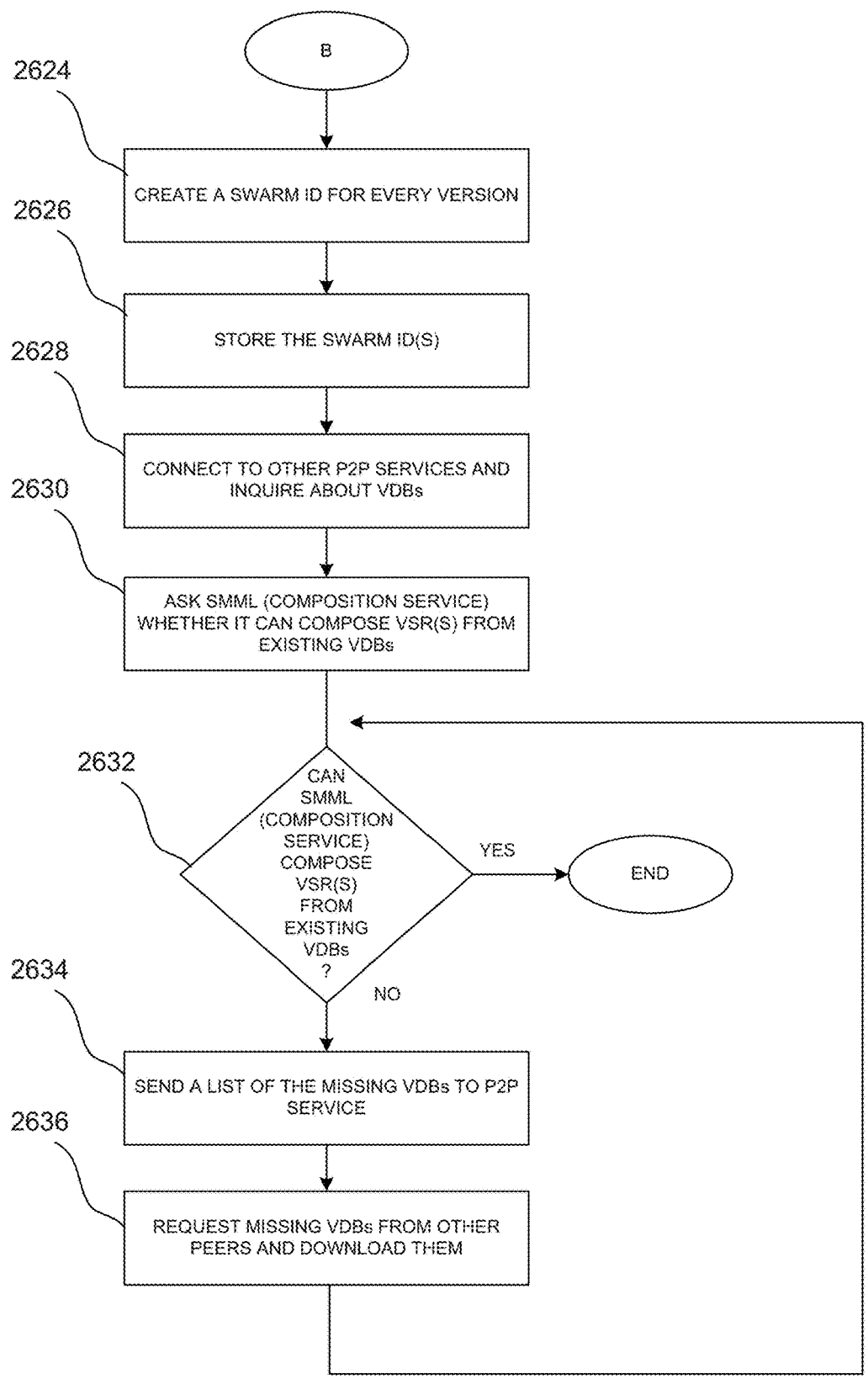

FIGS. 26A-26C are flow diagrams of a bucket subscription process 2600 according to one embodiment. The bucket subscription process 2600 can be performed by one or a combination of a bucket service and a P2P service.

The bucket subscription process 2600 can begin with a decision 2602 that determines whether a subscribe request and an associate a URL link have been received. The decision 2602 can, for example, be performed by a bucket service. When the decision 2602 determines that a subscribe request and any associated URL link have not been received, the bucket subscription process 2600 can await such a request. On the other hand, when the decision 2602 determines that a subscribe request and an associated URL link have been received, the bucket subscription process 2600 can operate to assign 2604 a task to the P2P service. The task being assigned 2604 to the P2P service is to subscribe to the bucket associated with the URL link. Next, at the P2P service, a swarm identifier (ID) is obtained 2606 from an indexer service. The swarm ID can be obtained 2606 using the URL link for the bucket being subscribed to. The swarm ID can then be stored 2608 in the bucket service.

Next, a tracker service can be informed 2610 that this installation participates in this swarm. The P2P service can then connect 2612 to one or more peers and obtain current state. The P2P service can then ask 2614 the bucket service about the existence of every version in the corresponding bucket. Next, a decision 2616 can determine whether all versions are present at the new location. When the decision 2616 determines that all versions are present in the bucket at the new location, then the bucket subscription process 2600 can end. In this case, the bucket service at the new location now has a complete bucket that is identical to the bucket that was previously published by a user of the bucket service at the original location. The composition service at the new location can then interact with the bucket service to compose the virtual storage resources (VSRs) for all resources within the bucket.

On the other hand, when the decision 2616 determines that all versions within the bucket are not present at the new location, the P2P service can ask the composition service if there is a virtual storage resource (VSR) with the same name. This processing can be performed for every non-existing version with respect to the bucket service at the new location. For those virtual storage resources that there is a VSR with the same name, corresponding versions can be created 2620 at the bucket service. Next, a decision 2622 can determine whether all the VSR names are present at the new location. When the decision 2622 determines that all the VSR names are present at the new location, then the bucket subscription process 2600 can end.

Alternatively, at the P2P service, when the decision 2622 determines that all the VSR names are not present at the new location, a swarm identifier (ID) for every version can be created 2624. The swarm identifiers can then be stored 2626 in the bucket service. Then, the P2P service can connect 2628 to other P2P services and acquire about available virtual data blocks. Then, the P2P service can ask 2630 the composition service whether it can compose the virtual storage resources (VSRs) from the existing virtual data blocks. When the decision 2632 determines that the composition service cannot compose the virtual storage resources from the existing virtual data blocks, a list of missing virtual data blocks can be sent 2634 from the composition service to the P2P service. Next, the P2P service can request 2636 the missing virtual data blocks from other peers and download these missing virtual data blocks. Following the request and download 2636 of the missing virtual data blocks, the bucket subscription process 2600 can return to repeat the block 2632 to continue to evaluate whether the virtual storage resources can be composed from the existing virtual data blocks. When the decision 2632 determines that the composition service can compose the virtual storage resources from the existing virtual data blocks, then the bucket subscription process 2600 can end.

As noted above, a compute platform typically includes a GUI that enables a user to interact with resources, whether local or remote. A SMML can also have a graphical user interface. As noted above, a bucket service of a SMML can include a GUI to assist users in registering, publishing and subscribing to buckets. Some exemplary screens of graphical user interface for a bucket service are provided below according to one embodiment.

FIGS. 27A-30A and 31B are exemplary screenshots of a GUI for a bucket service of a SMML installation according to one embodiment. FIGS. 30B and 31A are exemplary screenshots of a GUI for an indexing service according to one embodiment.

Figure 27A:
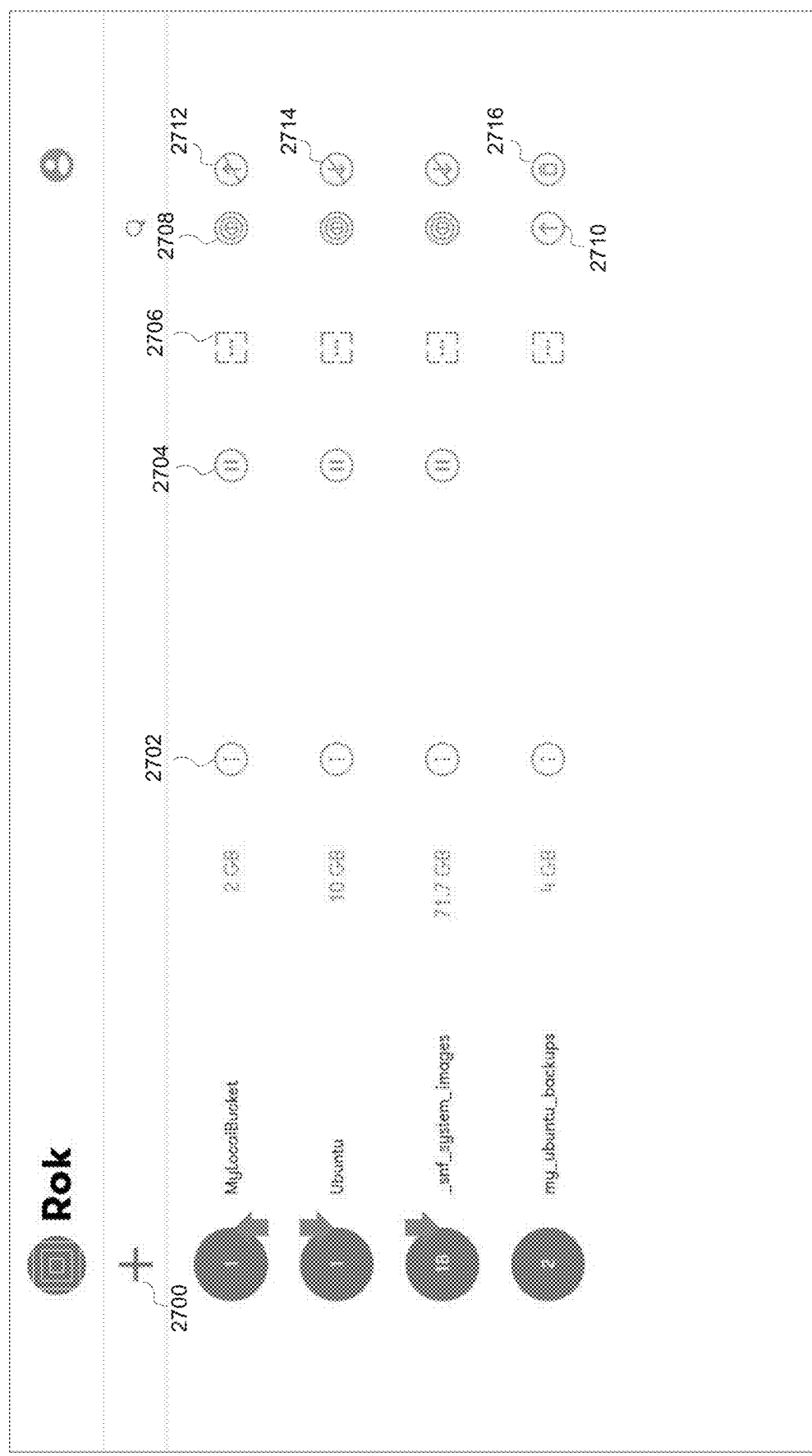
FIG. 27A illustrates an exemplary home screen of a bucket service GUI according to one embodiment.

FIG. 27A illustrates an exemplary home screen of a bucket service GUI according to one embodiment. The bucket service can maintain one or more buckets. In this example, the bucket service presently has four buckets, though buckets can be added or removed. The first bucket is named "MyLocalBucket" which is a published bucket having one file. The second bucket is named "Ubuntu" which is a remote bucket that the bucket service has subscribed to and which presently has one file. The third bucket is named "_snf_system_images" which is a remote bucket that the bucket service has subscribed to and which presently has eighteen files. The fourth bucket is named "my_ubuntu_backups" which is a local bucket having two files. The exemplary home screen also includes various user control objects. A control object 2700 can be selected to create a new bucket. A control object 2702 can be selected to review information concerning an associated bucket. A control object 2704 can be selected to pause synchronization for a corresponding bucket that is published or subscribed. A control object 2706 can be selected to access policies for a corresponding bucket, such as update rules, create automated backup policies, etc. The user can choose a variety of rules. This includes registration and presentation policies about resources of one or more compute platforms, and files of the bucket service. For example, a user may choose to register every one hour all the resources of a compute platform that their name starts with "ubuntu". Or they may choose to present every one day a file of the bucket service that has a specific name (e.g., ubuntu_laptop). A control object 2708 can be selected to access the URL reference for the bucket with respect to an indexing service. A control object 2710 can be selected to cause the corresponding bucket to be published. A control object 2712 can be selected to cause the corresponding bucket (that is presently published) to be unpublished. A control object 2714 can be selected to cause the corresponding bucket (that is presently subscribed) to be unsubscribed. A control object 2716 can be selected to cause the corresponding bucket to be deleted.

Figure 27B:
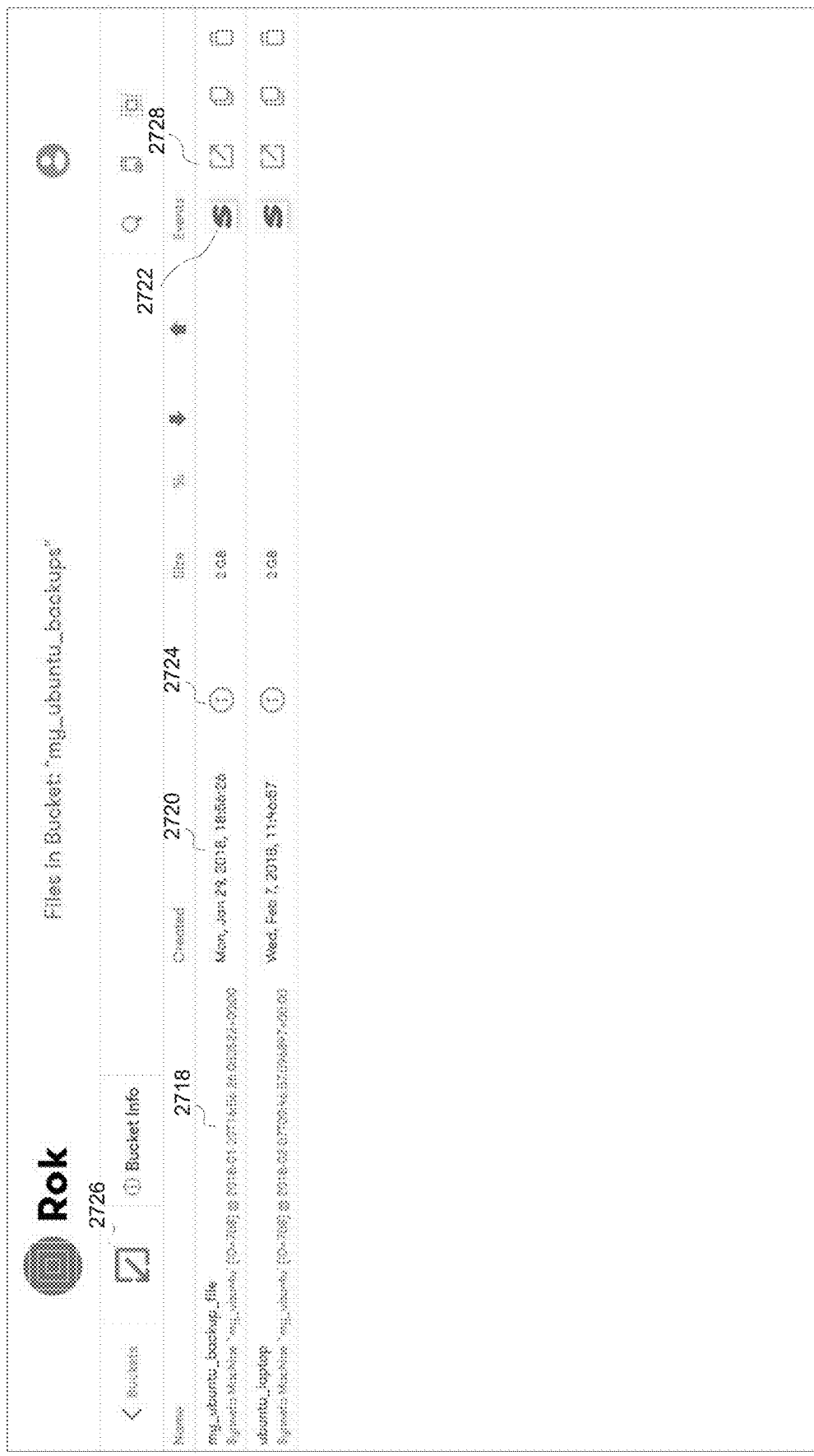
FIG. 27B illustrates an exemplary bucket screen of the bucket service GUI according to one embodiment.

FIG. 27B illustrates an exemplary bucket screen of the bucket service GUI according to one embodiment. The exemplary bucket screen can be presented after the fourth bucket is named "my_ubuntu_backups" has been selected. The exemplary bucket screen lists the two files within the bucket. For each file, information including metadata 2718 for the file, a timestamp 2720 of the file, and an indication 2722 of the registration and presentation events can be provided. Further, the exemplary bucket screen can also include an information control 2724, a registration control 2726 for a new file and presentation controls 2728 for existing files.

Figure 27C:
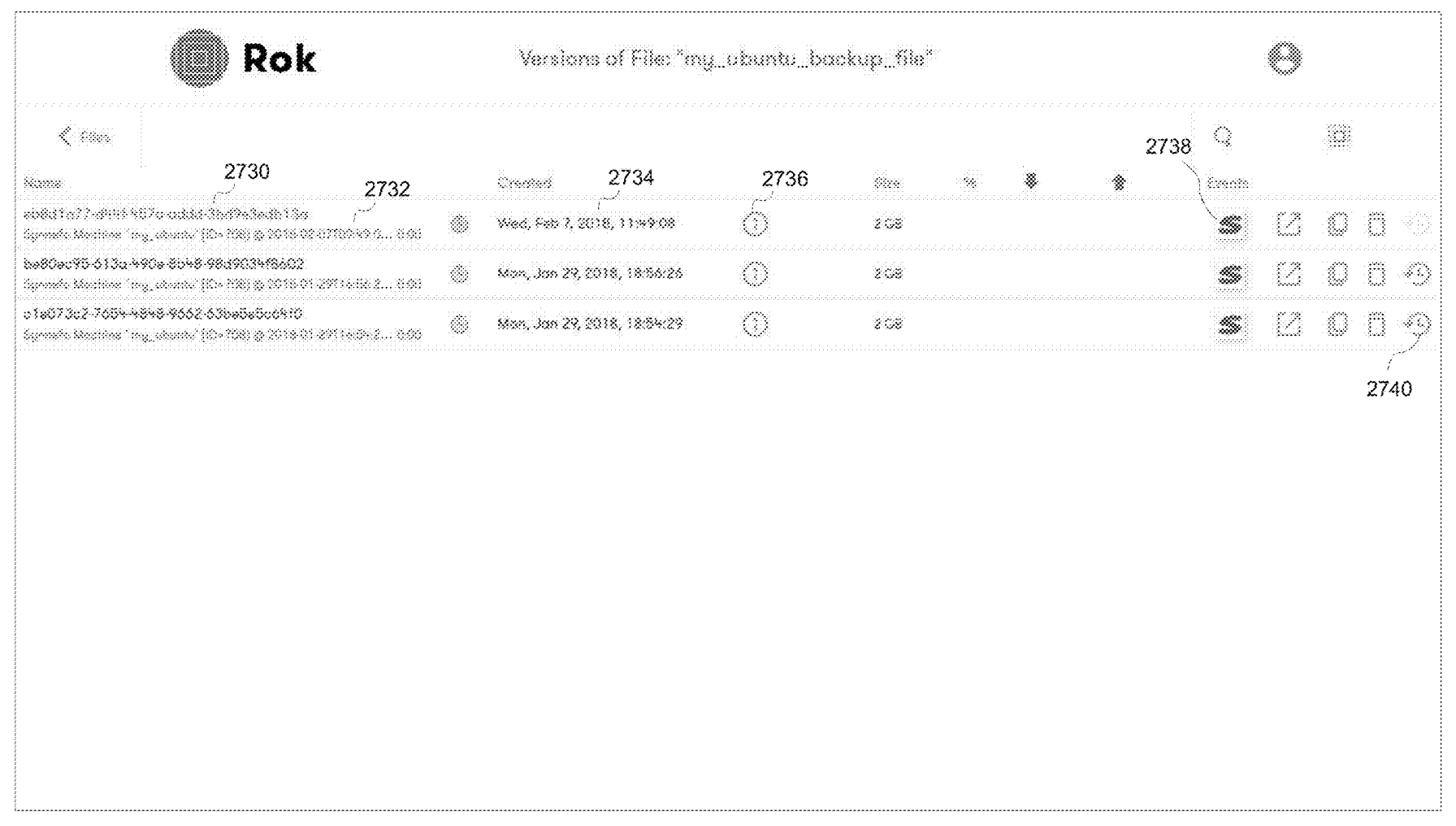

FIG. 27C illustrates an exemplary bucket screen of the bucket service GUI according to one embodiment. The exemplary bucket screen can be presented after the first file (e.g., my_ubuntu_backup_file") listed in FIG. 27B has been selected. FIG. 27C illustrates that there are three versions of the first file. The versions are ordered based on date and time. However, the user can reorder the versions based on other properties such as name, size etc. Hence, the first version is the most current version and serves as a primary version of the first file. For each version, the name is a version UUID 2730. The exemplary bucket screen, for each version, also displays metadata 2732, timestamp 2734, information control 2736, presentation and registration events 2738. Further, a restore control 2740 can be provided to restore an older version, which then becomes the primary version.

Figure 28A:
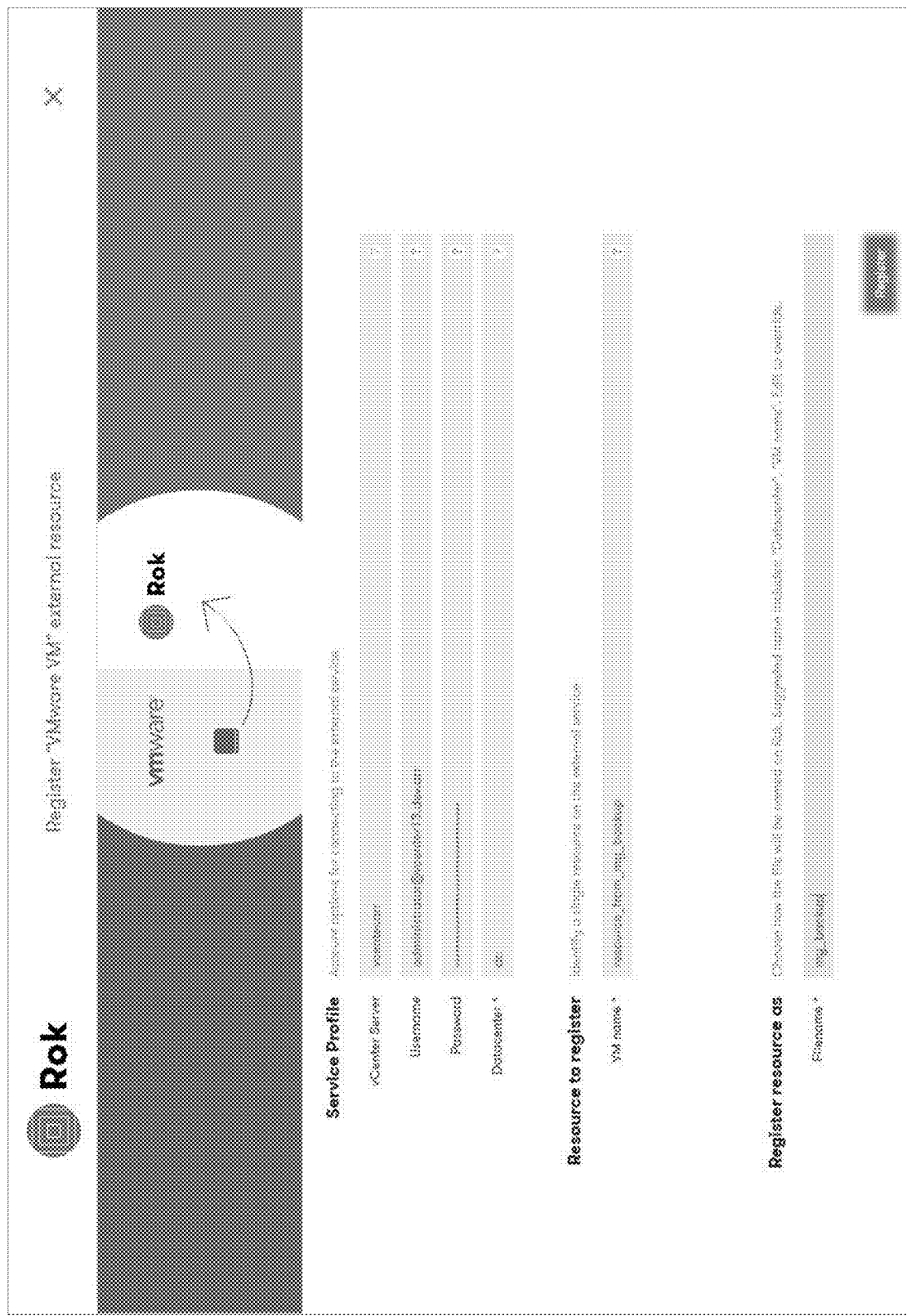
FIG. 28A illustrates an exemplary registration screen of the bucket service GUI according to one embodiment.

FIG. 28A illustrates an exemplary registration screen of the bucket service GUI according to one embodiment. The exemplary registration screen can be presented after a registration control (e.g., registration control 2726) has been selected. As shown in the exemplary registration screen, a new resource from a compute platform can be identified (e.g., by name of resource) and the credentials for accessing the resource on an external service (i.e. the compute platform) can be provided. Further, a name for the file being registered in the bucket can be provided.

Figure 28B:
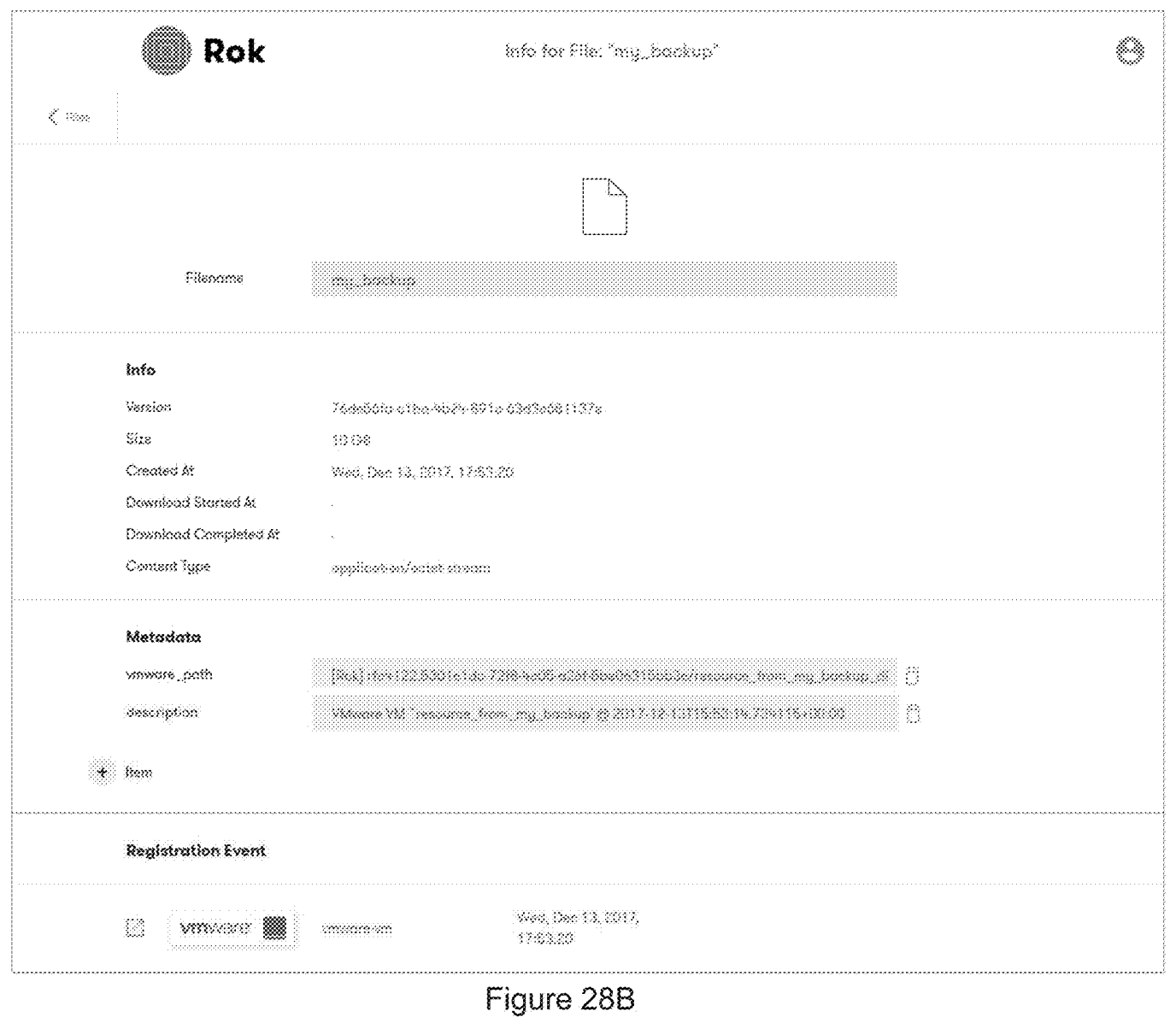

FIG. 28B illustrates an exemplary information screen of the bucket service GUI according to one embodiment. The exemplary information screen can be presented after a new file has been registered (FIG. 28A) or an information control (e.g., information control 2724) for the file "my_backup" has been selected. As shown in the exemplary information screen, information for the file in the bucket can include the UUID of the latest version, timestamp, metadata (from compute platform side, and/or from SMML installation side, and/or user-specified metadata), and any registration or presentation events.

Figure 28C:
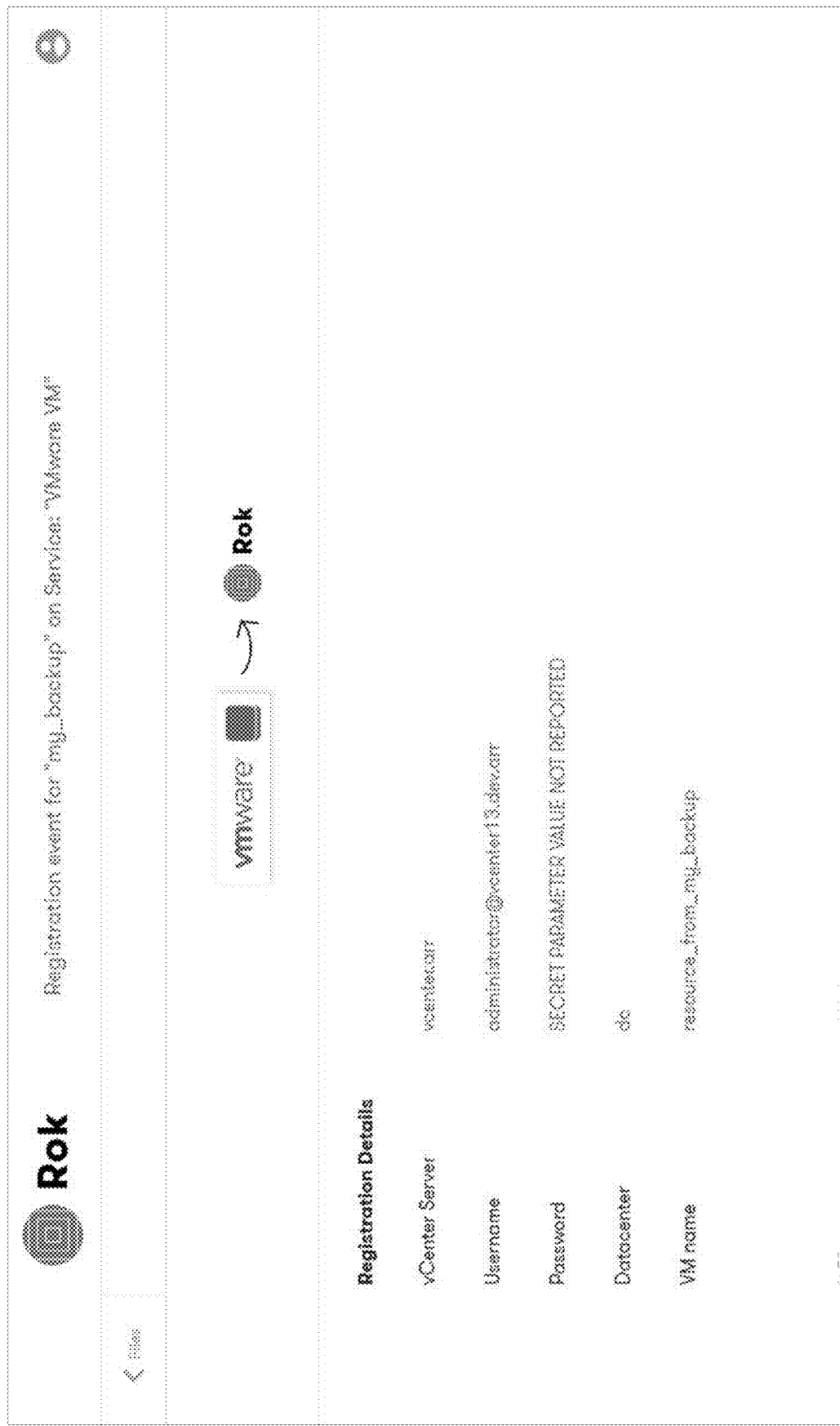

FIGS. 28C-28D illustrates an exemplary registration event screen of the bucket service GUI according to one embodiment. The exemplary registration event screen can be presented after registration event detail is requested from the exemplary information screen (FIG. 28B) or via selection of the indication 2722 of registration and presentation events (FIG. 27B). The exemplary registration event screen can, for example, include registration details (e.g., information pertaining the compute platform where the registered file came from), version information, and metadata.

Figure 29A:
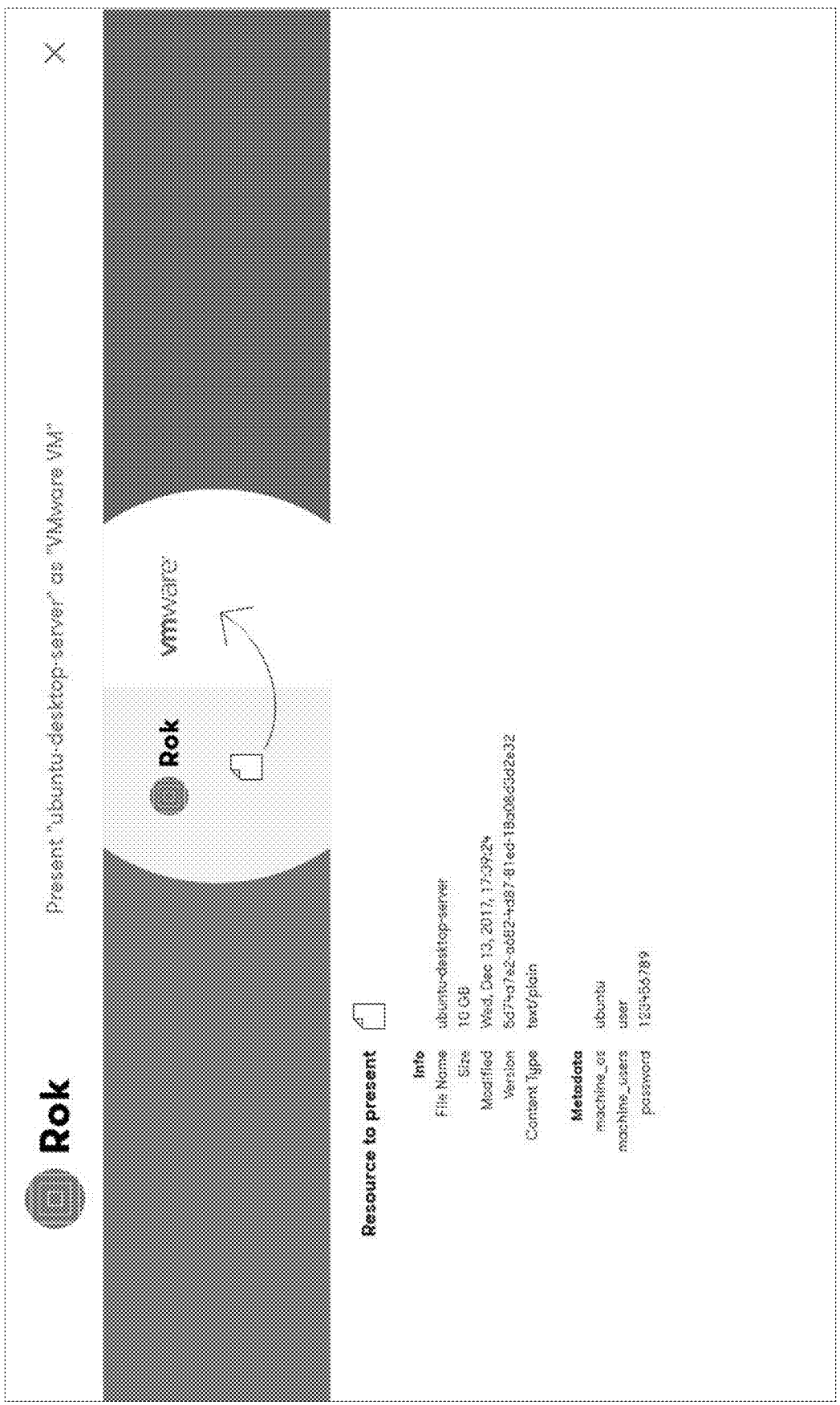
Figure 29B:
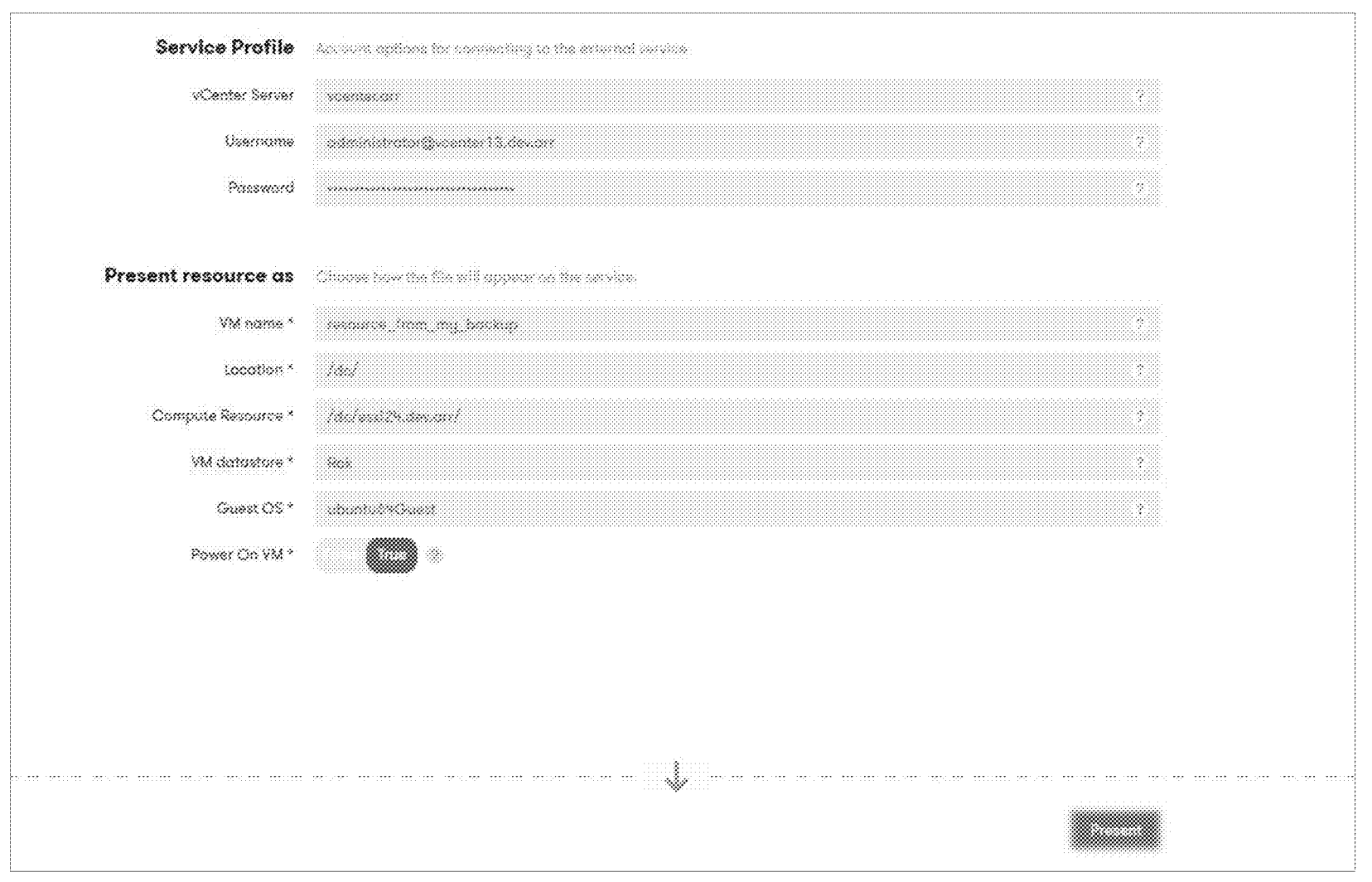

FIGS. 29A-29B illustrate an exemplary presentation screen of the bucket service GUI according to one embodiment. The exemplary presentation screen can be presented after a presentation control (e.g., presentation control 2728) has been selected. As shown in the exemplary presentation screen, an existing file from the bucket service can be identified and presented for use on a compute platform. As shown in FIG. 29A, the file in a bucket of the bucket service that is to be presented is identified and information and metadata therefor are displayed. As shown in FIG. 29B, service profile information and resource presentation information for the file being presented can be provided and displayed. The service profile information can include information used to identify the user's account on an external service at the compute platform and also credentials for gaining access to the user's account. The resource presentation information can describe how the file is to be named, where it is to be stored, etc. at the compute platform.

It should be noted that the resource presentation information can be dependent on the compute platform. In the example shown in FIG. 29A, the compute platform that is to receive the file being presented from the SMML installation is VMware. As such, the resource presentation information can be customized for the VMware platform. Hence, in another platform, the resource presentation information being display can thus differ. In other words, the resource presentation information is platform specific.

Figure 29C:
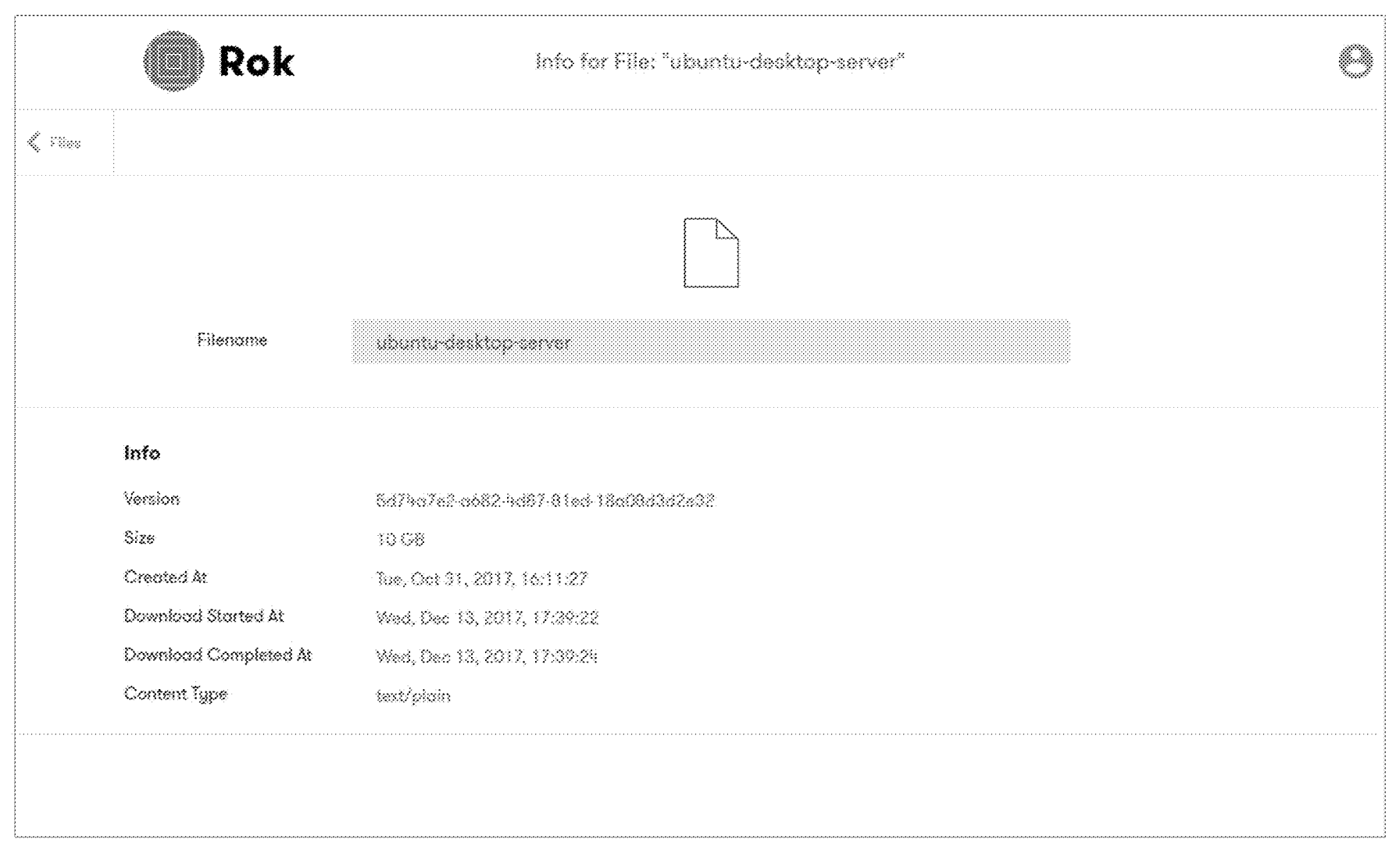
Figure 29D:
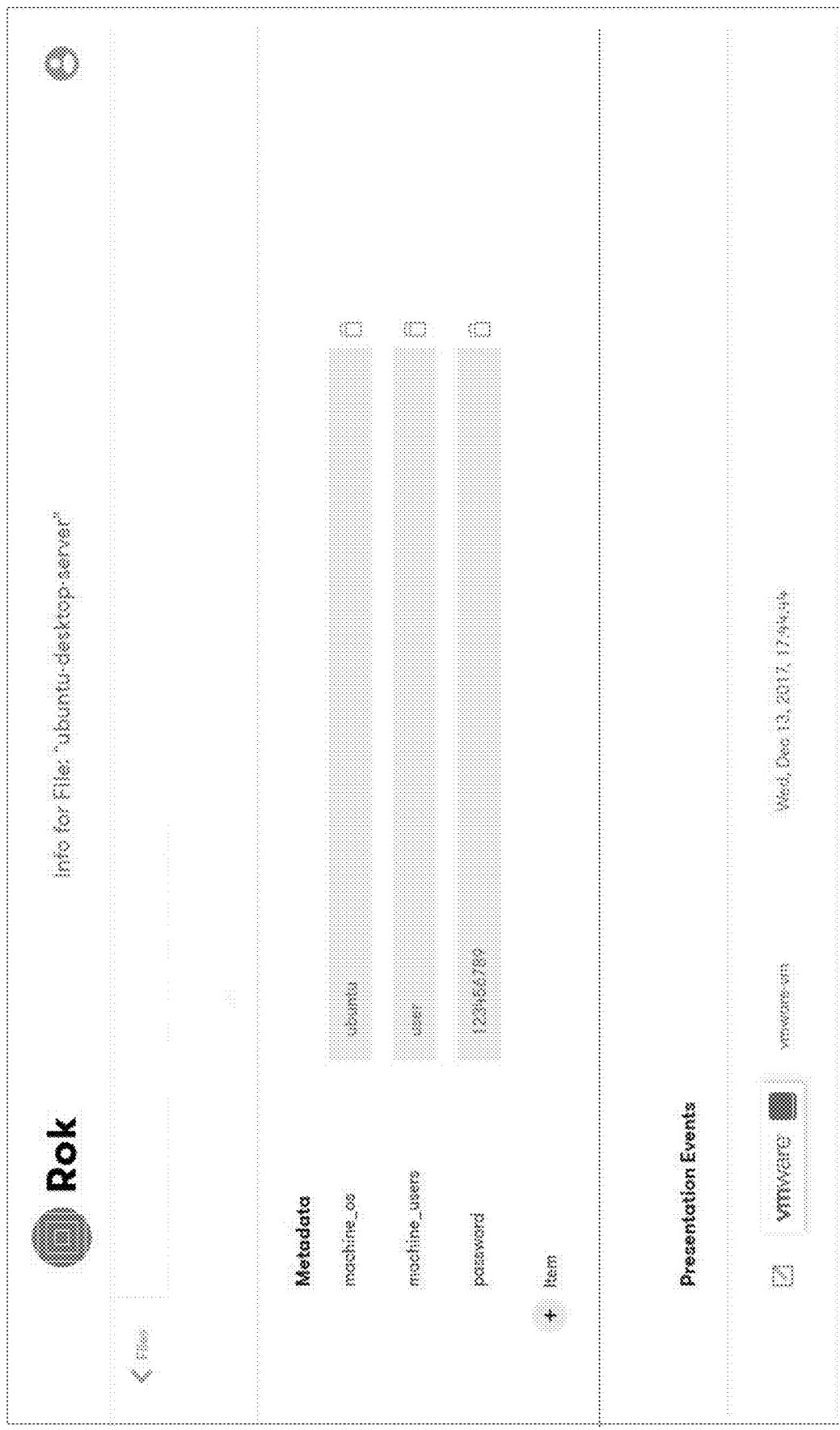

FIGS. 29C-29D illustrate an exemplary information screen of the bucket service GUI according to one embodiment. The exemplary information screen can be presented after a file has been presented (FIGS. 29A-29B) or an information control for the file "Ubuntu-desktop-server" has been selected. As shown in the exemplary information screen, information for the file in the bucket can include UUID of the latest version, size, timestamp, download started, download completed, and content type. The exemplary information screen can also include metadata (from SMML installation side, and/or from compute platform side, and/or user-specified metadata), and any presentation or registration events. For example, FIG. 29D indicates one presentation event for the file, namely, that the file was presented on an external service VMware at a given time identified by a timestamp.

Figure 29E:
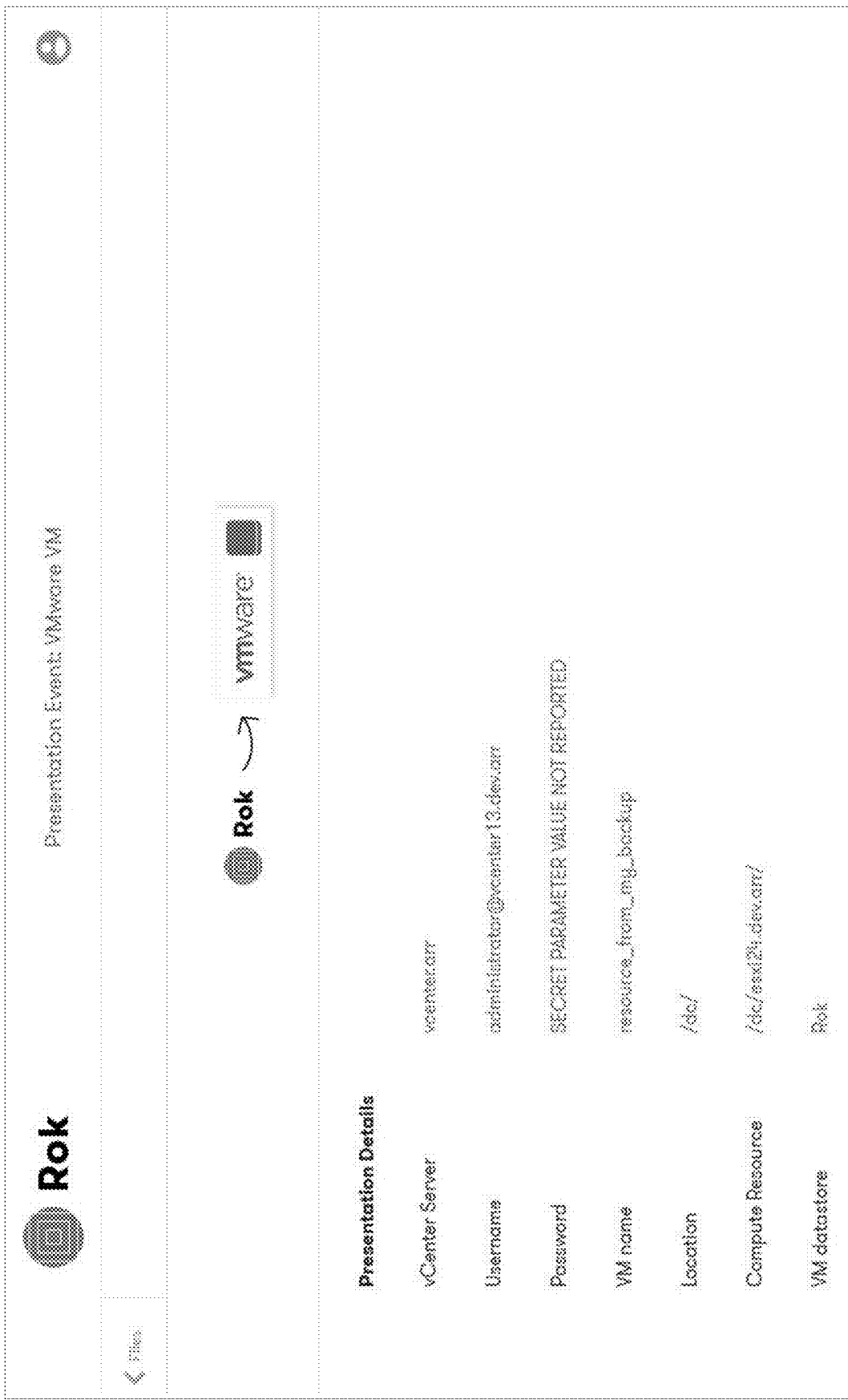
FIGS. 29E-29F illustrate an exemplary presentation event information screen of the bucket service GUI according to one embodiment.
Figure 29F:

FIGS. 29E-29F illustrate an exemplary presentation event information screen of the bucket service GUI according to one embodiment. The exemplary presentation event information screen can be presented after a file has been presented (FIGS. 29A-29B) and a presentation event control has been selected. In this example, a presentation event control in FIG. 29D can be selected to request to view information on all presentation events associated with the file "ubuntu-desktop-server". As shown in the exemplary presentation event information screen in FIGS. 29E-29F, the presentation event pertains to WMware, which is the platform to which the file from the SMML installation was presented. In addition, the exemplary presentation event information screen includes presentation details as to where the file is presented (compute platform side), information on the file from the bucket service from which the file was presented (e.g., version UUID, size, timestamp, and content type) and metadata (from SMML installation side, and/or from compute platform side, and/or user-specified metadata).

Figure 30A:
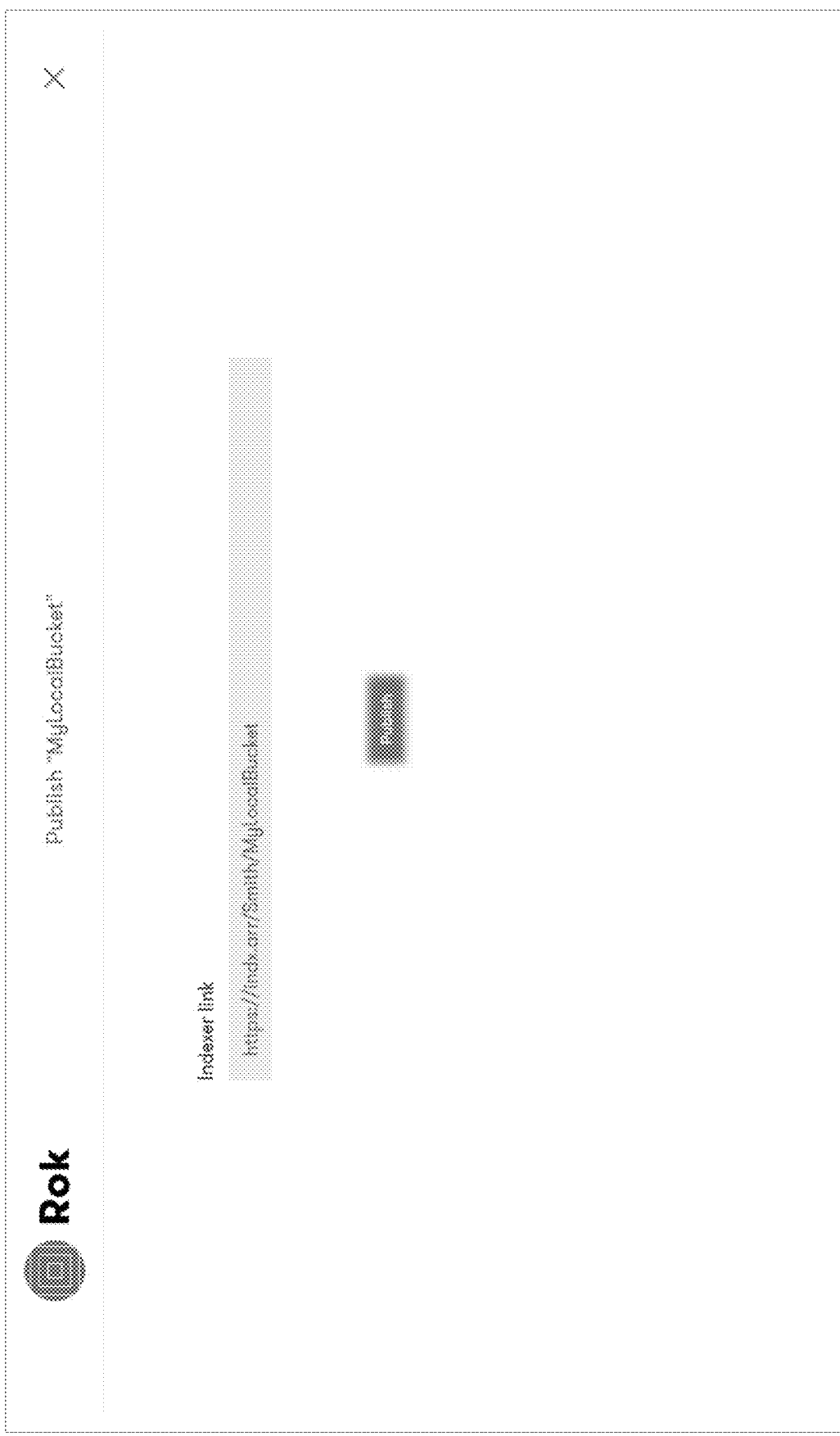
FIG. 30A illustrates an exemplary publish screen of the bucket service GUI according to one embodiment.

FIG. 30A illustrates an exemplary publish screen of the bucket service GUI according to one embodiment. The exemplary publish screen can be presented after a publish control (e.g., control object 2710) has been selected to cause a bucket to be published. As shown in the exemplary publish screen, a link (e.g., URL) to a location at an indexing service can be provided. For example, as shown in FIG. 30A, the link can be "https//indx.arr/Smith/MyLocalBucket" which identifies the indexing service (indx.an), user account name (Smith), and name for bucket (MyLocalBucket) on the indexing service.

Figure 30B:
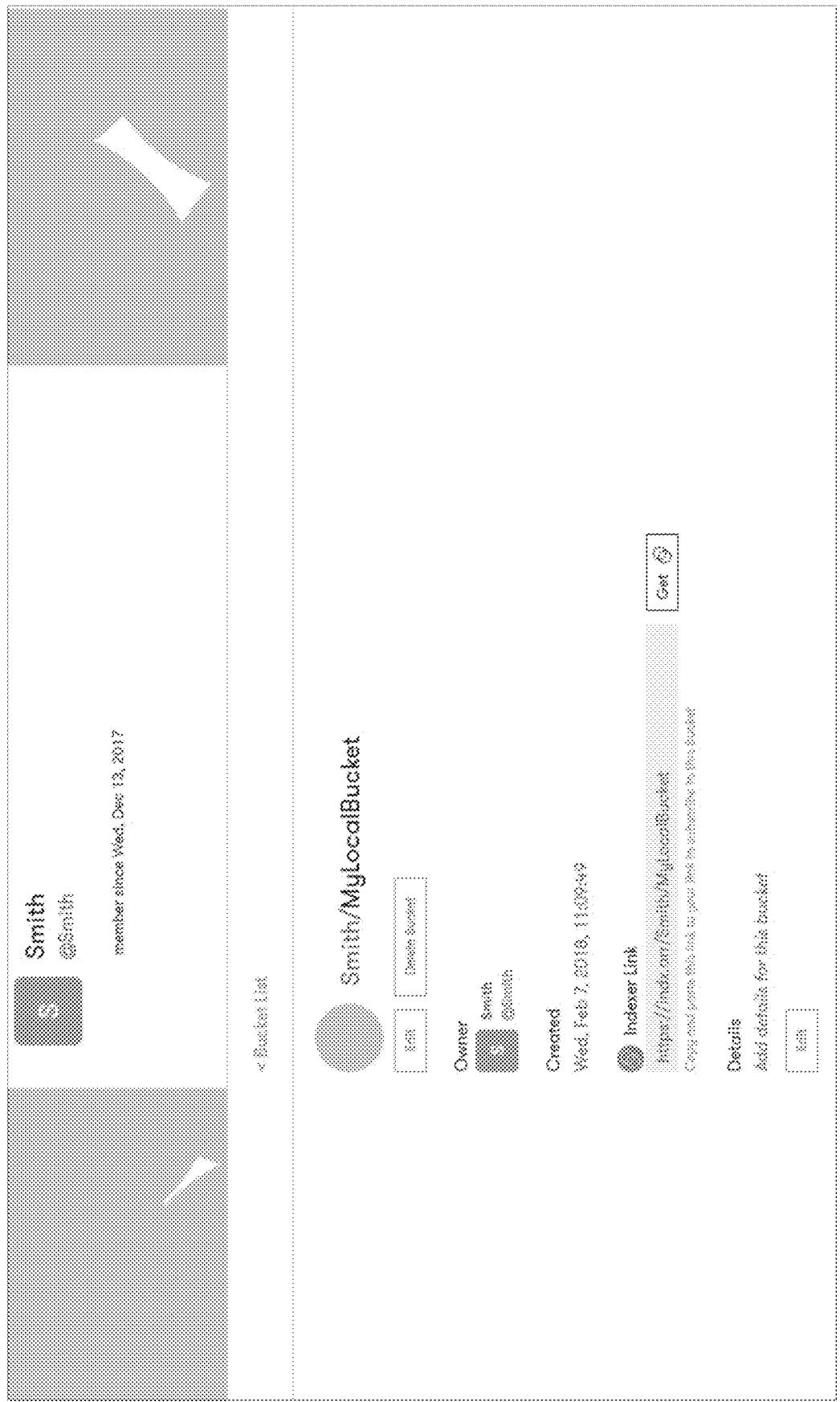
FIG. 30B illustrates an exemplary screen of an indexing service GUI according to one embodiment.

FIG. 30B illustrates an exemplary screen of an indexing service GUI according to one embodiment. The exemplary screen pertains to the user account for Smith. The exemplary screen shows that user—Smith has a bucket named "MyLocalBucket" and that other users can subscribe to this bucket using the identified indexer link. Hence, the bucket is within Smith's account because it was previously published as noted in FIG. 30A.

FIG. 31A illustrates an exemplary screen of an indexing service GUI according to one embodiment. The exemplary screen here pertains to the user account for Arrikto. The exemplary screen shows that a user (i.e., Smith) has browsed or searched to locate a bucket named "ubuntu" that is available from user account of Arrikto, and that such bucket can be subscribed to by way of a particular indexer link. The exemplary indexer link is "https//indx.arr/arrikto/ubuntu" and a copy control can be used to copy the indexer link to a clipboard of computer's operating system.

Figure 31A:
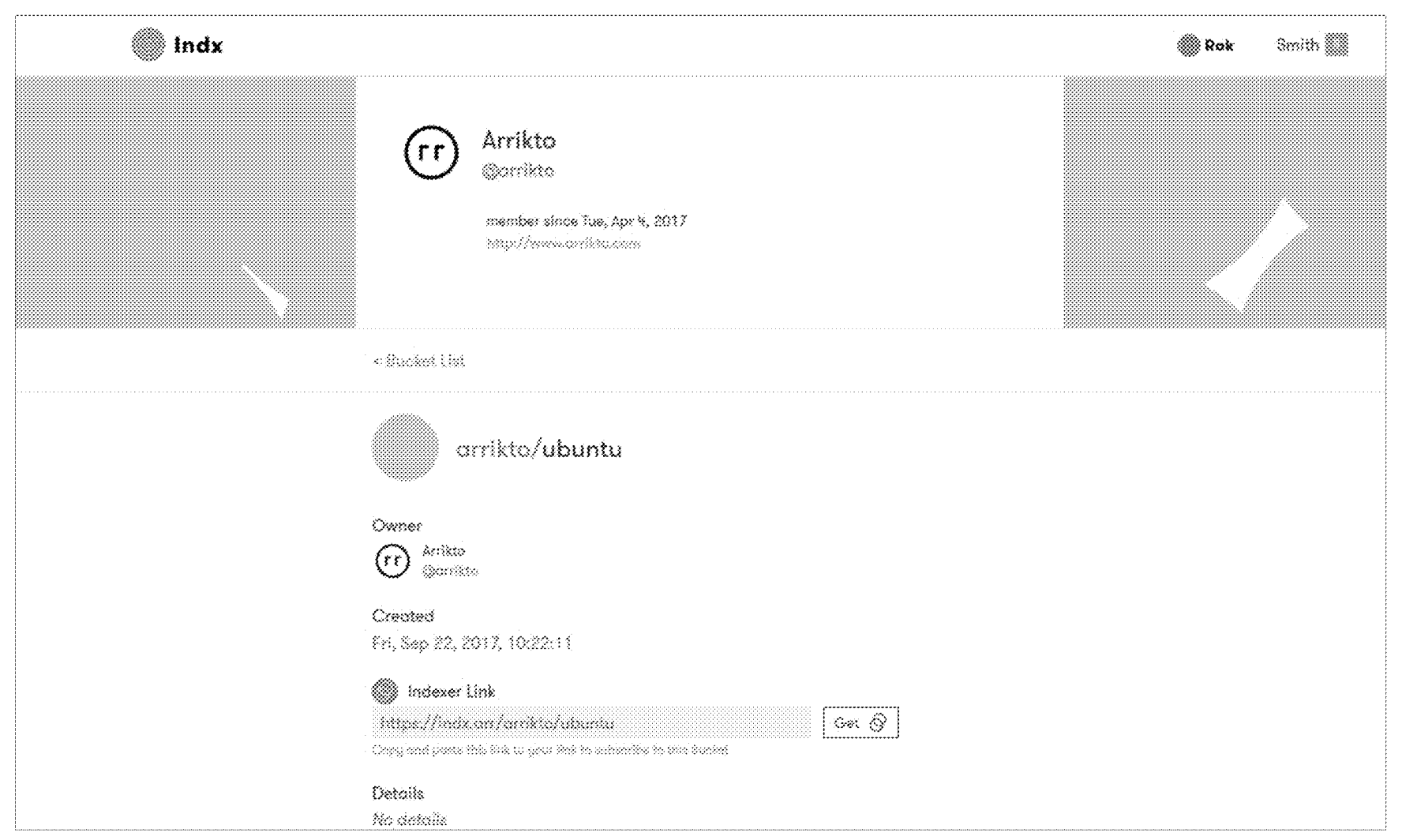
Figure 31B:
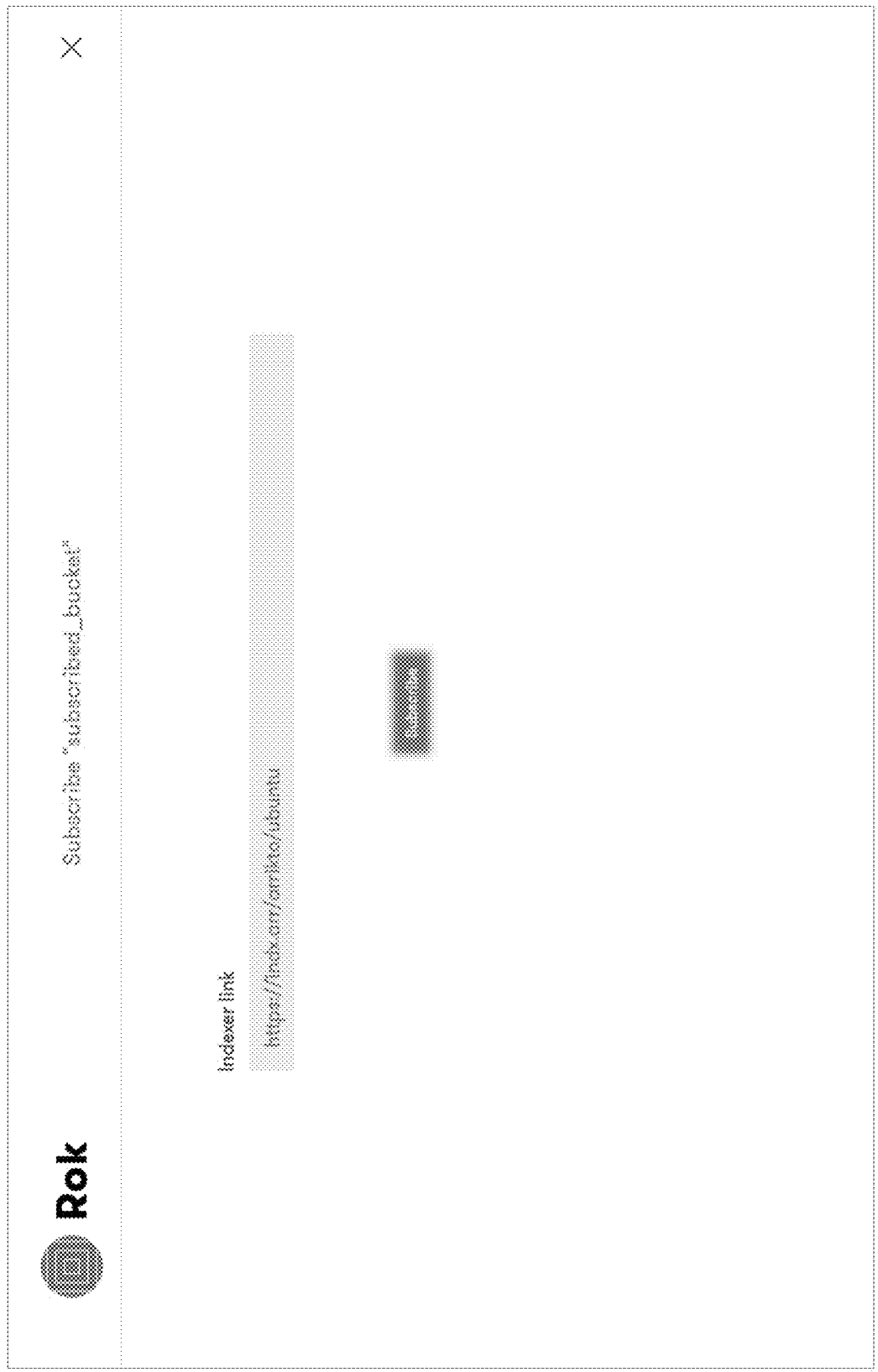
FIG. 31B illustrates an exemplary subscribe screen of the bucket service GUI according to one embodiment.

FIG. 31B illustrates an exemplary subscribe screen of the bucket service GUI according to one embodiment. The exemplary subscribe screen can be presented after a subscribe request is made. For example, a user can make a new bucket by selecting using control object 2700 (FIG. 27A) and then indicate that the bucket is to be a subscribed bucket. Then, to initiate the subscription, the indexer link for the bucket being subscribed to can be provided. For example, as noted in FIG. 31A, the exemplary indexer link for the bucket is "https//indx.arr/arrikto/ubuntu". Note if the link was previously copied to the clipboard, then the link can be pasted into a box of the exemplary subscribe screen.

Figure 32:
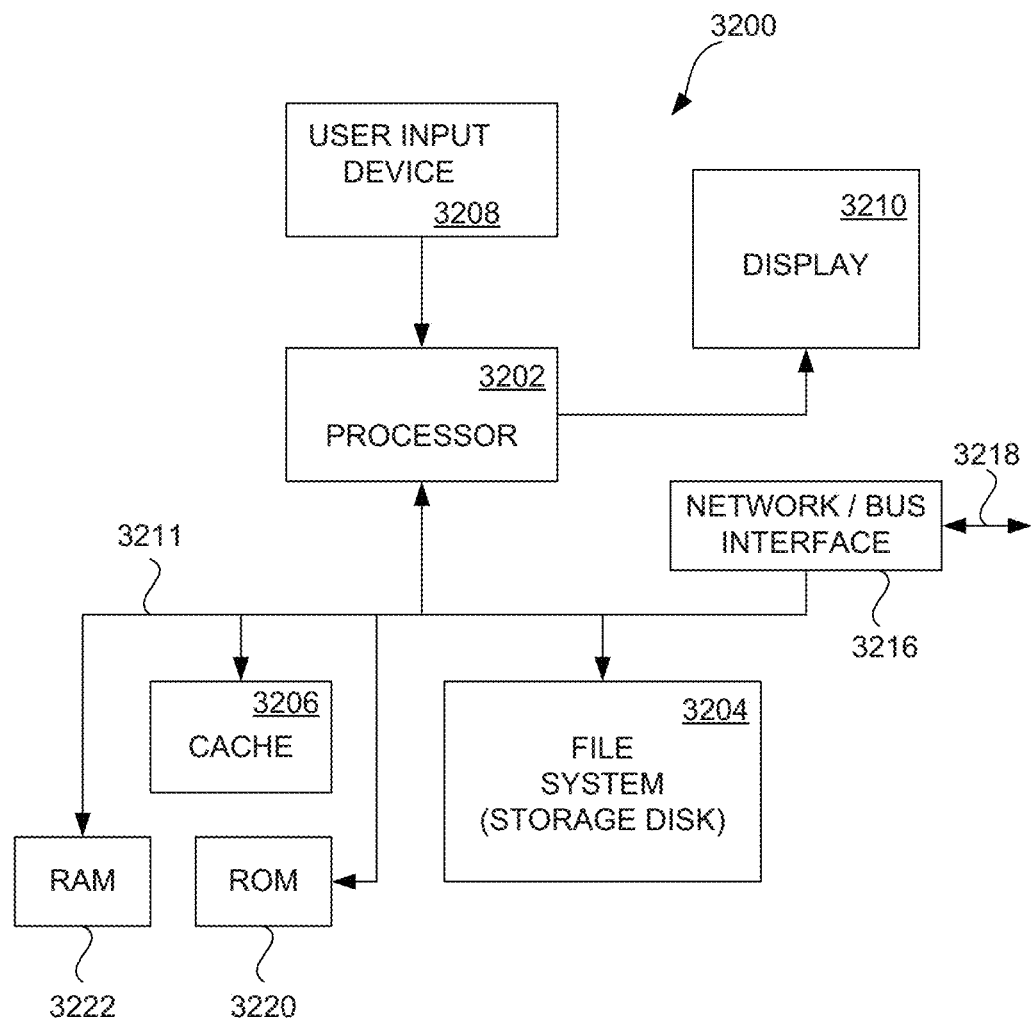
FIG. 32 is a block diagram of an example computing device.

FIG. 32 is a block diagram of an example computing device 3200. The computing device 3200 can a compute platform, server or computing device used to carry out the various embodiments disclosed herein. The computing device 3200 can include a processor 3202 that pertains to a microprocessor or controller for controlling the overall operation of the computing device 3200. The computing device 3200 can store any type of data and information as discussed above in a file system 3204 and a cache 3206. The file system 3204 is, typically, a storage disk or a plurality of disks, and/or solid-state Flash drive. The file system 3204 typically provides high capacity storage capability for the computing device 3200. However, since the access time to the file system 3204 is relatively slow, the computing device 3200 can also include a cache 3206. The cache 3206 is, for example, Random-Access Memory (RAM) provided by semiconductor memory. The relative access time to the cache 3206 is substantially shorter than for the file system 3204. However, the cache 3206 does not have the large storage capacity of the file system 3204. Further, the file system 3204, when active, consumes more power than does the cache 3206. The computing device 3200 also includes a RAM 3220 and a Read-Only Memory (ROM) 3222. The ROM 3222 can store programs, utilities or processes to be executed in a non-volatile manner. The RAM 3220 provides volatile data storage, such as for the cache 3206.

The computing system 3200 also includes a user input device 3208 that allows a user of the computing system 3200 to interact with the computing system 3200. For example, the user input device 3208 can take a variety of forms, such as a button, keypad, touch screen, dial, and the like. Still further, the computing system 3200 includes a display 3210 (screen display) that can be controlled by the processor 3202 to display information to the user. A data bus 3211 can facilitate data transfer between at least the file system 3204, the cache 3206, the processor 3202, and the CODEC 3212.

The computing system 3200 can also include a network/bus interface 3216 that couples to a data link 3218. The data link 3218 allows the computing system 3200 to couple to a host computer or data network, such as the Internet. The data link 3218 can be provided over a wired connection or a wireless connection. In the case of a wireless connection, the network/bus interface 3216 can include a wireless transceiver.

The various aspects, features, embodiments or implementations of the invention described above can be used alone or in various combinations. The invention can be used with any network, including a local, wide-area, and/or global network.

The invention can be implemented in software, hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, magnetic tape, optical data storage devices, and carrier waves. The computer readable medium can also be distributed over a network coupled computer systems so that the computer readable code is stored and executed in a distributed fashion.

The many features and advantages of the present invention are apparent from the written description and, thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed is:

1. A multi-platform data storage system for accessing a plurality of storage platforms that use different storage access or storage management protocols, the multi-platform data storage system comprising:
    a storage mobility and management layer providing virtual management of data stored in the plurality of storage platforms; and
    a storage protocol converter operatively coupled between the storage mobility and management layer and the plurality of storage platforms, wherein during access or management communication from the storage mobility and management layer to a particular one of the storage platforms, the storage protocol converter operates to convert the access and/or management communication from a layer protocol used by the storage mobility and management layer to the storage access protocol used by the particular one of the storage platforms,
    wherein the storage mobility and management layer comprises a composition service that forms a virtual storage resource (VSR) from a plurality of virtual data blocks (VDB), and maintains a mapping of the virtual data blocks to the virtual storage resource, and wherein mapping data pertaining to the mapping is stored in a virtual data block.

2. A multi-platform data storage system as recited in claim 1, wherein the composition service manages storage of the virtual data blocks to one or more of the plurality of storage platforms via the storage protocol converter, and wherein the format of the virtual data blocks at the composition service is independent of the format of such data which persistently stored in the one or more of the plurality of storage platforms via the storage protocol converter.

3. A multi-platform data storage system as recited in claim 1, wherein the composition service is able to store data to and retrieve data from the virtual data blocks independent of whether the corresponding virtual data blocks store actual data or mapping data for the mapping.

4. A multi-platform data storage system as recited in claim 1, wherein the composition service hashes the virtual data blocks and stores the hashed virtual data blocks as content-addressable virtual data blocks.

5. A multi-platform data storage system as recited in claim 4, wherein the composition service removes virtual data blocks that are duplicates based on comparing corresponding hash values.

6. A multi-platform data storage system as recited in claim 4, wherein the composition service manages storage of the virtual data blocks to one or more of the plurality of storage platforms via the storage protocol converter, and wherein the format of the virtual data blocks at the composition service is independent of the format of such data which persistently stored in the one or more of the plurality of storage platforms via the storage protocol converter.

7. A multi-platform data storage system as recited in claim 4, wherein the composition service is able to store data to and retrieve data from the virtual data blocks independent of whether the corresponding virtual data blocks store actual data or mapping data for the mapping.

8. A multi-platform data storage system as recited in claim 1, wherein the composition service creates a snapshot of a specified one of the virtual storage resources by creating a new, standalone virtual storage resource that maps to the same existing virtual data blocks as does the specified one of the virtual storage resources.

9. A multi-platform data storage system as recited in claim 8, wherein the new, standalone virtual storage resource for the snapshot does not refer to the specified one of the virtual storage resources.

10. A multi-platform data storage system as recited in claim 8, wherein the new, standalone virtual storage resource for the snapshot is formed without copying the virtual data blocks mapped to the specified one of the virtual storage resources.

11. A multi-platform data storage system as recited in claim 8, wherein the new, standalone virtual storage resource for the snapshot is immutable and portable.

12. A multi-platform data storage system as recited in claim 1, wherein the composition service creates a clone of a specified one of the virtual storage resources by creating a new, standalone virtual storage resource that maps to the same existing virtual data blocks as the specified one of the virtual storage resources.

13. A multi-platform data storage system as recited in claim 12, wherein the new, standalone virtual storage resource for the clone is mutable.

14. A multi-platform data storage system as recited in claim 1, wherein the composition service implements garbage collection to remove those virtual data blocks that are not referenced by an virtual storage resource.

15. A multi-platform data storage system as recited in claim 14, wherein the garbage collection uses an epoch mechanism over an external, distributed key-value store to ensure using accurate referencing information.

16. A multi-platform data storage system as recited in claim 1, wherein data being accessed by the computing platforms is in any of a plurality of different formats, and wherein the storage mobility and management layer maintains virtualized storage resources of the data as virtual storage resources that are managed to correspond to any of the different formats used by the computing platforms.

17. A multi-platform data storage system as recited in claim 16, wherein the virtual storage resources being maintained by the storage mobility and management layer are formed of a plurality of virtual data blocks that are linearly addressable.

18. A multi-platform data storage system as recited in claim 16, wherein the different formats for the data being accessed by the computing platforms include one or more of disks, volumes, images, files, or objects.

19. A multi-platform data storage system as recited in claim 1, wherein the multi-platform data storage system provides an access and management interface for the virtual storage resources, and wherein the access and management interface for the virtual storage resources is independent of access and management interfaces that the computing platforms use to access and manage their native storage resources.

20. A multi-platform data storage system as recited in claim 8, wherein the access and management interface for the virtual storage resources is independent of access and management interfaces that the storage platforms use to access and manage their native storage resources.

21. A multi-platform data storage system as recited in claim 1,
   wherein the composition service hashes the virtual data blocks and stores the hashed virtual data blocks, and
   wherein the composition service asynchronously changes unhashed virtual data blocks with the hashed virtual data block corresponding thereto, and updates references in the mapping for those one or more virtual storage resources to refer to the hashed virtual data block instead of the unhashed virtual data block.

22. A multi-platform data storage system as recited in claim 21, wherein the storage protocol converter for the particular one of the storage platforms receives a request for access to one or more of the virtual data blocks and converts the request from the layer protocol used by the storage mobility and management layer to the storage access protocol used by the particular one of the storage platforms, without regard for whether the virtual data blocks contain actual data or mapping metadata.

* * * * *